US008181201B2

(12) United States Patent
Goldenberg et al.

(10) Patent No.: US 8,181,201 B2
(45) Date of Patent: May 15, 2012

(54) ENHANCED ELECTRONIC PROGRAM GUIDES

(75) Inventors: Miriam Goldenberg, Modiin (IL); Yevgeny Seldin, Jerusalem (IL); Asher Sterkin, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 866 days.

(21) Appl. No.: 11/989,560

(22) PCT Filed: Aug. 29, 2006

(86) PCT No.: PCT/IL2006/001003
§ 371 (c)(1),
(2), (4) Date: Mar. 24, 2008

(87) PCT Pub. No.: WO2007/026357
PCT Pub. Date: Mar. 8, 2007

(65) Prior Publication Data
US 2009/0178081 A1 Jul. 9, 2009

Related U.S. Application Data

(60) Provisional application No. 60/712,693, filed on Aug. 30, 2005.

(51) Int. Cl.
*G06F 3/00* (2006.01)
*G06F 13/00* (2006.01)
*H04N 5/445* (2011.01)

(52) U.S. Cl. ............... 725/46; 725/10; 725/13; 725/14; 725/115; 725/116; 725/138; 725/139

(58) Field of Classification Search .................. None
See application file for complete search history.

(56) References Cited

U.S. PATENT DOCUMENTS 5,534,911 A 7/1996 Levitan
(Continued)

FOREIGN PATENT DOCUMENTS

EP 0 924 927 A2 6/1999
(Continued)

OTHER PUBLICATIONS

Tse et al., "Zapping Behavior during Commercial Breaks," Journal of Advertising Research (May-Jun. 2001 pp. 25-29) (World Advertising Research Center Limited).
Kamal Ali et al., "TiVo: Making Show Recommendations Using a Distributed Collaborative Filtering Architecture" (KDD, Aug. 25, 2004).

(Continued)

*Primary Examiner* — Dominic D Saltarelli
*Assistant Examiner* — Jason J Chung
(74) *Attorney, Agent, or Firm* — Husch Blackwell LLP

(57) ABSTRACT

A method and system for rating programs, the method including, receiving a sample of viewing logs from a plurality of set top boxes (STBs), determining, from the sample of viewing logs, at least groups of viewers sharing similar interests, and groups of programs sharing similar audience, computing time dynamics of rating distribution for the groups of viewers and the groups of programs, and incorporating at least one of the following into broadcast metadata the time dynamics of rating distributions of the groups of viewers for each of the groups of programs, rating distributions of the groups of viewers for each of the groups of programs marginalized by time, rating distributions of the groups of viewers for each program marginalized by time, relative sizes of each group of viewers, and a mapping of each program to groups of programs, thereby making the broadcast metadata available to the plurality of STBs for use in computing ratings. Related systems and methods are described.

7 Claims, 46 Drawing Sheets

U.S. PATENT DOCUMENTS

| | | | |
|---|---|---|---|
| 5,550,928 A * | 8/1996 | Lu et al. | 382/116 |
| 5,778,362 A | 7/1998 | Deerwester | |
| 5,793,409 A | 8/1998 | Tetsumura | |
| 6,259,486 B1 | 7/2001 | Mahvi | |
| 6,334,127 B1 | 12/2001 | Bieganski et al. | |
| 6,449,632 B1 | 9/2002 | David et al. | |
| 6,564,381 B1 * | 5/2003 | Hodge et al. | 725/97 |
| 6,774,926 B1 | 8/2004 | Ellis et al. | |
| 6,931,657 B1 | 8/2005 | Marsh | |
| 2001/0007149 A1 * | 7/2001 | Smith | 725/14 |
| 2002/0059584 A1 * | 5/2002 | Ferman et al. | 725/34 |
| 2002/0087979 A1 * | 7/2002 | Dudkiewicz et al. | 725/34 |
| 2002/0104087 A1 * | 8/2002 | Schaffer et al. | 725/46 |
| 2002/0112239 A1 | 8/2002 | Goldman | |
| 2002/0188949 A1 * | 12/2002 | Wang et al. | 725/46 |
| 2003/0037333 A1 | 2/2003 | Ghashghai et al. | |
| 2003/0051240 A1 | 3/2003 | Schaffer et al. | |
| 2003/0066067 A1 | 4/2003 | Gutta et al. | |
| 2003/0084450 A1 | 5/2003 | Thurston et al. | |
| 2003/0115585 A1 * | 6/2003 | Barsness et al. | 725/9 |
| 2003/0195863 A1 | 10/2003 | Marsh | |
| 2003/0225777 A1 | 12/2003 | Marsh | |
| 2003/0226145 A1 | 12/2003 | Marsh | |
| 2003/0233241 A1 | 12/2003 | Marsh | |
| 2003/0233655 A1 | 12/2003 | Gutta et al. | |
| 2003/0236708 A1 | 12/2003 | Marsh | |
| 2003/0237093 A1 | 12/2003 | Marsh | |
| 2004/0001081 A1 | 1/2004 | Marsh | |
| 2004/0003401 A1 | 1/2004 | Gutta et al. | |
| 2004/0003403 A1 | 1/2004 | Marsh | |
| 2004/0083490 A1 | 4/2004 | Hane | |
| 2004/0098744 A1 * | 5/2004 | Gutta | 725/46 |
| 2005/0149987 A1 * | 7/2005 | Boccon-Gibod et al. | 725/135 |
| 2005/0185933 A1 | 8/2005 | Marsh | |
| 2005/0192987 A1 | 9/2005 | Marsh | |
| 2005/0198689 A1 | 9/2005 | Marsh | |
| 2005/0235320 A1 * | 10/2005 | Maze et al. | 725/52 |
| 2006/0020973 A1 * | 1/2006 | Hannum et al. | 725/46 |
| 2006/0075420 A1 * | 4/2006 | Ludvig et al. | 725/9 |
| 2006/0184459 A1 * | 8/2006 | Parida | 706/1 |

FOREIGN PATENT DOCUMENTS

| | | |
|---|---|---|
| EP | 1 400 903 A1 | 3/2004 |
| EP | 1 424 640 A2 | 6/2004 |
| EP | 1 494 144 A2 | 1/2005 |
| EP | 1 538 838 A1 | 6/2005 |
| EP | 1 906 317 A2 | 4/2008 |
| WO | WO 95/15029 | 6/1995 |
| WO | WO 01/24047 A2 | 4/2001 |
| WO | WO 01/47257 A1 | 6/2001 |
| WO | WO 02/07433 A1 | 1/2002 |
| WO | WO 02/11445 A2 | 2/2002 |
| WO | WO 02/13521 A1 | 2/2002 |
| WO | WO 02/25938 A2 | 3/2002 |
| WO | WO 02/44880 A1 | 6/2002 |
| WO | WO 03/030528 A2 | 4/2003 |
| WO | WO 03/050670 A1 | 6/2003 |
| WO | WO 2004/029750 A2 | 4/2004 |
| WO | WO 2004/047446 A1 | 6/2004 |
| WO | WO 2005046235 A1 * | 5/2005 |

OTHER PUBLICATIONS

John S. Breese et al., "Empirical Analysis of Predictive Algorithms for Collaborative Filtering" (Technical Report MSR-TR-98-12) (Microsoft Corporation, Redmond, WA, Oct. 1998).

Igor Cadez et al., "Model-Based Clustering and Visualization of Navigation Patterns on a Web Site" (Technical Report MSR-TR-00-18) (Microsoft Corporation, Redmond, WA, Sep. 2001).

Thomas M. Cover et al., "*Elements of Information Theory*" (Second Edition, chapters 11 and 15) (John Wiley & Sons 2006).

Kaushal Kurapati et al., "A Multi-Agent TV Recommender" (Philips Research Briarcliff, Briarcliff Manor, NY).

Sara C. Madeira et al., "Biclustering Algorithms for Biological Data Analysis: A Survey" (IEEE Transactions on Computational Biology and Bioinformatics, vol. 1, No. 1 Jun. 14, 2004).

Johan Pouwelse et al., "P2P-based PVR Recommendation using Friends, Taste Buddies and Superpeers" (Workshop: Beyond Personalization, San Diego, Calif. Jan. 9, 2005).

Lawrence R. Rabiner, "A Tutorial on Hidden Markov Models and Selected Applications in Speech Recognition" (Proceedings of the IEEE, vol. 77, No. 2, Feb. 1989).

Yevgeny Seldin et al., "Unsupervised Sequence Segmentation by a Mixture of Switching Variable Memory Markov Sources" (School of Computer Science and Engineering, The Hebrew University, Jerusalem, Israel).

Noam Slonim et al., "Unsupervised Document Classification using Sequential Information Maximization" (School of Computer Science and Engineering and the Interdisciplinary Center for Computation, The Hebrew University, Jerusalem, Israel).

Naftali Tishby et al., "The Information Bottleneck Method" (The Hebrew University, Jerusalem, Israel).

"Broadcast and On-line Services: Search, select, and rightful use of content on personal storage systems ("TV-Anytime Phase 1"); Part 2: System description" (ETSI TS 102 822-2 V1.1.1, European Telecommunications Standards Institute, Oct. 2003).

"Broadcast and On-line Services: Search, select, and rightful use of content on personal storage systems ("TV-Anytime Phase 1"); Part 3: Metadata; Sub-part 1: Metadata schemas" (ETSI TS 102 822-3-1 V1.1.1, European Telecommunications Standards Institute, Oct. 2003).

"Broadcast and On-line Services: Search, select, and rightful use of content on personal storage systems ("TV-Anytime Phase 1"); Part 3: Metadata; Sub-part 2: System aspects in a uni-directional environment" (ETSI TS 102 822-3-2 V1.1.1, European Telecommunications Standards Institute, Oct. 2003).

"EPG & PVR: Functional Overview" (GIST Digital Television Services, Jan. 11, 2005).

"Estimating the Revenue Gain with Vivisimo Document Clustering on Ecommerce Sites" (Vivisimo, Inc., Pittsburgh, PA. 2003).

DirecTV TiVo DVR manual (Chapter 6, Messages & Setup).

"GIST Interactive Media Service System" (GIST Interactive Television Guides, GIST Communications, Berlin, Germany).

"Mobile Digital TV Programming" (GIST Interactive Television Guides, GIST Communications, New York 2005).

"Technology White Paper" (Autonomy Inc. 2003).

"TiVoPortal; My Preferences" (Aug. 30, 2005) available on the World Wide Web at: www.garysargent.co.uk/tivo/glossary/mypreferences.htm.

\* cited by examiner

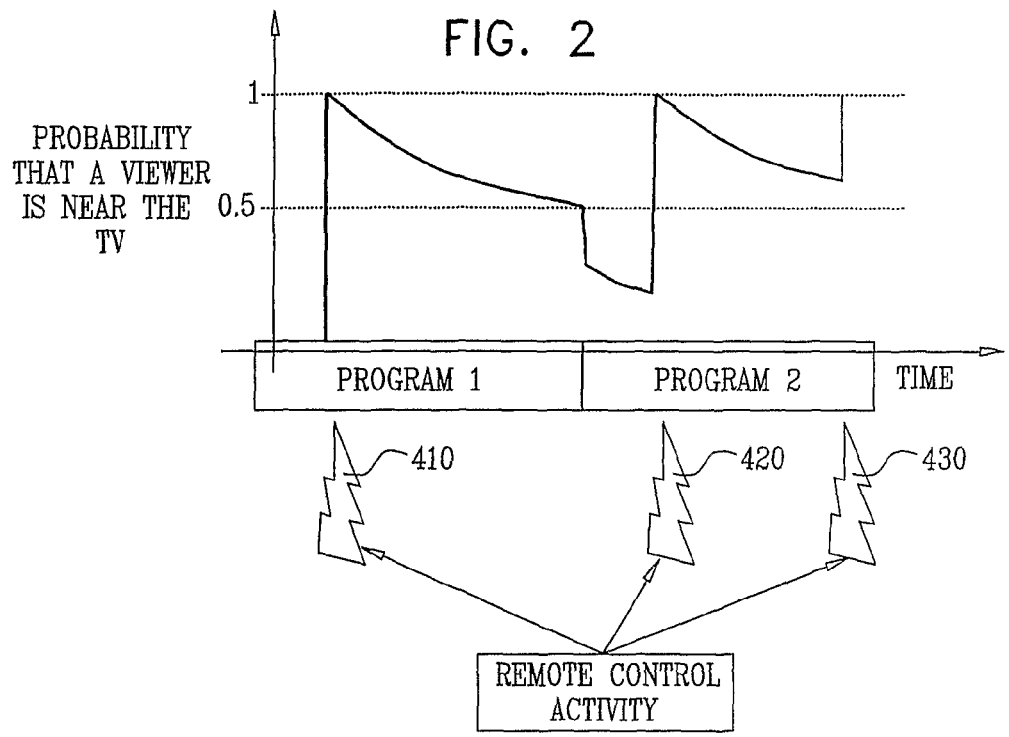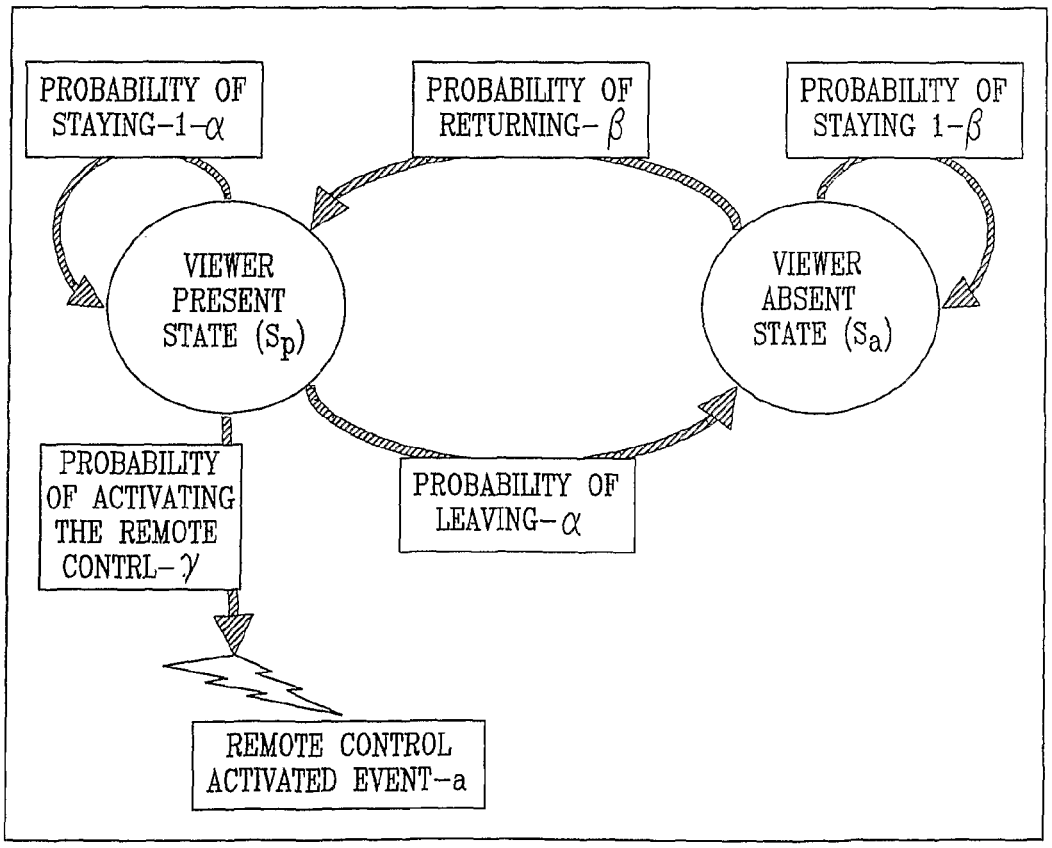

ENHANCED ELECTRONIC PROGRAM GUIDES

RELATED APPLICATION INFORMATION

The present application is a 35 USC §371 application of PCT/IL2006/001003, filed on 29 Aug. 2006 and entitled "Enhanced Electronic Program Guides", which was published in the English language with International Publication Number WO 2007/026357, and which claims the benefit of priority from US provisional application No. 60/712,693 of Miriam Goldenberg, et al., filed 30 Aug. 2005, the disclosure of which is hereby incorporated herein by reference.

FIELD OF THE INVENTION

The present invention relates to electronic program guides (EPGs) and more particularly to methods to navigate through EPGs in order to view live and recorded content.

BACKGROUND OF THE INVENTION

U.S. Pat. No. 6,449,632 to David, et al, describes a system for collecting user feedback in a data broadcasting system, the system for collecting user feedback including a multiplicity of user profile agents, each user profile agent being associated with one of a multiplicity of users of the data broadcasting system and being operative to create a user profile based on activity of the one user, a user profile subsystem associated with a plurality of user profile agents chosen from among the multiplicity of user profile agents and operative to derive an integrated user profile based on the plurality of user profiles created by the plurality of user profile agents, and a broadcasting agent operatively associated with a broadcast center of the data broadcasting system and in operative communication with the user profile subsystem and receiving therefrom the integrated user profile.

U.S. Pat. No. 6,931,657 to Marsh describes methods and arrangements which are provided for use in selecting candidate television and multimedia programs for recording, recording the candidate programs, viewing the recorded programs, and archiving the recorded programs. At the center of this capability is a time-dependent content buffering arrangement that allows candidate programs to be selected by an intelligent content agent, with the assistance of a bubbling agent, an electronic program guide, a select library listing, and/or a personal profile associated with a particular user. The buffering arrangement selectively records candidate programs in a non-circular manner. Candidate programs may be dropped during recording based on certain information associated with the program. For example, examination of closed captioning information may reveal that the candidate program does not match the initial criteria for making it a candidate program. The buffering arrangement also allows the user to selectively view recorded programs on demand and/or archive certain programs. Archived programs are maintained locally or otherwise stored to another media. Those recorded programs that are not archived will be erased in a time-dependent manner when a defined storage capacity is reached. The buffering arrangement also provides for feedback to various intelligent candidate-selecting agents, such as, e.g., an intelligent content agent and a bubbling agent.

US Patent Application 2004/0003403 of Marsh describes methods and systems whereby filter tokens are provided for use in connection with an electronic program guide (EPG) system. Filter tokens can be used to reduce the amount information that is presented to the user in an electronic program guide display. This can help to reduce information overload and can facilitate presenting indicia of programs in which one or more of the users are likely to be interested. Filter tokens can also be used to provide users with a very robust tool to define user preferences of attributes associated with programs that are of interest to the user.

US Patent Application 2005/0192987 of Marsh describes a media content description system operative to receive media content descriptions from one or more metadata providers. The media content description system associates each media content description with the metadata provider that provided the description. The media content description system may generate composite descriptions based on the received media content descriptions. The media content description system provides data associated with the media content descriptions to one or more program data providers.

US Patent Application 2004/0001081 of Marsh describes systems and methods to enhance a user's electronic program guide (EPG) experience and can permit an EPG system to learn about individual user preferences, and then tailor an EPG rendering or program-recommendation process to those specific user's preferences. Various embodiments can provide EPGs that provide quick visual cues for the user to quickly ascertain the subject matter of programs that might be of particular interest. Various scoring approaches can not only ascertain, on a user-by-user basis, those programs that are most likely to be of interest to a user, but can reduce the amount of information to which such users are exposed in an EPG. Various tools are provided by which the user can rate programs or have programs rated for them.

US Patent Application 2003/0225777 of Marsh describes systems and methods for scoring and accurately recommending multimedia content programming to users based upon a user's preferences, each user receiving individualized programming recommendations according to that user's likes and dislikes. A user provides preferred values for attributes of television programs. For example, if the user likes reality shows, the user would assign a relatively high attribute score for a genre attribute having a value of "reality show." The preferred values are compared to a program description file that list program attribute values for a program available for viewing. A program score is obtained based on this comparison. If there are many matches, then the program score will be high. Programs are recommended to the user based on the program scores of the programs; programs having higher program scores (from having many matches with the user's preferences) will be recommended over lower-scoring programs.

US Patent Application 2003/0237093 of Marsh describes methods and systems to facilitate handing multiple users in the context of electronic program guide systems. Various described embodiments permit the users to be identified to or registered with the system. The system can then establish a ranking or pecking order for the users. The ranking provides a point of reference from which the system can provide services to the users. Various methods and systems can ascertain the particular mix of users or viewers at any one time, and can then provide one or more services as a function of the viewers who are present. Additionally, some embodiments can ascertain when the collection of users has changed and can then offer a modified mix of services that are tailored to the new user collection. Further, some embodiments make use of the concept of personas for individual users. Individual users can have multiple different personas each of which being associated with a different set of preferences for that user. The system can then make recommendations and provide other services for the user based on their current persona.

PCT application PCT/IB02/03693, published in the English language on 10 Apr. 2003 as WO 03/030528, of Koninklijke Philips Electronics N.V., describes a data-class recommender, such an electronic program guide that recommends television programs, avoids users getting trapped in a rut when the users select the same programming material over and over again. In an embodiment, the recommender may be programmed automatically to leverage the profile of another user to broaden the user's profile. For example, the recommender may use the target descriptions of other users in a same household of the user as a guide for broadening the user's profile. Alternatively, the household profile may be used as a filter for source material for soliciting feedback from the user. In this way, rather than simply broadening the user's range arbitrarily, guidance from other profiles, related in some way to the user, is obtained and leveraged. Note that the "relationship" can include friends, published stereotypes representing interests of the user, and others.

PCT application PCT/EP01/07901, published in the English language on 7 Feb. 2002 as WO 02/11445, of Koninklijke Philips Electronics N.V., describes an electronic program guide (EPG) system employing a preference engine and processing system that combines explicit rule profile, history profile, and feedback profile data to generate new predictions.

PCT application PCT/US00/33876, published in the English language on 28 Jun. 2001, as WO 01/47257, of Tivo, Inc., describes a system and method for making program recommendations to users of a network-based video recording system which utilizes expressed preferences as inputs to collaborative filtering and Bayesian predictive algorithms to rate television programs using a graphical rating system.

Published US Patent application 2003/0066067 of Gutta, et al, describes a data-class recommender, such an electronic program guide that recommends television programs, allows users to modify their implicit profiles using the profiles of other users. For example, if a user likes the programming choices made by a friend's profile, the user can have his/her profile modified by adding parts of the friend's profile to his own, either replacing parts or forming a union of the descriptors that indicated favored classes of data. According to an embodiment, features may be labeled to allow the modifying user to select the specific parts of the friend's profile to use in making the modifications. The labeling may be done based on feature-value scores or categories for which there is a high frequency of cross-correlation with other categories in a description that defines preferred subject matter, such as a specialized description of a version space.

P2P-based PVR Recommendation using Friends, Taste Buddies and Superpeers, by Johan Pouwelse, et al. published as part pf Workshop: Beyond Personalization 2005, IUI '05, Jan. 9, 2005, San Diego, Calif., USA, and available on the World Wide Web at www.cs.umn.edu/Research/GroupLens/beyond2005/full/pouwelse.pdf, describes a distributed recommendation method based on exchanging similar playlists among taste buddies, which takes into account the limited availability of peers, lack of trust in P2P networks, and dynamic identities of peers, etc. Our preliminary experiment shows that only exchanging a small portion of similar playlists from taste buddies could lead to an efficient way to compute recommendations within a context of P2P networks.

A Technology White Paper of Autonomy Inc., available for download on the World Wide Web at www.autonomy.com/content/downloads/White%20Papers/index.en.html describes how the content of unstructured information forms a critical link in virtually every value chain process across a wide range of business operations. The efficient management of such information is therefore directly linked to the bottom line. By automating key processes on unstructured information, Autonomy's technology enables the automation of business operations previously only performed manually. This offers significant savings for every type of organization and industry.

A Vivisimo White Paper on Ecommerce Site, titled, *Estimating the Revenue Gain with Vivisimo document Clustering on Ecommerce Site*, published in 2003, describes a method to estimate the revenue gain that could be expected by clustering the search results at an ecommerce site, i.e., a web site that seeks to sell items that are found by searching. The method builds on reports that the average user gives up on searching after about 12 minutes if a solution is not found. This is used to estimate that clustered results allow users to examine nearly double the number of relevant documents than in the case of result lists. Also, a clustering approach brings into potential view those documents that would be buried deep within a result list.

*Unsupervised Sequence Segmentation by a Mixture of Switching Variable Memory Markov Sources* (2001), by Y. Seldin, et al., Proc. 18th International Conf. on Machine Learning, presents a novel information theoretic algorithm for unsupervised segmentation of sequences into alternating Variable Memory Markov sources. The algorithm is based on competitive learning between Markov models, when implemented as Prediction Suffix Trees (Ron et al., 1996) using the MDL principle. By applying a model clustering procedure, based on rate distortion theory combined with deterministic annealing, thereby obtaining a hierarchical segmentation of sequences between alternating Markov sources.

*A Tutorial on Hidden Markov Models and Selected Applications in Speech Recognition*, by L. Rabiner, Proceedings of the IEEE, Vol. 77, No. 2, February 1989, describes how statistical methods of Markov source or hidden Markov modeling have become increasingly popular in the last several years. There are two strong reasons strong reasons why this has occurred. First, the models are very rich in mathematical structure and hence can form the theoretical basis for use in a wide range of applications. Second, the models, when applied properly work very well in practice for several important applications. This paper carefully and methodically reviews the theoretical aspects of this type of statistical modeling and shows how they have been applied to selected problems in machine recognition of speech.

*Unsupervised Document Classification using Sequential Information Maximization*, by N. Slonim, et al, SIGIR'02, Aug. 11-15, 2002, Tampere, Finland, Copyright 2002 ACM 1-58113-561-0/02/0008, presents a novel sequential clustering algorithm which is motivated by the Information Bottleneck (IB) method. In contrast to the agglomerative IB algorithm, the new sequential (sIB) approach is guaranteed to converge to a local maximum of the information, as required by the original IB principle. Moreover, the time and space complexity are significantly improved. We apply this algorithm to unsupervised document classification. In our evaluation, on small and medium size corpora, the sIB is found to be consistently superior to all the other clustering methods we examine, typically by a significant margin. Moreover, the sIB results are comparable to those obtained by a supervised Naive Bayes classifier. Finally, we propose a simple procedure for trading cluster's recall to gain higher precision, and show how this approach can extract clusters which match the existing topics of the corpus almost perfectly.

*Empirical Analysis of Predictive Algorithms for Collaborative Filtering*, by J. Breese, et al., Technical Report MSR-TR-98-12, revised October 1998, of Microsoft Research, Microsoft Corp., describes collaborative filtering or recommender systems use a database about user preferences to predict additional topics or products a new user might like. This paper describes several algorithms designed for this task, including techniques based on correlation coefficients, vector-based similarity computations, and statistical Bayesian methods. We compare the predictive accuracy of the various methods in a set of representative problem domains. We use two basic classes of evaluation metrics. The first characterizes accuracy over a set of individual predictions in terms of average absolute deviation. The second estimates the utility of a ranked list of suggested items. This metric uses an estimate of the probability that a user will see a recommendation in an ordered list.

*Model-Based Clustering and Visualization of navigation Patterns on a Web Site*, by I. Cadez, et al., Technical Report MSR-TR-00-18, revised September 2001, Microsoft Research, Microsoft Corp., describes a new methodology for visualizing navigation patterns on a Web site. In the approach described, site users are first partitioned into clusters such that only users with similar navigation paths through the site are placed into the same cluster. Then, for each cluster, these paths are displayed for users within that cluster. The clustering approach employed is a model based (as opposed to distance based) and partitions users according to the order in which they request Web pages. In particular, users are clustered by learning a mixture of first-order Markov models using the Expectation-Maximization algorithm. The algorithm scales linearly with both number of users and number of clusters, and the implementation easily handles millions of users and thousands of clusters. The paper describes the details of the technology and a tool based on it called Web-CANVAS.

*A Multi-Agent TV Recommender* (2001), by K. Kurapati, et al., In Proceedings of the UM, available on the World Wide Web at citeseer.ifi.unizh.ch/476785.html, describes that Personal Television is here via the advent of a new class of devices called personal video recorders (PVRs). These recorders change the user task from (a) selecting a specific channel to watch from the 100+ available channels to (b) finding something "good" to record from the 10,000+ shows broadcast each week. Recommender systems, such as the one described in this paper, will help track users' preferences and aid users in choosing shows to record. This paper advances a multi-agent TV recommender system that encapsulates three user information streams—implicit view history, explicit preferences, and feedback information on specific shows—into adaptive agents and generates program recommendations for a TV viewer. The system has been tested in various agent combinations with real users drawn from a wide variety of living conditions. The combination of implicit and explicit agents seems to work best in the framework presented.

*TiVo: Making Show Recommendations Using a Distributed Collaborative Filtering Architecture*, by K. Ali, et al., published as part of KDD 2004, Aug. 22-25, 2004, Seattle, Wash., Copyright 2004, ACM, describes the TiVo television show collaborative recommendation system which has been fielded in over one million TiVo clients for four years. Over this install base, TiVo currently has approximately 100 million ratings by users over approximately 30,000 distinct TV shows and movies. TiVo uses an item-item (show to show) form of collaborative filtering which obviates the need to keep any persistent memory of each user's viewing preferences at the TiVo server. Taking advantage of TiVo's client-server architecture has produced a novel collaborative filtering system in which the server does a minimum of work and most work is delegated to the numerous clients. Nevertheless, the server-side processing is also highly scalable and parallelizable. Although we have not performed formal empirical evaluations of its accuracy, internal studies have shown its recommendations to be useful even for multiple user households. TiVo's architecture also allows for throttling of the server so if more server-side resources become available, more correlations can be computed on the server allowing TiVo to make recommendations for niche audiences.

*The Information Bottleneck Method*, by Tishby et al., defines relevant information in a signal $x \in X$ as being the information that this signal provides about another signal $y \in Y$. Examples include the information that face images provide about the names of the people portrayed, or the information that speech sounds provide about the words spoken. Understanding the signal x requires more than just predicting y, it also requires specifying which features of X play a role in the prediction. The problem is formalized as that of finding a short code for X that preserves the maximum information about Y. That is, the information that X provides about Y is squeezed through a 'bottleneck' formed by a limited set of codewords $\tilde{X}$. This constrained optimization problem can be seen as a generalization of rate distortion theory in which the distortion measure $d(x, \tilde{x})$ emerges from the joint statistics of X and Y. The approach yields an exact set of self-consistent equations for the coding rules $X \to \tilde{X}$ and $\tilde{X} \to Y$. Solutions to these equations can be found by a convergent re-estimation method that generalizes the Blahut-Arimoto algorithm.

*Biclustering Algorithms for Biological Data Analysis: A Survey*, by S. Madiera, et al., published in IEEE/ACM Transactions on Computational Biology and Bioinformatics, Volume 1, Issue 1 (January 2004), pages 24-45, describes how a large number of clustering approaches have been proposed for the analysis of gene expression data obtained from microarray experiments. However, the results from the application of standard clustering methods to genes are limited. This limitation is imposed by the existence of a number of experimental conditions where the activity of genes is uncorrelated. A similar limitation exists when clustering of conditions is performed. For this reason, a number of algorithms that perform simultaneous clustering on the row and column dimensions of the data matrix have been proposed. The goal is to find submatrices, that is, subgroups of genes and subgroups of conditions, where the genes exhibit highly correlated activities for every condition. In the Madiera, et al. paper, they refer to this class of algorithms as biclustering. Biclustering is also referred in the literature as coclustering and direct clustering, among others names, and has also been used in fields such as information retrieval and data mining. In this comprehensive survey, they analyze a large number of existing approaches to biclustering, and classify them in accordance with the type of biclusters which can be found, the patterns of biclusters that are discovered, the methods used to perform the search, the approaches used to evaluate the solution, and the target applications.

The following patents and patent applications are also believed to reflect the state of the art:

U.S. Pat. No. 5,534,911 to Levitan;
U.S. Pat. No. 6,774,926 to Ellis et al.;
US 2005/0198689 of Marsh;
US 2005/0185933 of Marsh;
US 2003/0236708 of Marsh;
US 2003/0233241 of Marsh;
US 2003/0226145 of Marsh;
US 2003/0195863 of Marsh;
US 2003/0084450 of Thurston et al.;
US 2004/0083490 of Hane;
EP 0924927 of Matsushita Electric Industrial Co. Ltd.;
WO 01/24047 of Koninklijke Philips Electronics N.V.;

WO 02/13521 of Diego Inc.;
WO 02/44880 of Kikinis;
WO 02/07433 of Koninklijke Philips Electronics N.V.;
WO 03/050670 of Predictive Networks, Inc.; and
WO 2004/029750 of Scientific Atlanta, Inc.

The disclosures of all references mentioned above and throughout the present specification, as well as the disclosures of all references mentioned in those references, are hereby incorporated herein by reference.

SUMMARY OF THE INVENTION

The present invention seeks to provide an improved method and system for navigation through live and recorded content in an electronic program guide environment.

There is thus provided in accordance with a preferred embodiment of the present invention a method for rating programs, the method including receiving a sample of viewing logs from a plurality of set top boxes (STBs), determining, from the sample of viewing logs, at least groups of viewers sharing similar interests, and groups of programs sharing similar audience, computing time dynamics of rating distribution for the groups of viewers and the groups of programs, and incorporating at least one of the following into broadcast metadata the time dynamics of rating distributions of the groups of viewers for each of the groups of programs, rating distributions of the groups of viewers for each of the groups of programs marginalized by time, rating distributions of the groups of viewers for each program marginalized by time, relative sizes of each group of viewers, and a mapping of each program to groups of programs, thereby making the broadcast metadata available to the plurality of STBs for use in computing ratings.

Further in accordance with a preferred embodiment of the present invention a result of the computing is broadcast to the plurality of STBs.

Still further in accordance with a preferred embodiment of the present invention a result of the incorporating the time dynamics of rating distributions is broadcast to the plurality of STBs.

Additionally in accordance with a preferred embodiment of the present invention a result of the incorporating the marginal distributions is broadcast to the plurality of STBs.

Moreover in accordance with a preferred embodiment of the present invention the groups of viewers and groups of programs are determined using a bi-clustering method.

There is also provided in accordance with another preferred embodiment of the present invention a method for determining confidence in viewer presence near a set top box (STB), the method including assigning a level of confidence in viewer presence to be 100% each time any type of signaling activity is detected, and smoothly decreasing the level of confidence in viewer presence over time.

Further in accordance with a preferred embodiment of the present invention the signaling includes electrical appliance remote control signaling.

Still further in accordance with a preferred embodiment of the present invention the signaling includes TV remote control signaling.

Additionally in accordance with a preferred embodiment of the present invention the signaling includes air conditioning signaling.

Moreover in accordance with a preferred embodiment of the present invention the signaling includes infrared signaling.

Further in accordance with a preferred embodiment of the present invention the signaling includes Bluetooth signaling.

Still further in accordance with a preferred embodiment of the present invention the signaling includes FM signaling.

There is also provided in accordance with still another preferred embodiment of the present invention a method for determining confidence in viewer presence near a set top box (STB), the method including initially setting a level of confidence in viewer preference to be "undefined", whenever any type of signaling activity is detected, assigning a level of confidence in viewer presence to be 100%, and whenever the level of confidence in viewer preference is less than or equal to 100% and more than 0%, smoothly decreasing the level of confidence in viewer presence over time.

Further in accordance with a preferred embodiment of the present invention the signaling includes electrical appliance remote control signaling.

Still further in accordance with a preferred embodiment of the present invention the signaling includes TV remote control signaling.

Additionally in accordance with a preferred embodiment of the present invention the signaling includes air conditioning signaling.

Moreover in accordance with a preferred embodiment of the present invention the signaling includes infrared signaling.

Further in accordance with a preferred embodiment of the present invention the signaling includes Bluetooth signaling.

Still further in accordance with a preferred embodiment of the present invention the signaling includes FM signaling.

There is also provided in accordance with still another preferred embodiment of the present invention a method for determining confidence in viewer presence near a set top box (STB), the method including receiving a first remote control signal at the STB, assigning a level of confidence in viewer presence to be 100% in response to receiving the first remote control signal, smoothly decreasing the level of confidence in viewer presence over time, receiving a second remote control signal at the STB, and setting the level of confidence in viewer presence to be 100%.

Further in accordance with a preferred embodiment of the present invention the decreasing includes exponential decreasing.

Still further in accordance with a preferred embodiment of the present invention the level of confidence in viewer presence drops at the end of a broadcast program.

Additionally in accordance with a preferred embodiment of the present invention the signaling includes electrical appliance remote control signaling.

Moreover in accordance with a preferred embodiment of the present invention the signaling includes TV remote control signaling.

Further in accordance with a preferred embodiment of the present invention the signaling includes air conditioning signaling.

Still further in accordance with a preferred embodiment of the present invention the signaling includes infrared signaling.

Additionally in accordance with a preferred embodiment of the present invention the signaling includes Bluetooth signaling.

Moreover in accordance with a preferred embodiment of the present invention the signaling includes FM signaling.

There is also provided in accordance with still another preferred embodiment of the present invention a method for determining viewer preference, the method including collecting a sample of viewing statistics, analyzing the collected statistics and determining groups of viewers sharing similar interests, estimating a relative size of each group of viewers, broadcasting a typical rating profile of each group of viewers, thereby enabling a set top box (STB) to determine with which group or groups of viewers the STB shares interest, assigning a statistics report-back probability to particular members of each group of viewers, the statistics report-back probability of a member of a group of viewers being in inverse proportion to the size of the group of viewers, receiving a plurality of reported-back samples, and weighting each one of the plurality of reported-back samples according to a size of a viewer group associated with the one sample.

Further in accordance with a preferred embodiment of the present invention the collecting occurs at a broadcast headend.

Still further in accordance with a preferred embodiment of the present invention the receiving occurs at a broadcast headend.

Additionally in accordance with a preferred embodiment of the present invention the weighting occurs at a broadcast headend.

There is also provided in accordance with still another preferred embodiment of the present invention a method for program zapping on a set top box (STB), the method including collecting viewing statistics, reporting the viewing statistics to a broadcast headend, receiving, from the broadcast headend, a list including a plurality of viewer groups and data associated with each of the plurality of viewing groups, the data corresponding to data found in the viewing statistics, determining, by comparing the viewing statistics with data associated with each of the plurality of viewing groups, to which at least one viewing group the STB belongs, receiving, from the broadcast headend, a list including a plurality of programs preferred by members of the at least one viewing group, tuning to one of the programs included in the list including a plurality of programs when the STB is tuned to a next program.

Further in accordance with a preferred embodiment of the present invention the viewing statistics include at least an indication of remote control activity, programs viewed, and duration of viewing time for the programs viewed.

There is also provided in accordance with still another preferred embodiment of the present invention a method for program zapping on a set top box (STB), the method including collecting viewing statistics, reporting the viewing statistics to a broadcast headend, receiving, from the broadcast headend, a list including a plurality of viewer groups and data associated with each of the plurality of viewing groups, the data corresponding to data found in the viewing statistics, determining, by comparing the viewing statistics with data associated with each of the plurality of viewing groups, to which at least one viewing group the STB belongs, receiving, from the broadcast headend, a list including a plurality of programs preferred by members of the at least one viewing group to which the set top box does not belong, and tuning to one of the programs included in the list including a plurality of programs when the STB is tuned to a next program.

Further in accordance with a preferred embodiment of the present invention the viewing statistics include at least an indication of remote control activity, programs viewed, and duration of viewing time for the programs viewed.

There is also provided in accordance with still another preferred embodiment of the present invention a method for program zapping on a set top box (STB), the method including collecting viewing statistics, reporting the viewing statistics to a broadcast headend, receiving, from the broadcast headend, a list including a plurality of viewer groups and data associated with each of the plurality of viewing groups, the data corresponding to data found in the viewing statistics, determining, by comparing the viewing statistics with data associated with each of the plurality of viewing groups, to which at least one viewing group the SIB belongs, receiving, from the broadcast headend, a ranked list including a plurality of programs preferred by members of the at least one viewing group, the ranking indicating levels of preference by members of the at least one viewing group, performing a search at the STB for programs, the programs being associated with metadata including the search term, and listing results of the search according to rank order.

Further in accordance with a preferred embodiment of the present invention the viewing statistics include at least an indication of remote control activity, programs viewed, and duration of viewing time for the programs viewed.

Still further in accordance with a preferred embodiment of the present invention the search includes a context based search.

Additionally in accordance with a preferred embodiment of the present invention the search includes a viewing history based search.

There is also provided in accordance with still another preferred embodiment of the present invention a method for program zapping on a set top box (STB), the method including collecting viewing statistics, reporting the viewing statistics to a broadcast headend, receiving, from the broadcast headend, a list including a plurality of viewer groups and data associated with each of the plurality of viewing groups, the data corresponding to data found in the viewing statistics, determining, by comparing the viewing statistics with data associated with each of the plurality of viewing groups, to which at least one viewing group the STB belongs, receiving, from the broadcast headend, a ranked list including a plurality of programs preferred by members of the at least one viewing group, the ranking indicating levels of preference by members of the at least one viewing group, requesting a recommendation for a program, receiving a plurality of recommendations for a plurality of programs, and displaying the recommendations according to rank order.

Further in accordance with a preferred embodiment of the present invention the viewing statistics include at least an indication of remote control activity, programs viewed, and duration of viewing time for the programs viewed.

Still further in accordance with a preferred embodiment of the present invention the recommendations are recommendations provided by a third party recommender.

Additionally in accordance with a preferred embodiment of the present invention the third party recommender includes a professional provider of ratings.

Moreover in accordance with a preferred embodiment of the present invention the third party recommender includes a peer recommender.

Further in accordance with a preferred embodiment of the present invention the third party recommender includes a community of recommenders.

BRIEF DESCRIPTION OF THE DRAWINGS

The present invention will be understood and appreciated more fully from the following detailed description, taken in conjunction with the drawings in which:

FIG. 2 is an exemplary simplified timeline showing probability that a viewer is near a television over time, as implemented within the system of FIG. 1;

FIG. 3 is a diagram of a preferred method of analysis of states of viewer presence, as implemented within the system of FIG. 1;

DETAILED DESCRIPTION OF A PREFERRED EMBODIMENT

Figure 1:
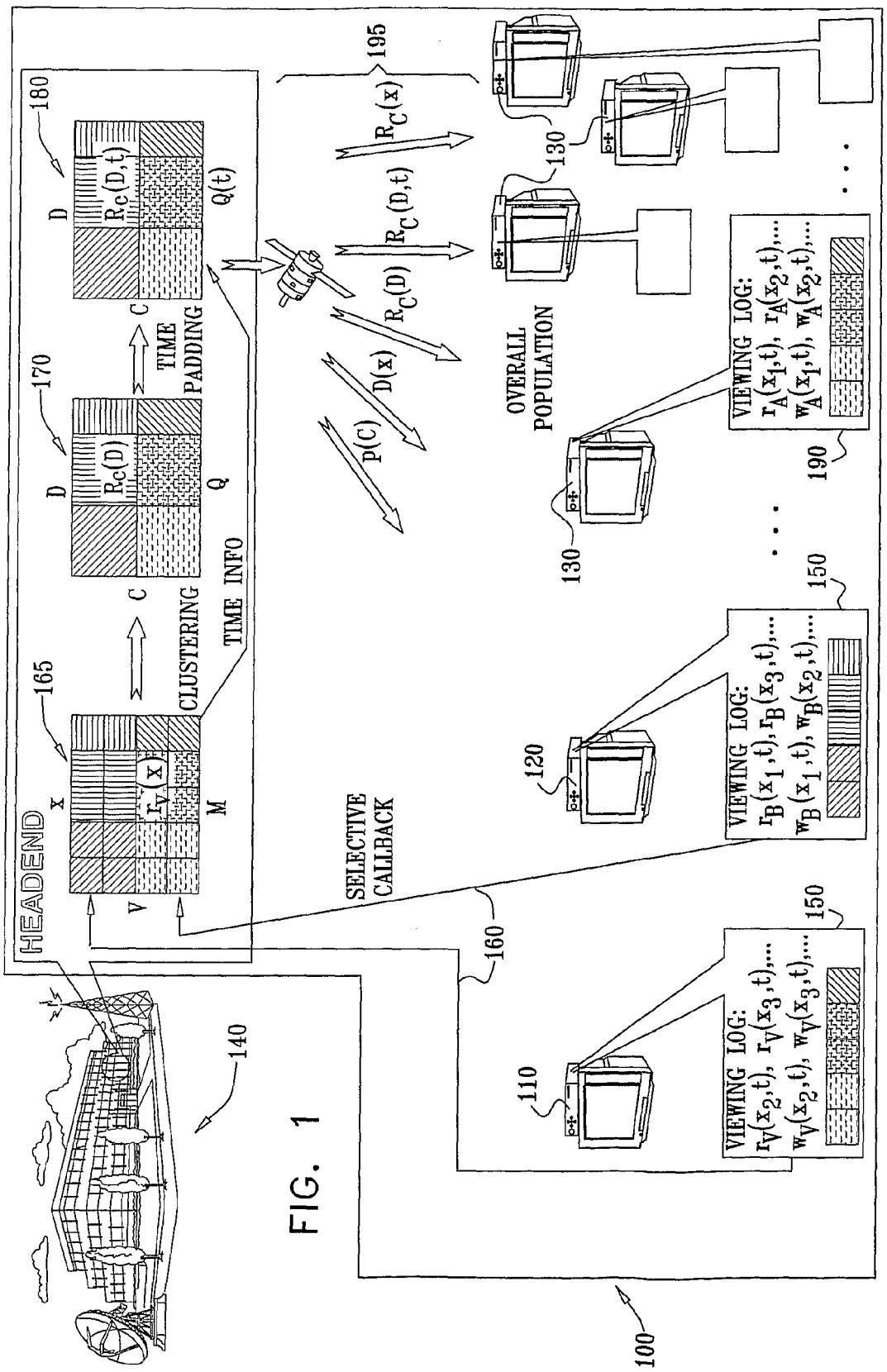
FIG. 1 is a simplified illustration of an end-to-end model of a three dimensional system for rating, ranking, and recording television programs constructed and operative in accordance with a preferred embodiment of the present invention.

Reference is now made to FIG. 1, which is a simplified illustration of an end-to-end model of a three dimensional system for rating, ranking, and recording television programs constructed and operative in accordance with a preferred embodiment of the present invention. The system 100 of FIG. 1 comprises a plurality of set top boxes (STBs) 110, 120, 130 and a broadcast headend 140. The plurality of STBs 110, 120, 130 are in two-way communication with the broadcast headend 140.

A preferred method of operation of the system 100 of FIG. 1 is now described.

Program Rating Definition

Given a television program x and a viewer V, a program rating $r_V(x)$ preferably reflects the measure of interest of V in x. It is appreciated that there exist two types of ratings:

explicit ratings, comprising ratings directly provided by the viewer, for example and without limiting the generality of the foregoing, a viewer provided rating on a scale of one to five stars; and implicit ratings, comprising ratings computed based on implicit observations as, for example and without limiting the generality of the foregoing, measuring a duration of time of watching of a particular program.

For explicit ratings, a method of voting or rating is preferably provided to the viewer. For implicit ratings, a possibility to obtain observations is required. For example and without limiting the generality of the foregoing, the ability to determine to which program a STB is tuned, preferably with time precision of at least an order of minutes, is required. Accordingly, in the system of FIG. 1, within limits of available precision, it is preferably possible to determine which television program a given STB among the plurality of STBs 130 was tuned to at each specific moment of time, thereby determining an implicit rating.

In a television environment, implicit rating schemes are preferable to explicit rating schemes, as implicit rating schemes are typically less disturbing to the viewer.

Computation of Implicit Program Rating

In order to enable computation of implicit program rating, it is preferable to determine to which program an STB is tuned, preferably with at least 5 minutes precision in time (and finer time resolution is more preferable). A preferred method for performing such determination of implicit program rating is presented below.

It is assumed that the more interesting a specific television program is for the viewer, the more time the viewer will spend watching the specific television program. Accordingly, program rating $r_V(x)$ is defined as a fraction of time program x was watched by viewer V compared to the total length of x.

Accordingly, let T(x) be the total length of television program x and let $T_V(x)$ the total time V was viewing x. Then, V's rating of x, $r_V(x)$ is preferably defined as:

$$r_V(x) = \frac{T_V(x)}{T(x)}$$

In a case when the viewer starts watching a first program, switches to a second program, and returns back to the first program, the total net time spent on the first program is preferably computed.

In a case of repeated viewing of retransmissions of the same program, total viewing time is summed up, making it possible for the rating $r_V(x)$ to be greater than 1. In a case when viewing started in a middle of the program and lasted a short time (for instance, less than 5 minutes), the rating $r_V(x)$ is preferably ignored since it is impossible to know if the viewer did not like the program or if it was just inappropriate to watch the program from the middle. In a case when viewing started in the middle of the program and lasted for a significant amount of time (for instance, more than 5 minutes) the rating of the program $r_V(x)$ is preferably included with appropriate normalization. Specifically, T(x) will be taken to be the time from the moment when watching started until the end of the program.

It is appreciated that the definition of program rating as $r_V(x)$ is based on several assumptions, among them, at least the following:

Assumption 1: all programs are of uniform interest; and
Assumption 2: it is worthwhile to watch the program from the beginning of the program to the end of the program.

Nevertheless, some types of programs may violate the aforementioned assumptions. For example and without limiting the generality of the foregoing, concerning assumption 1, a particular news issue may be of non-uniform interest to certain audiences. For instance, a start of a news broadcast with a bulletin concerning a breaking news story or a weather report at the end of the news broadcast may be of high interest, but the middle sections of the news broadcast may be of moderate or even low interest. Alternatively, concerning assumption 2, on a fashion channel, watching patterns may be completely unrelated to program boundaries.

In cases when assumption 1 is violated, the program is preferably segmented into segments of approximately uniform interest and a rating of each segment evaluated independently of the rest. In a case where assumption 2 is violated, alternative ratings schemes are preferably used, for example, channel rating. A channel rating preferably comprises an average probability of the viewer being tuned to the channel at a specific time.

Viewer Presence Model

Reference is now additionally made to FIG. 2, which is an exemplary simplified timeline showing a probability that a viewer is near a television over time, as implemented within the system of FIG. 1.

Reference is also now additionally made to FIG. 3, which is diagram of a preferred method of analysis of states of viewer presence, as implemented within the system of FIG. 1.

It is appreciated that one cannot be certain if the viewer was in front of a TV watching the program to which the TV was tuned. The only moments when it is certain that the viewer was near the TV are those moments when infrared activity, typically remote control activity, was detected. In between the moments of remote control activity, a probabilistic model is built, presented in FIGS. 2 and 3, the model indicating probability of viewer presence in front of the TV. The output of that model is then preferably used to define a level of confidence in observed ratings. The level of confidence is preferably used as a weighting of ratings $r_V(x)$, $r_V(x)$ being computed as explained above. It is appreciated that a greater level of confidence in user presence results in a higher weight for an observed rating.

The timeline of FIG. 2 indicates the duration of two television programs, denoted Program 1 and Program 2. At a given time during Program 1 a first remote control event 410 occurs. At the time of the first remote control event 410, the probability that the viewer is near the TV is 100%. Confidence in viewer presence near the TV then exponentially smoothly decreases over time. At the time of the end of program 1, confidence in the presence of the user is assumed to drop even lower, and to continue to smoothly decrease. At a given time during Program 2, a second remote control event 420 occurs. At the time of the second remote control event 420, the probability that the viewer is near the TV jumps again to 100%. After the second remote control event 420, confidence in viewer presence again exponentially smoothly decreases. At another time during Program 2, a third remote control event 430 occurs. At the time of the third remote control event 430, the probability that the viewer is near the TV jumps again to 100%.

It is appreciated that, in the above discussion, any appropriate signaling event may indicate viewer presence. Furthermore, any remote control event, regardless of remote control signal carrier (infrared, Bluetooth, FM, and so forth), preferably is indicative of viewer presence.

Referring specifically to FIG. 3, viewer presence is modeled with a two state Hidden Markov Model (see *A Tutorial on Hidden Markov Models and Selected Applications in Speech Recognition*, by L. Rabiner, referred to above, for a review of Hidden Markov Models). A first state, "viewer present", hereinafter $s_p$, and a second state "viewer absent", hereinafter sa, are defined. A time scale is divided into relatively short time intervals (e.g. 1 or 5 minutes): $t_1, t_2, t_3, \ldots$. A remote control event is then denoted $a_i$, wherein the remote control was activated at time $t_i$. The following three parameters of the model are defined as follows:

α probability of "leaving", or switching from "viewer present" to "viewer absent" during a single time interval;

β probability of "returning", or switching from "viewer absent" to "viewer present" during a single time interval; and γ probability of activating the remote control (while being in "viewer present" state) during a single time interval.

A preferred method for learning the parameters α, β and γ is described in *A Tutorial on Hidden Markov Models and Selected Applications in Speech Recognition*, by L. Rabiner, referred to above. Given the parameters α, β and γ and a new observation sequence of remote control activation events the probability of viewer presence at any time interval $t_i$ is then preferably evaluated according to another appropriate standard method, also found in Rabiner. L. Rabiner is hereby incorporated herein by reference.

After computing the probability of viewer presence, the probability of viewer presence is then used to weight other observations collected at the STB. Suppose some program x was tuned to for a certain period of time at the STB of some viewer v and obtained a rating $r_V(x)$. Nevertheless, a high level of doubt may exist as to whether V was really present all, or even any part of the time, while program x was playing (for instance, no remote control activity may have been detected during the last two programs). Nonetheless, an average probability of viewer presence during the program may be computed using the viewer presence model presented above.

Accordingly, denoting the probability of viewer presence as $p_V(s_p,x)$, where "$s_p$" is the "viewer present" state, as defined above, then, for multiple viewers $V_1, V_2, \ldots, V_n$ the average rating of program x will be:

$$r(x) = \frac{\sum_{i=1}^{n} p_{v_i}(s_p, x) r_{v_i}(x)}{\sum_{i=1}^{n} p_{v_i}(s_p, x)}$$

That is, more weight is preferably given for viewer rating when there is a higher level of confidence in viewer presence.

The inventors of the present invention are of the opinion that it is likely that the probabilities of "leaving", α, "returning", β, and activating the remote control, γ, can vary in different situations. For example, the probability of "leaving", α, may be higher when program changes comparing to probability of "leaving" during a program (this is reflected in the sudden drop of confidence in viewer presence at the end of program 1 in FIG. 2); the probability of "returning", β, may be lower in the middle of the night and probability of activating the remote control may be higher after a program finishes. It is possible, therefore, to introduce multiple instances of the parameters α, β and γ for different situations.

Viewing Log Definition

The term "Viewing Log", in all of its grammatical forms, as used in the present specification and claims is understood to refer to a sequence of ratings obtained from a viewer for a set of programs watched. In FIG. 1, viewing logs 150, 190 are depicted as a plurality of squares with various hatching patterns. The ratings comprise implicit ratings and/or explicit ratings, and, in some preferred embodiments of the present invention, the ratings are preferably accompanied by confidence parameters. Implicit ratings, explicit ratings, and confidence parameters are discussed in more detail below. In some preferred embodiments the ratings are preferably accompanied by time stamps. The time stamps are preferably explicitly supplied or extracted in any way from data comprised in the viewing logs 150. Analysis of ratings accompanied by time stamps is hereinafter referred to as "time-dependent rating analysis". Analysis of ratings not comprising time stamps is hereinafter referred to as static rating analysis. Any result of statistical viewing log processing, for example and without limiting the generality of the foregoing, determining an average rating for programs on a given channel, is hereinafter referred to as "viewing statistics".

It is preferable for each STB to collect its local viewing log for a period of at least one week, and preferably more than one week. STBs which do not store local viewing statistics will be limited in utilization of various features of the present invention, as described below.

Preferred Method of Operation of the System of FIG. 1

A subset of viewing logs 150, preferably comprising viewing logs from about 5,000 STBs 110, 120 are preferably reported to and collected at the broadcast headend 140. The viewing logs 150 are preferably completely anonymous. It is, however, required that it is possible to identify, for example and without limiting the generality of the foregoing, by some anonymous, but unique ID, significant portions of logs, comprising at least 20 ratings on average. It is appreciated that by identifying significant portions of logs with an anonymous unique ID, it is thereby possible to determine that the identified portions of the logs come from the same viewer. By making the logs anonymous, privacy is thereby not violated.

The process of collection of logs is continuous, in order to keep the system up to date. Specifically, new logs are collected and old logs are purged. The new logs need not to be collected from the same subset of people from which the old logs were collected. A collected log need not contain a complete viewing history of a viewer—only the latest one week to one month period is sufficient. Any appropriate method of log collection may be utilized, i.e. log collection may comprise incremental updates, snapshots, or any other collection method well known in the art. Furthermore, collected logs are preferably not renewed all at once, but rather gradual renewal is possible and even preferable. For example and without limiting the generality of the foregoing, 10% of the log data (the oldest one) may be replaced during a one day period or a one week period. The only requirement is that on average, each viewing log preferably contains at least 20 ratings. Larger quantities of ratings in collected logs provide more data, and therefore are more beneficial.

The collected logs are organized at the headend within a matrix M 165 of viewers by programs with ratings being the matrix entries. The rows of matrix M 165 are denoted by v (for viewers), and the columns are denoted by x (for programs) and the ratings (the matrix entries) are denoted by $r_v(x)$. It is appreciated that matrix M 165 is an extremely sparse matrix, as each viewer watches (and thus implicitly rates) only a small fraction of all available programs. A process whereby missing entries of the matrix M 165 are filled in corresponds to predicting personal ratings. A preferable way of predicting personal ratings is described below.

To predict unknown ratings, the overall viewer population is preferably partitioned into a relatively small number (about 40) of relatively large groups of people (on average 1/40 of the population). Members of each group preferably comprise members with similar watching interests, as described below. For a group of viewers, it is preferable that the interests of the group are defined as a distribution of ratings that group members gave to different types of programs. In addition to grouping of viewers by their interests, programs are preferably simultaneously grouped by audience similarity.

In order to produce a satisfactory partition of viewers into groups of viewers and a satisfactory partition of programs into groups of programs, a biclustering method is preferably used. (See Madeira et al., cited above, for a survey of biclustering methods. Madeira et al. is incorporated herein by reference.) The biclustering method preferably finds a compact representation, Q 170, of original matrix M 165. The compact representation Q 170 preferably comprises a matrix of groups of viewers C by groups of programs D, the matrix Q 170 holding distributions of ratings $R_C(D)$. The distributions of ratings $R_C(D)$ preferably comprise ratings members of viewer's group C gave to programs in program group D. Those skilled in the art will appreciate that a quality of the matrix Q 170 may preferably be evaluated by a size of Q 170 (a number of viewer groups C and program groups D, wherein, the number of viewer groups C and program groups D is preferably between 10 and 100, wherein a smaller number is preferable) and sharpness of the distributions $R_C(D)$ (those skilled in the art will appreciate that the sharper the distributions $R_C(D)$, the better). Back-projection of the distributions $R_C(D)$ onto the matrix M 165 (the ratings for viewers V belonging to a viewer group C for programs x belonging to a programs group D are predicted using the ratings distribution $R_C(D)$) achieve good rating prediction (as per Madeira et al.).

Incorporation of time information in rating analysis is now discussed. For any group of viewers C and for any group of programs D it is possible to determine from the viewing logs 150 at what time of day and time of week viewers in the group viewers C prefer to see programs of a given group D. Such an analysis preferably produces a matrix Q(t) 180 (FIG. 1). The program ratings are thus preferably made time dependent, thereby leading to a three dimensional (viewers, programs, and time) rating structure $R_C(D,t)$. The three dimensional rating structure preferably reflects natural day and week cycles of watching preferences.

A broadcast of any program x preferably includes as a part of program x's scheduling metadata 195:
a distribution of ratings program x received within the different viewer's groups $R_C(x)$;
preferred viewing time patterns for each viewer's group and a program's group, $R_C(D,t)$; and
a probability of affiliation of x to each program group D, D(x) (FIG. 1).

Furthermore, the broadcast metadata of program x also preferably comprises probabilities of each group p(C) and marginal distributions $R_C(D)$ (FIG. 1).

Each STB 130 is able to determine with which group C STB 130 shares interests. Determination by a STB of which group C the STB shares interests is preferably performed by comparing the STB's viewing log 190 with broadcast ratings $R_C(x)$. The broadcast ratings $R_C(x)$ are thereinafter preferably used to rank programs a viewer associated with the STB has not yet seen.

The viewer typically may share interests with several viewer groups. In such a case the influence of each group $p(C_i|V)$ (corresponding to the probability of viewer V belonging to/sharing interests with viewers group C) is preferably determined as follows: $p(C_i|V)$ is preferably initialized to the broadcast value of $p(C_i)$. After each new rating $r_V(x)$ is obtained, $p(C_i|V)$ is preferably updated according to the following rule:

$$p(C_i \mid V, r_V(x)) = \frac{p(C_i|V)p(r_V(x)|C_i)^{\tau w_V(x)}}{\sum_k p(C_k|V)p(r_V(x)|C_k)^{\tau w_V(x)}},$$

where $p(C_i|V)$ is the influence prior to update, $w_V(x)$ is the confidence in the observation of $r_V(x)$ (as discussed above, with reference to FIGS. 2-3) and τ comprises an additional parameter that enables controlling aging of previously observed ratings, where 0<τ<1.

It is assumed that programs within the same group of programs D share the same day and same week preferred viewing time pattern for any given group of viewers. Therefore, $R_{Ci}(x,t) \approx \mu R_{Ci}(D_j,t)$, where μ gives relative position of x within the programs cluster $D_j$ and is determined by: $\mu = ER_{Ci}(x)/ER_{Ci}(D_j)$, with $ER_{Ci}(x)$ and $ER_{Ci}(D_j)$ being the average ratings (E standing for expectation) that members of $C_i$ gave to x and programs within the program group $D_j$ respectively.

Figure 4:
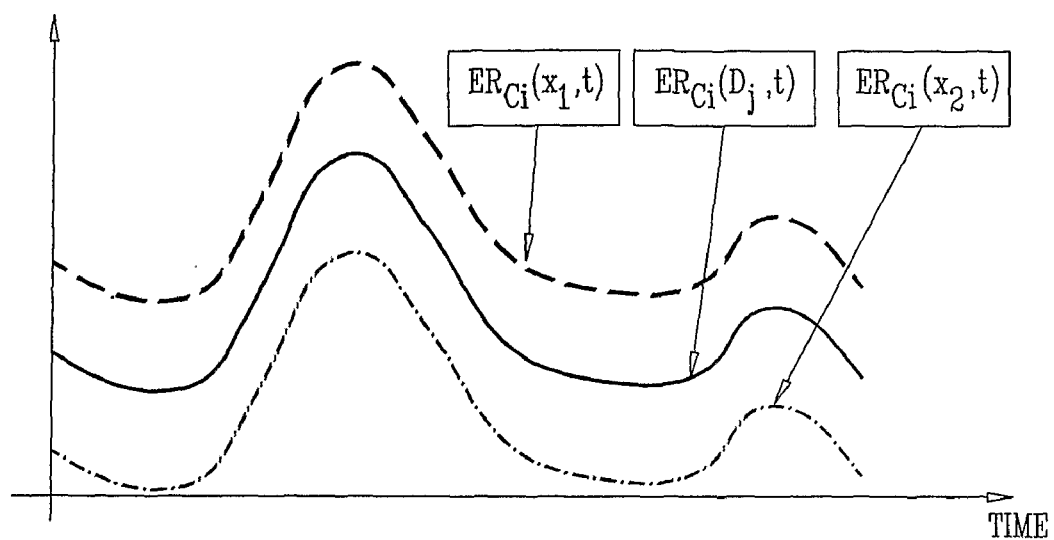
FIG. 4 is a graphical example of preferred viewing time pattern within the system of FIG. 1.

Reference is now made to FIG. 4, which is a graphical example of preferred viewing time pattern within the system of FIG. 1. FIG. 4 depicts an example of two programs, $x_1$ and $x_2$, belonging to a program group $D_j$. The preferred viewing time pattern for the program group $D_j$ for viewer group $C_i$ is depicted by a solid line in FIG. 4. The preferred viewing time patterns for program $x_1$ and program $x_2$ for $C_i$ mimic the preferred viewing time pattern of $D_j$ for $C_i$ (depicted as dashed lines in FIG. 4). The average rating of $x_1$ is higher than the average rating of programs in $D_j$, while for $x_2$ the average rating is lower. The gap between the curves program $x_1$ and program $x_2$ (both dashed lines) is determined by the ratio: $ERC_i(x)/ERC_i(D_j)$.

There are several reasons and advantages for the method described in FIG. 4:

It may be hard or even impossible to determine preferred viewing time patterns for single programs, especially for single programs that are not viewed much (resulting in insufficient statistics). On the other hand, determination of preferred viewing time patterns for program groups is easy and robust; and At the level of individual STBs amounts of statistics that may be collected are typically quite small. Accordingly, as will be described below, the amount of statistics on an individual level becomes particularly significant.

The method described herein enables centralized control over groups of programs. For example and without limiting the generality of the foregoing, it is possible to decrease or raise ratings of certain types of programs for certain groups of population manually by manipulation with $p_C(D,t)$ (a non-limiting example being programming appropriate for national holidays or mourning days).

A preferred method for determining time dependent ratings is now described. Denoting distribution over rating probabilities for a given program x for a given viewer V at a given time t as p(r|V,x,t), gives:

$$p(r \mid V, x, t) = \sum_i p(C_i|V)p(r|C_i, x, t)$$

$$= \sum_i p(C_i \mid V) \sum_j p(D_j|x)p(r|C_i, D_j, x, t)$$

where $p(C_i|V)$ comprises an affiliation of V to viewer group $C_i$. Computation of $p(C_i|V)$ was described above. $p(D_j x)=D_j(x)$ is a probability that x belongs to program group $D_j$.

According to the assumptions stated above:

$$p(r \mid C_i, D_j, x, t) \approx \frac{Ep(r \mid C_i, x)}{Ep(r \mid C_i, D_j)} p(r \mid C_i, D_j, t)$$

where $p(r \mid C_i, x) = R_{Ci}(x)$, $p(r \mid C_i, D_j)$
$= R_{Ci}(D_j)$, and $p(r \mid C_i, D_j, t)$
$= R_{Ci}(D_j, t)$.

Prediction of Program Rating for Completely New Programs

In the method described above, a rating was computed for programs broadcast multiple times, preferably for programs for which a feedback is already known from at least a subset of a viewer population comprising viewers which already saw the rated programs. A completely new program, or, alternatively, a program for which an insufficient amount of rating statistics was collected, may be associated with an existing program group by comparing program associated metadata with the metadata of the program group members. The rating and preferred viewing time pattern of the new program may then preferably be extrapolated from the data of the associated program group.

Alternatively, the new program can be associated with one or more program groups utilizing an appropriate series links mechanism, well known in the art. For example and without limiting the generality of the foregoing, all chapters of a serialized broadcast of "Bleak House", by Charles Dickens, would be linked together as a series. Thus, if a statistical trend is noted that a particular group of viewers tended to watch chapters one and two of the serialized broadcast of "Bleak House", it is probable that predictions can be made regarding the likelihood of that particular group of viewers viewing chapters three and four of the serialized broadcast of "Bleak House".

For integration with platform and broadcaster promotions and third party recommendations, both platform and broadcaster and third parties are preferably represented as additional viewer groups. Influence of the viewer groups $p(C_i|V)$ can be either fixed or learned as with all other groups. Fixed influence of a special group is preferably utilized in cases where the TV platform or broadcaster wishes to promote certain products. Automatic detection by a STB of a custom group's influence is useful when a viewer frequently follows recommendations of a particular third party.

Figure 5:
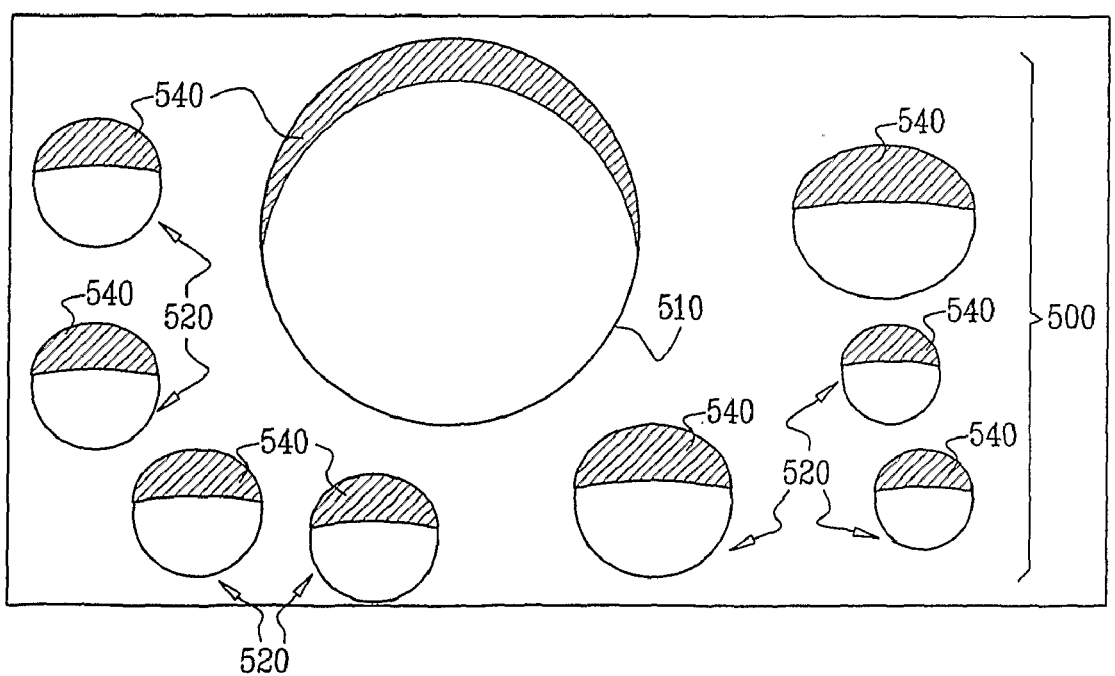
FIG. 5 is a simplified illustration depicting a preferred implementation of selective sampling, as implemented within the system of FIG. 1.

Reference is now made to FIG. 5, which is a simplified illustration depicting a preferred implementation of selective sampling, as implemented within the system of FIG. 1.

By the law of large numbers, the convergence of sampled statistics to actual values depends on the absolute number of the collected samples. Therefore, in order to obtain a required level of confidence (say 95%) in particular estimates, a certain number of samples (for example, 500 samples) are required. Those skilled in the art will appreciate that for a small cluster of viewers, 500 samples may be 40% of overall cluster members (represented by the smaller circles 520), and for a big cluster (represented by the large circle 510) 500 viewers may be only 10% of overall cluster members. In order to give equal service to both small and large clusters and at the same time not to flood the system 100 of FIG. 1 with unnecessarily large amounts of statistics, a selective sampling mechanism is employed. Selective sampling utilizes the fact that each STB "knows" the size of the cluster to which it belongs (as noted above, p(C) is broadcast). Members of larger clusters will therefore preferably report back to headend 140 (FIG. 1) with lower frequency than members of smaller clusters. At the headend 140 (FIG. 1), the weighing function described above is preferably reapplied to collected viewing logs in order to keep prior information on cluster sizes up to date.

It is appreciated that the broadcast headend 140 (FIG. 1) does not require a report back of viewing logs from all members of a given cluster once every given amount of days. Rather, the broadcast headend 140 (FIG. 1) requires that a random subset of a fixed size of viewer logs of a fixed size be reported back on any given day. Accordingly, each STB is required to report viewing activity comprised in the viewing log 150, 190 with a report back probability remaining in inverse proportion to the size of the cluster to which the STB belongs. Thus members of small clusters preferably report back more frequently and members of large clusters preferably report back less frequently.

The black portion 540 of each circle 510, 520 represents a group subset whose viewing habits were sampled according to the method of the system 100 of FIG. 1. For example and without limiting the generality of the foregoing, suppose that 1000 samples are needed from each group in order to have sufficient statistics to build a model for the group. If sampling occurs equally across groups (for example and without limiting the generality of the foregoing, every tenth viewer is sampled) large groups will be over-sampled and small groups will be under-sampled. But if sampling occurs in inverse proportion to group size (for example and without limiting the generality of the foregoing, every fifth viewer in small groups, every hundredth viewer in large groups), each group can be sampled in order to be equally represented at a desired resolution.

Figure 6:
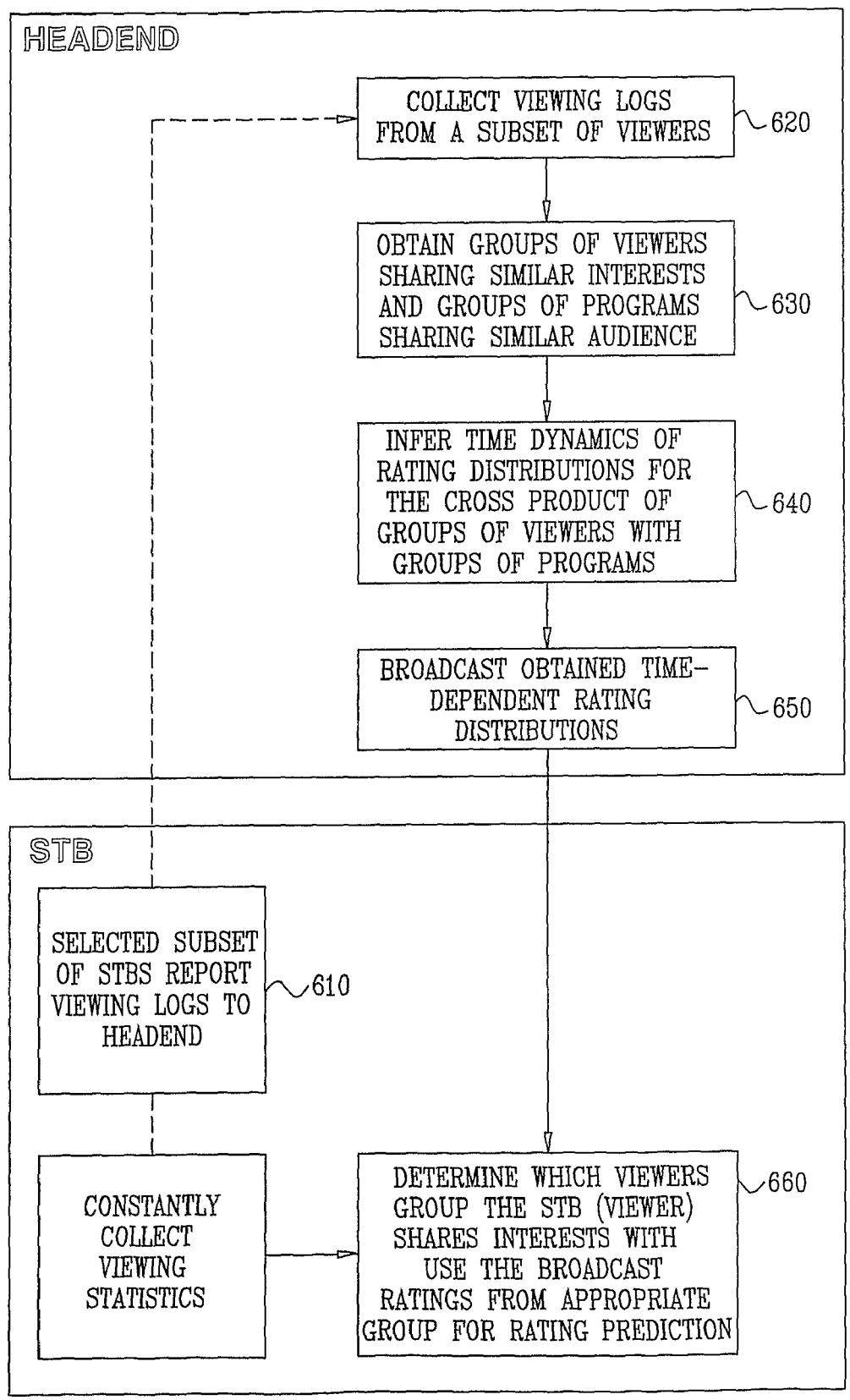
FIG. 6 is a flowchart diagram of a preferred method of operation of the system of FIG. 1.

Reference is now made to FIG. 6, which is a flowchart diagram of the preferred method of operation of the system of FIG. 1. The discussion of FIG. 6 below refers extensively to FIG. 1. Accordingly, reference is additionally made to FIG. 1.

The preferred method of operation of the system 100 of FIG. 1 is preferably initialized with collection of viewing logs 150 for a predetermined period of time. (Viewing logs 150 are depicted in FIG. 1 as a plurality of squares with various hatching patterns.) The predetermined period of time may be for 1 week, 2 weeks, or some other broadcaster defined duration. Alternatively, the process of its collection need not depend on collection of logs from various viewers, and need not be tied to whole system operation. For example and without limiting the generality of the foregoing, if for some reason, at least part of the viewers already have their viewing logs collected (for instance, where a broadcaster utilizes an audience measurement system for general ratings), then the collected viewing logs are preferably used as explained below, thereby enabling the system to operate with initialization.

A subset of selected STBs 110, 120 viewing log 150 data, the data comprising lists of broadcast programs tuned to by the STB, and time and duration of the tuning, is preferably systematically reported back 160 to the broadcast headend 140 (steps 610, 620). The subset of selected STBs 110, 120 preferably comprises about 5,000-50,000 STBs. The system 100 of FIG. 1 operates in a loop (step 625) which is preferably continuously repeated in order to ensure a constant supply of fresh data about ratings dynamics.

The headend 140 preferably analyzes the reported back logged data. By analyzing the logged data, the headend 140 preferably defines a matrix 170 of:

groups of viewers with similar interests (denoted 'C' in FIG. 1); and groups of programs with similar audiences (denoted by 'D' on FIG. 1).

As a result of the headend 140 defining groups of viewers, C, and groups of audiences, D, preferably near homogeneous ratings on the intersections of viewer and program groups are preferably determined (step 630). The almost homogeneous ratings preferably indicate to what extent each group of viewers are interested in each type of programs.

Returning back to the original logged data 150, the headend 140 preferably infers time dynamics (Matrix Q(t) 180) of rating changes for each intersection of viewers and programs groups. The inferred time dynamics (Matrix Q(t) 180) provides a preferred daytime when a given group of viewers prefers to watch a given group of programs (step 640).

The time dynamics of rating changes of each group of viewers for each program are preferably broadcast 195 as a part of program scheduling metadata (step 650).

An individual STB among the plurality of STBs 130 preferably determines with which groups of viewers the individual STB shares interests with, preferably by comparing the individual STB viewing logs 190 with the broadcast viewer groups' ratings. The ratings of corresponding groups preferably then serve as a source for ranking TV programs which a viewer associated with the individual STB has not watched yet (step 660).

Various preferred implementations of the system of FIG. 1 in an electronic program guide (EPG) environment are now discussed.

One preferred implementation of the preferred EPG environment comprises a move away from traditional EPGs. Traditionally EPGs are arranged to support "linear" viewing, wherein, linear viewing comprises watching a first program, during the broadcast of the first program, and then watching a second program, during the broadcast of the second program. The preferred EPG environment instead comprises a DVD-menu like approach, thereby resolving a contradiction between the linear concept of live viewing and direct access to materials which were recorded on PVR.

Figure 7:
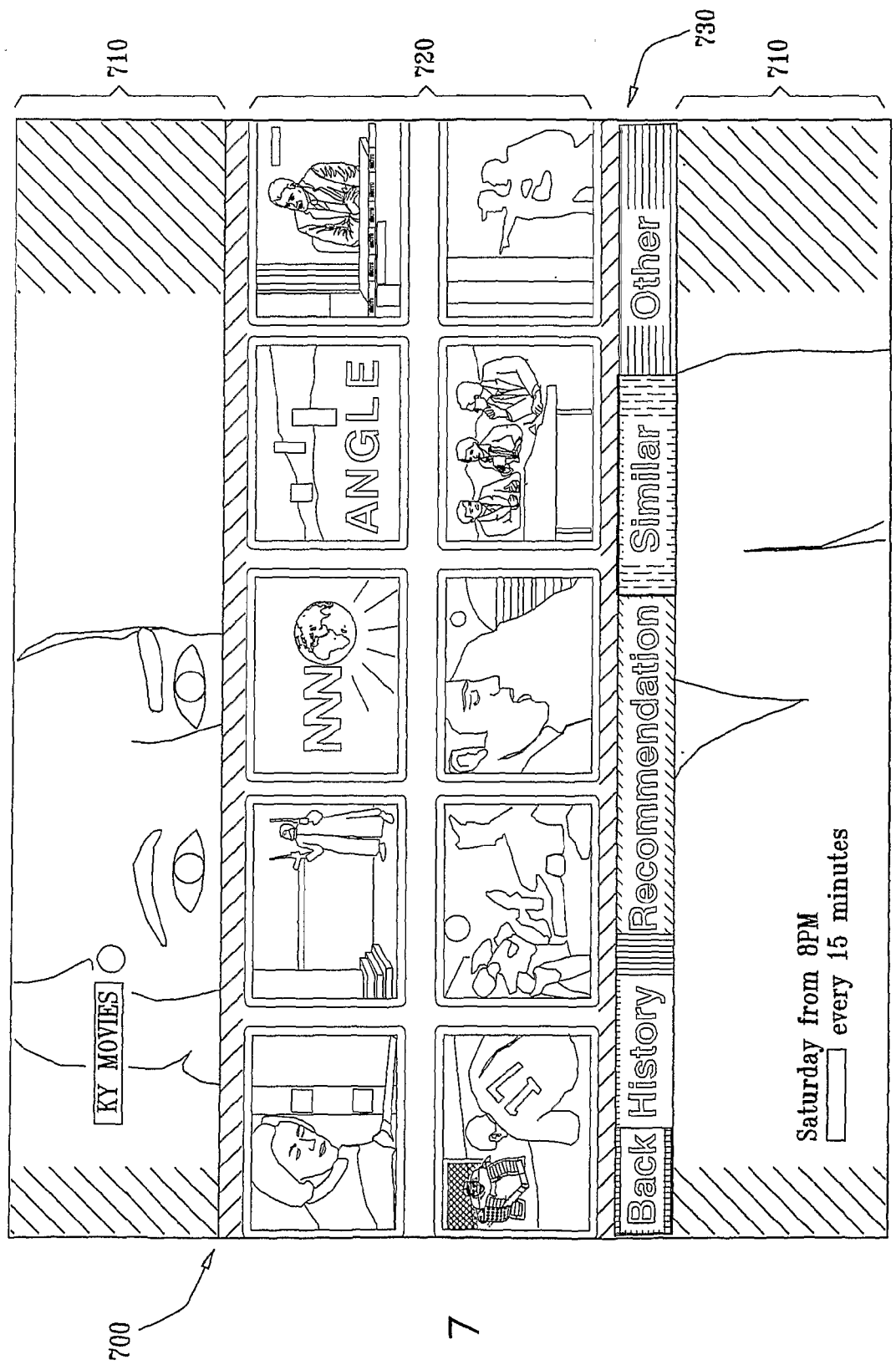
FIG. 7 is a simplified illustration of a preferred embodiment of an electronic program guide (EPG) start screen constructed and operative in accordance with a preferred embodiment of the system of FIG. 1.

Reference is now made to FIG. 7, which is a simplified illustration of a preferred embodiment of an EPG start screen 700 constructed and operative in accordance with a preferred embodiment of the system of FIG. 1. When the viewer turns on the TV, the initial display on the TV comprises preferably the EPG start screen 700 depicted in FIG. 7. The viewer is preferably presented with a full size promo preferably displayed in the background 710 of the EPG start screen 700, and a set of small-size promos 720 preferably of currently broadcast programs preferably in the EPG start screen 700 foreground. The viewer is preferably able to choose a program for watching now from among the promos displayed. It is appreciated that live commercials and promos are continually displayed in the background 710 of the EPG start screen 700.

The viewer can also choose a button from the buttons 730 displayed beneath the promos 720 and enter "Viewing History", "Recommendations", or "Smart Zapping" ("Similar Program" or "Other Program"). The "Viewing History", "Recommendations", or "Smart Zapping" scenarios will be described below.

Figure 8:
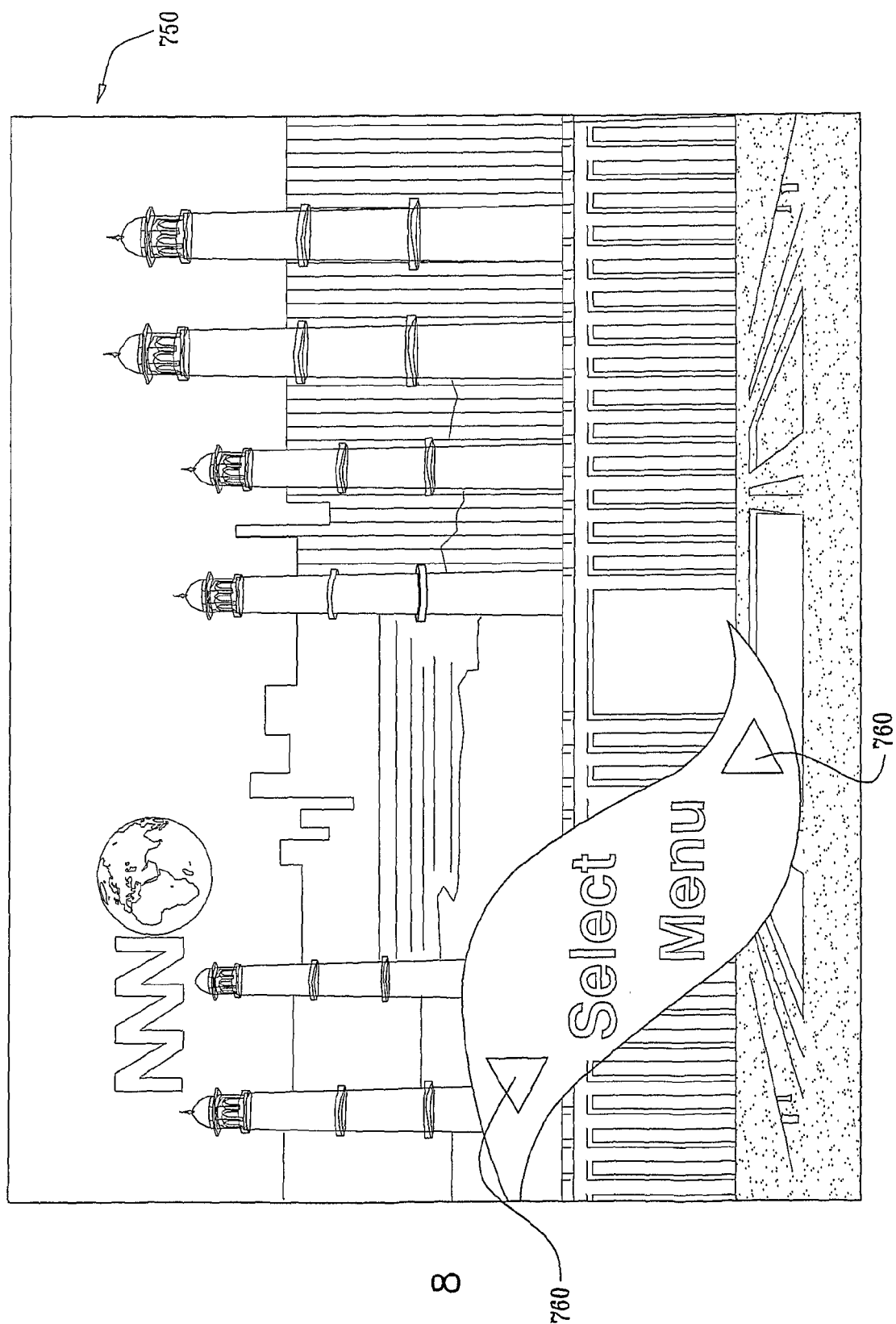
FIG. 8 is a simplified illustration of a preferred embodiment of the Select Menu of the EPG of FIG. 7.

Reference is now additionally made to FIG. 8, which is a simplified illustration of a preferred embodiment of the Select Menu 750 of the EPG of FIG. 7. In the embodiment of the EPG depicted in FIG. 8, the set of small-size promos 720 and the buttons 730 are no longer displayed in the EPG start screen 700 foreground. The viewer is preferably also able to navigate among various full screen promos, such as the full screen promo depicted in the background 710 of the EPG start screen 700. Such navigation is preferably preformed using "Select Menu" arrows 760 which preferably enable the viewer to open a menu, and select and tune to a chosen program. Full functionality of the menu is described in greater detail in discussion of various preferred embodiment of the present invention below.

Figure 9:
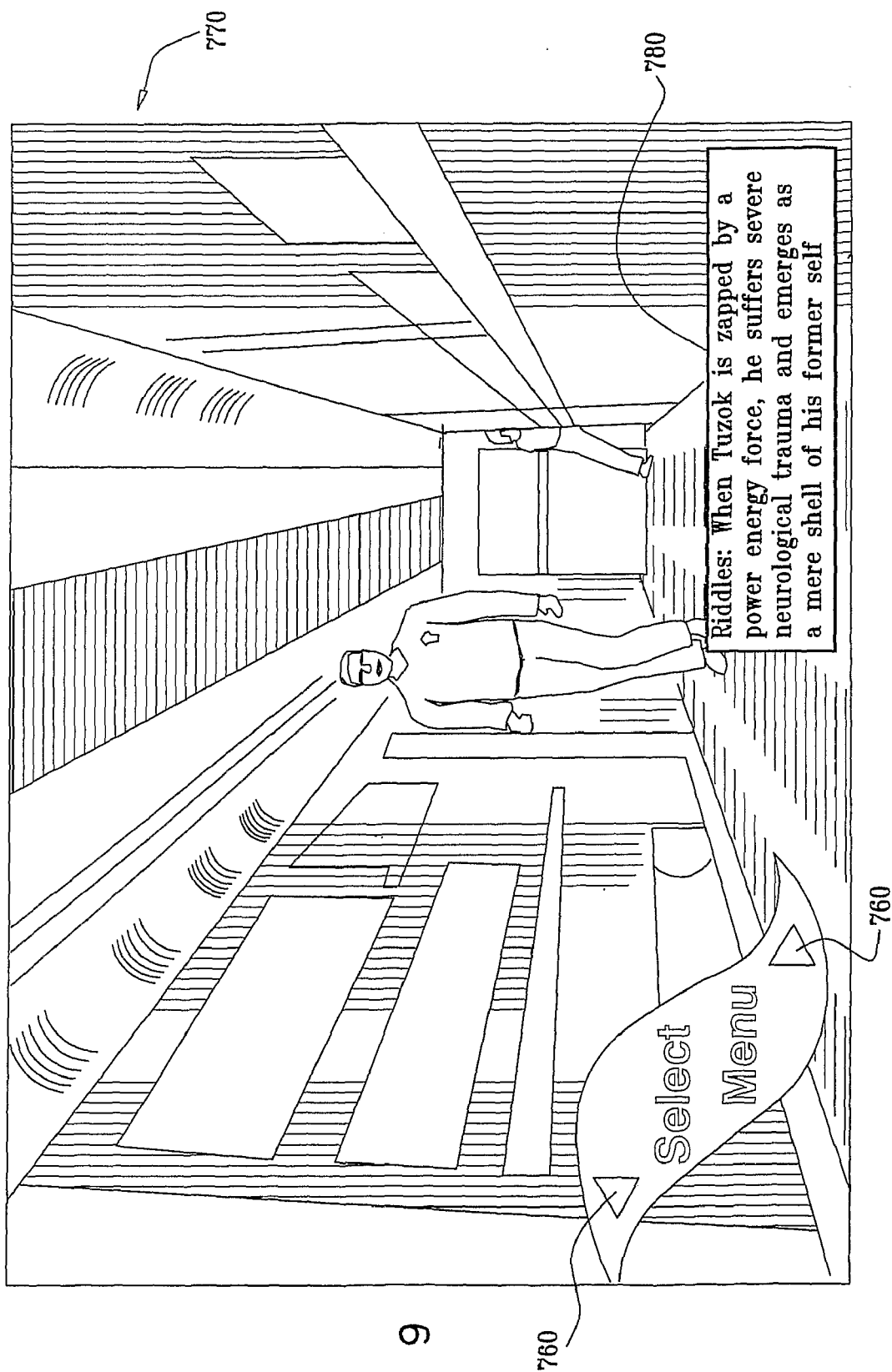
FIG. 9 is a simplified illustration of a preferred embodiment of the promo program synopsis screen of the EPG of FIG. 7.

Reference is now additionally made to FIG. 9, which is simplified illustration of a preferred embodiment of a promo program synopsis screen 770 of the EPG of FIG. 7. The promo program synopsis screen 770 is preferably identical to the Select Menu 750 itself. However, in addition to the select menu arrows 760, a synopsis box 780 is displayed. A text synopsis of a program presently being displayed in the EPG start screen 700 background is displayed in the synopsis box 780.

The full size promo preferably displayed in the background 710 of the EPG start screen 700;

the set of small-size promos 720 preferably of currently broadcast programs preferably in the EPG start screen 700 foreground; and the various full screen promos viewable on the Select Menu 750 and the promo program synopsis screen 770, are preferably selected using the system of FIG. 1 such that only programs that of interest to the present viewer (V, as per the discussion of the system of FIG. 1, above), as per his/her preferences as determined using the system of FIG. 1, as described above. Programs selected for promo-ing are preferably selected based on the set of channels available for the viewer at the present moment. For example and without limiting the generality of the foregoing, if the viewer is not a subscriber of the Super Movie Channel, a program presently being broadcast on the Super Movie Channel will not among the various promos available to the viewer.

Those skilled in the art will appreciate that although the EPG presented in FIGS. 7-9 appears to limit the viewer's viewing possibilities, in actuality the EPG presented in FIGS. 7-9 organizes the viewer's activity and helps the viewer effectively and quickly search for desired contents.

Figure 10:
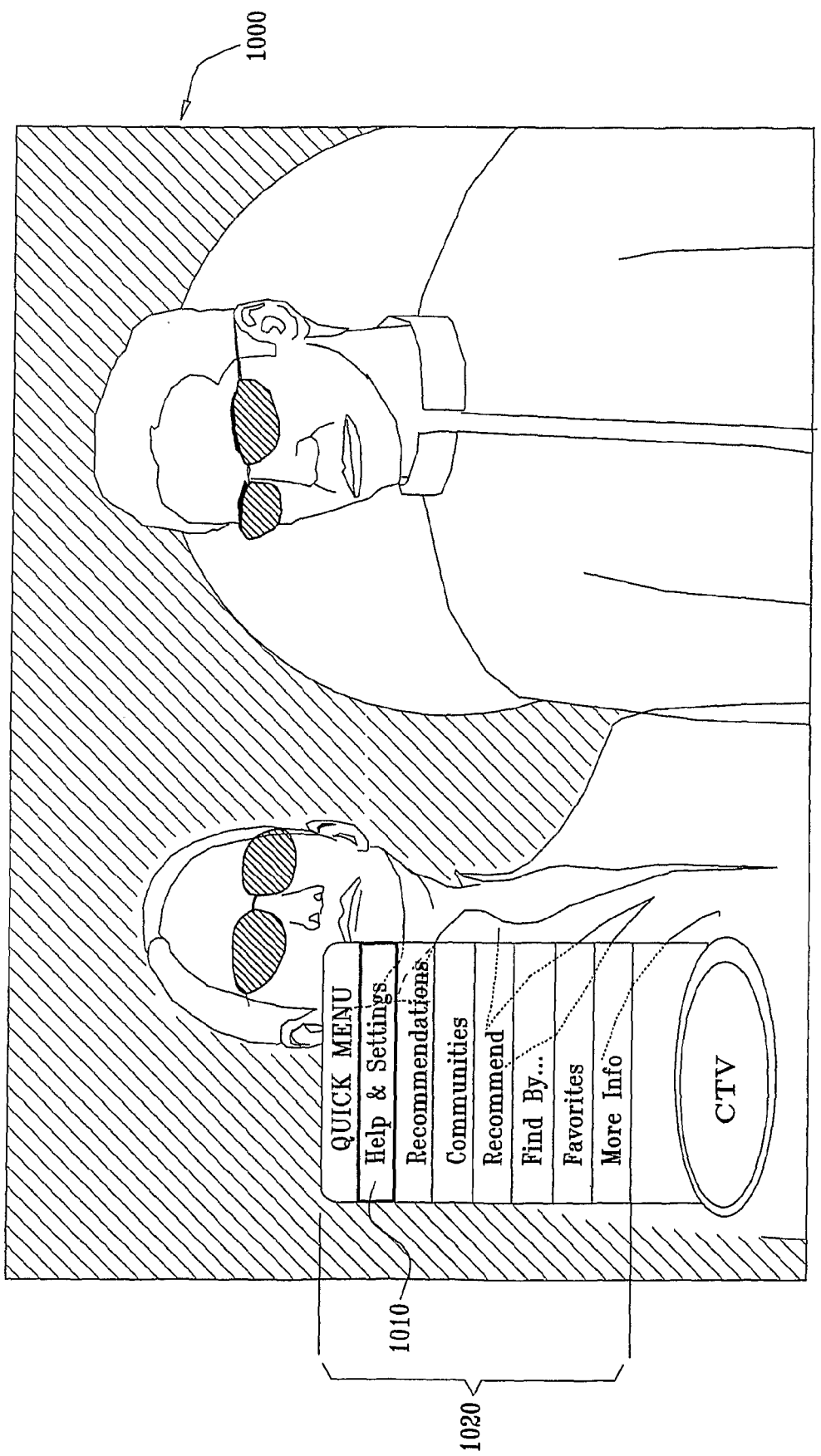
FIGS. 10-12 are simplified illustrations of preferred embodiments of a screen depicting how a viewer accesses his profile, the viewer profile being extended and updated based on viewing history, in accordance with a preferred embodiment of the system of FIG. 1.
Figure 11:
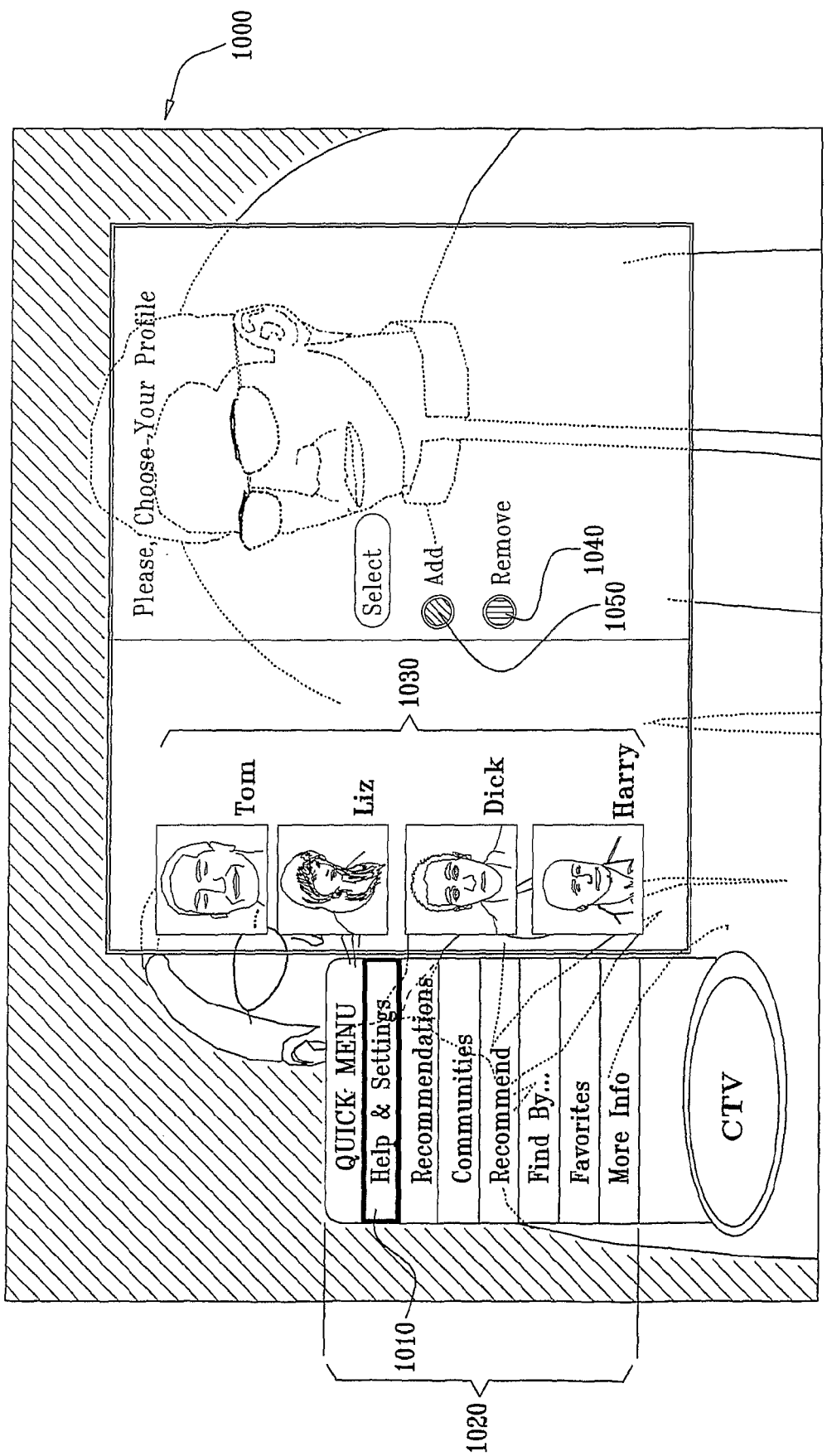
Figure 12:
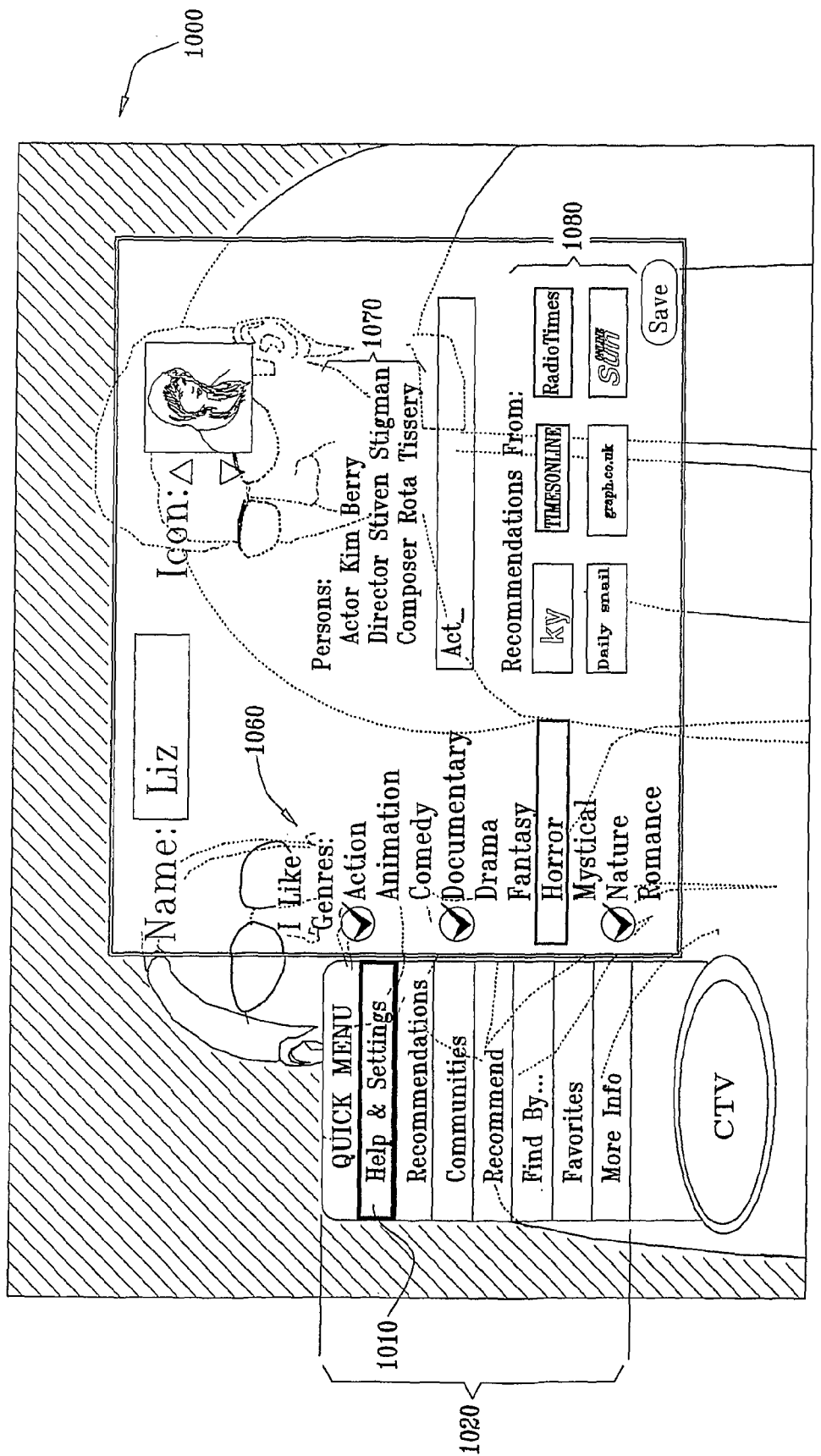

Reference is now made to FIGS. 10-12. FIGS. 10-12 are simplified illustrations of preferred embodiments of a screen depicting how a viewer accesses his profile, the viewer profile being extended and updated based on viewing history, in accordance with a preferred embodiment of the system of FIG. 1.

Since most advanced search operations enabled by the system of FIG. 1 are based on the viewer's habits and preferences, the viewer needs to define a viewer profile before using the advanced search operations.

Any family member, household resident, or viewer may preferably create a viewer profile and define viewer preferences at a time of profile creation. The "Choose Profile" screen may be opened at any time from EPG 1000 through the "Help & Settings" 1010 menu 1020 item. The viewer may select his/her profile 1030, add a new profile 1040, or remove an existing profile 1050.

Within the Viewer Profile screen, the viewer can optionally set his/her favorite:

genres 1060;

cast and other credits (actors, directors, writers, composers) 1070;

recommendation sources 1080; and language (not depicted).

It is appreciated that since the viewer's profile is preferably self-learning, according to the system of FIG. 1, the initial settings are preferably permanently extended and updated based on viewing history. Since the viewer's profile is self-learning, it is generally not recommended to delete the viewer's profile, because, besides initial settings, the viewer's profile usually contains a lot of information collected about the actual viewer's preferences and habits (e.g. viewer's action history, viewer's viewing history, etc). It is also appreciated that the viewer's profile may be protected by password.

When accessing a viewer profile which has not been accessed previously, a screen, depicted in FIG. 12 is offered to the viewer, enabling the viewer to manually enter viewer preferences.

Given that the system of FIG. 1 is heavily based on viewing statistics, which reflect to a certain degree the viewer's watching habits, the ability to maintain personal viewer's profiles preferably allows maintaining the viewing statistics on an individual basis. An ability to maintain the viewing statistics on an individual basis thereby enables performing fine tuning of content ranking and recording.

Reference is now made to FIGS. 13-17, which are simplified illustrations of preferred embodiments of various screens for a Smart Zapping feature, the Smart Zapping feature being constructed and operative in the system of FIG. 1. Smart Zapping preferably permits a viewer to quickly navigate through live and recorded content in order to find a program that is preferably similar to or, alternatively, preferably different from a presently viewed program. Smart Zapping is preferably accompanied with recommendations from trusted sources at each step that preferably enable shortening the search process. Suggested programs are preferably chosen according to the viewer's habits and preferences.

Figure 13:
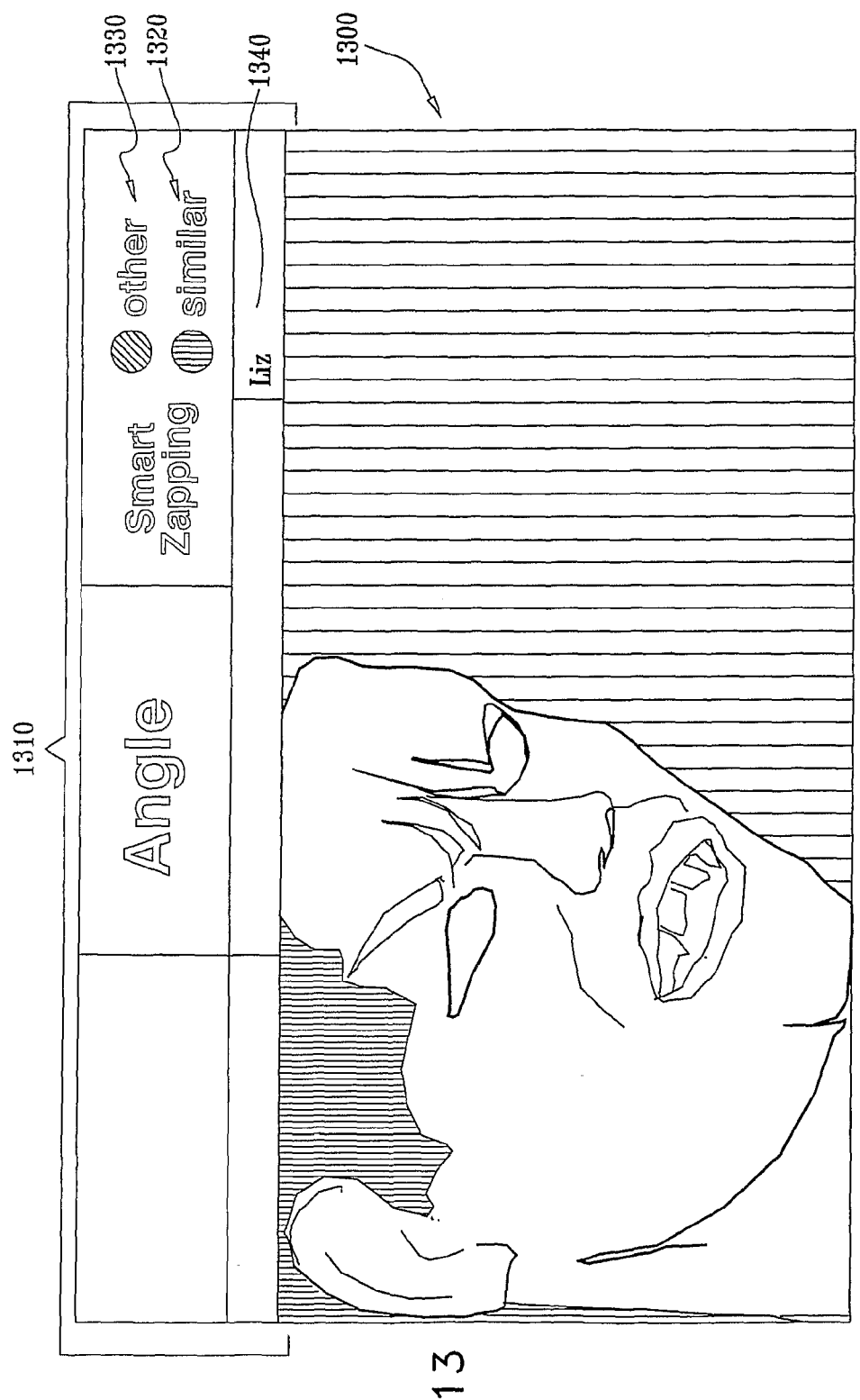
FIGS. 13-17 are simplified illustrations of preferred embodiments of various screens for a Smart Zapping feature, the Smart Zapping feature being constructed and operative in the system of FIG. 1.

Reference is now specifically made to FIG. 13, which is a simplified illustration of a preferred embodiment of the Smart Zapping start screen 1300. Smart Zapping begins when the viewer brings up an EPG banner 1310, and then chooses one of two Smart Zapping options. Specifically, the viewer may select a button preferably enabling searching for similar content 1320, or alternatively, the viewer may select a button preferably enabling searching for different content 1330. The Smart Zapping start screen 1300 preferably also indicates which viewer profile 1340 is presently active. The presently active viewer profile is the viewer profile which preferably determines which content is considered similar and which content is considered different.

Specifically, the similar content 1320 option permits the viewer to switch to another program that is similar to the current one, based on viewer habits, preferences, and recommendations. Information about viewer habits and preferences may be obtained from the self-learning viewer profile.

Those skilled in the art will appreciate that the TV Anytime standards (referred to above) define data structures for the following viewer preferences:

Browsing preferences (for navigating and accessing multimedia content);
Filtering and search preferences:
Creation preferences (favorite actors, directors, etc.);
Source preferences (publisher or channel of distribution); and
Classification preferences (genres, languages, etc); and
Usage history (a list of viewer's actions).

The Other 1330 option permits the viewer to switch to a program that is somehow "different from" the current one. "Different from" may be defined on the basis of the self-learning viewer profile and by the "different from" rules. The viewer may configure the "different from" rules using a search setup. Search set up is described below.

It is appreciated that "different from" is defined by one of the following methods:

the broadcaster assigning rules that define a first program category As "different from" a second program category; and
determining, based on the system of FIG. 1, described above, which cluster of programs comprises the cluster of programs furthest in matrix M 165 (FIG. 1) from the cluster of programs comprising the presently viewed program.

After the viewer chooses between "Other" and "Similar", recommendations from trusted sources preferably appear on the banner. Trusted sources for the viewer are preferably defined on the viewer profile screen, or through search setup.

It is appreciated that Smart Zapping recommendations may shorten a default zapping process. The default zapping process will cover the recommendations sequentially. However, Smart Zapping might not deliver the recommended programs in the order that the viewer prefers.

Figure 14:
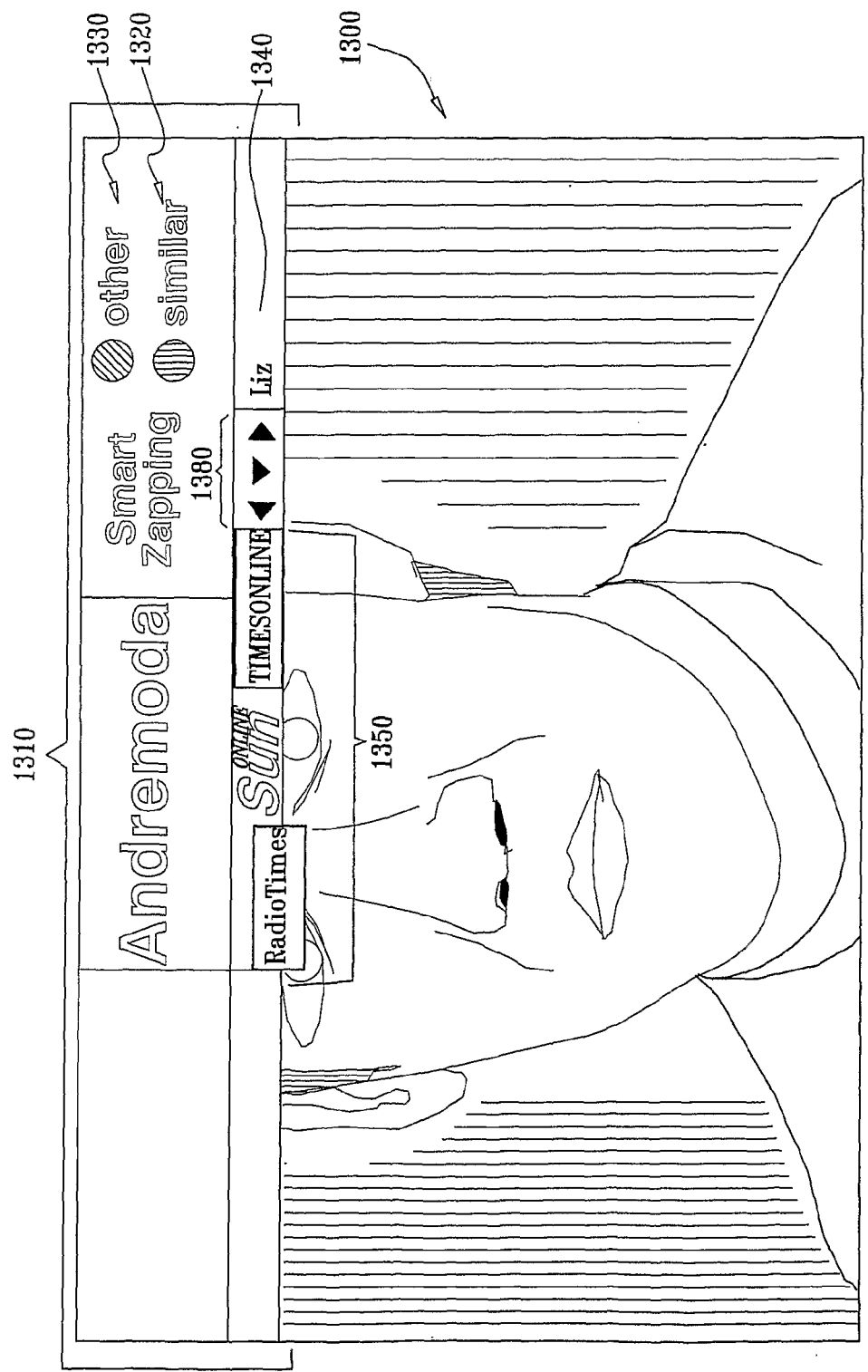

Reference is now specifically made to FIG. 14, which is a simplified illustration of a preferred embodiment of a "Smart Zapping" banner with a list of recommendation sources 1350. The viewer may navigate through the list of recommendation sources 1350 and open the recommendations from any of recommendation sources. It is appreciated that recommendation sources may comprise peer or community recommendations, as described below, or recommendation sources which have a business arrangement with the broadcaster.

Figure 15:
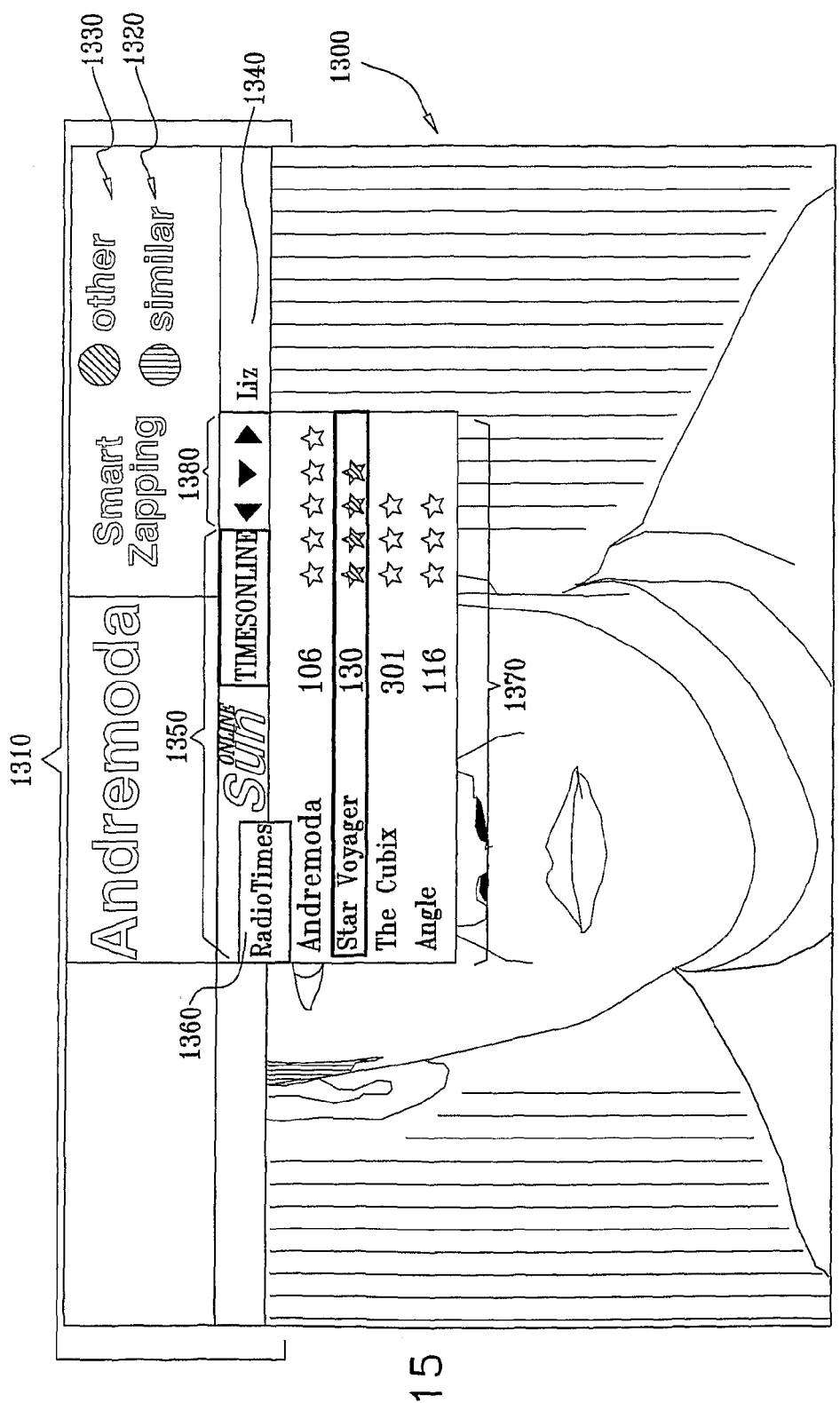

Reference is now specifically made to FIG. 15, which is a preferred embodiment of the "Smart Zapping" banner, with the list of "similar" recommendations from a chosen source displayed. One recommender, RadioTimes 1360, in the list of recommendation sources 1350, is selected. A list of programs 1370 recommended by the selected recommender, RadioTimes 1360, is shown. Channel numbers for each recommended program appear beside a name of each recommended program. Additionally, an indication of the recommended program rating is depicted, as a number of stars. Navigation between recommended programs and recommenders is preferably performed by using arrows 1380.

Figure 16:
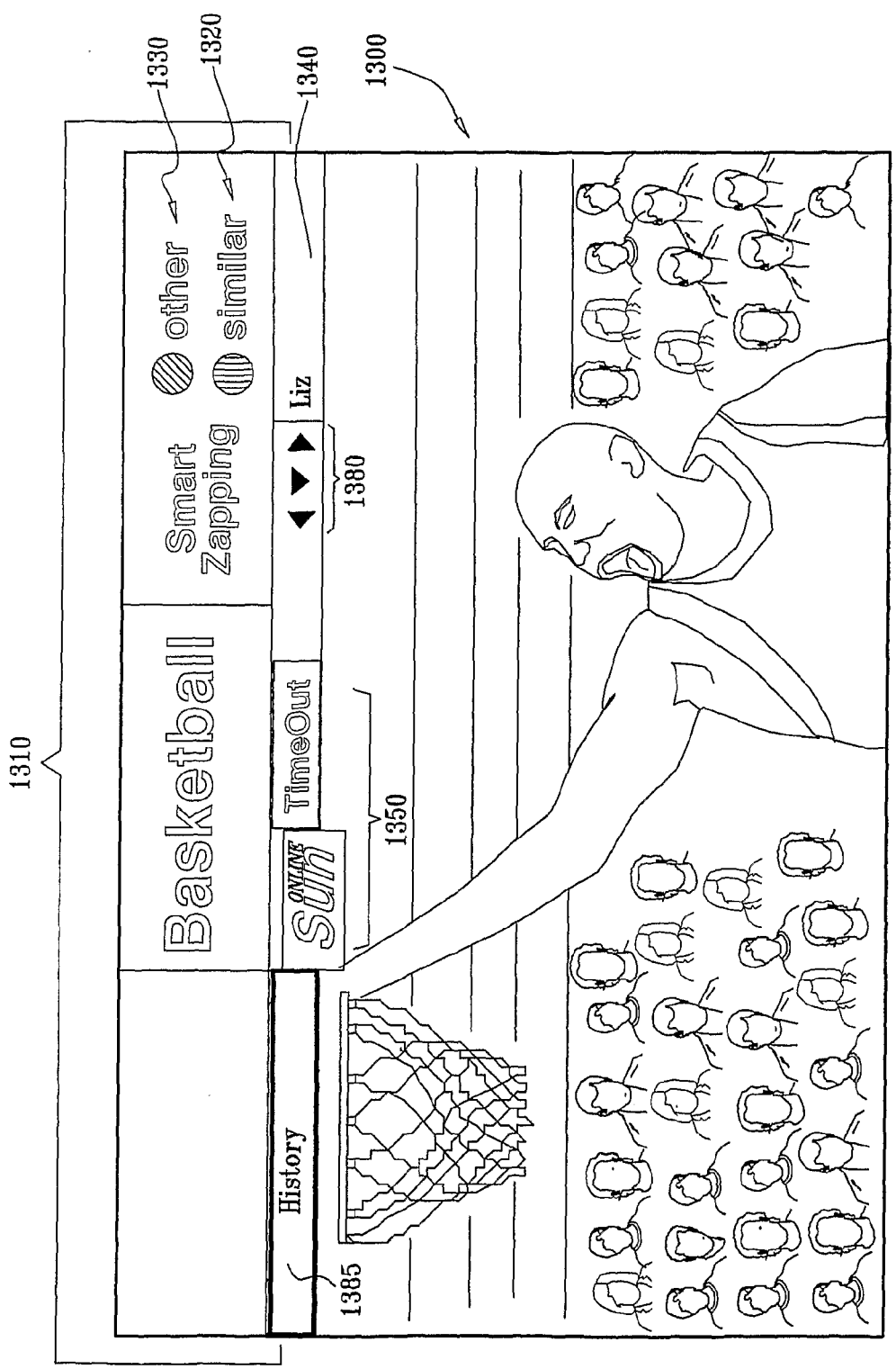

Reference is now specifically made to FIG. 16, which is a simplified illustration of a preferred embodiment of the Smart Zapping banner, in "other" mode. By way of example, suppose that, according to the "different from" rules the "opposite" genre to "Sci-Fi" is "Sports". Thus, an appropriate "other" program for the present "Andremoda" movie (the science fiction genre) should be a sports program, e.g. a basketball game. In anticipation of FIG. 17, it is appreciated that History 1385 is depicted as selected in FIG. 16.

Figure 17:
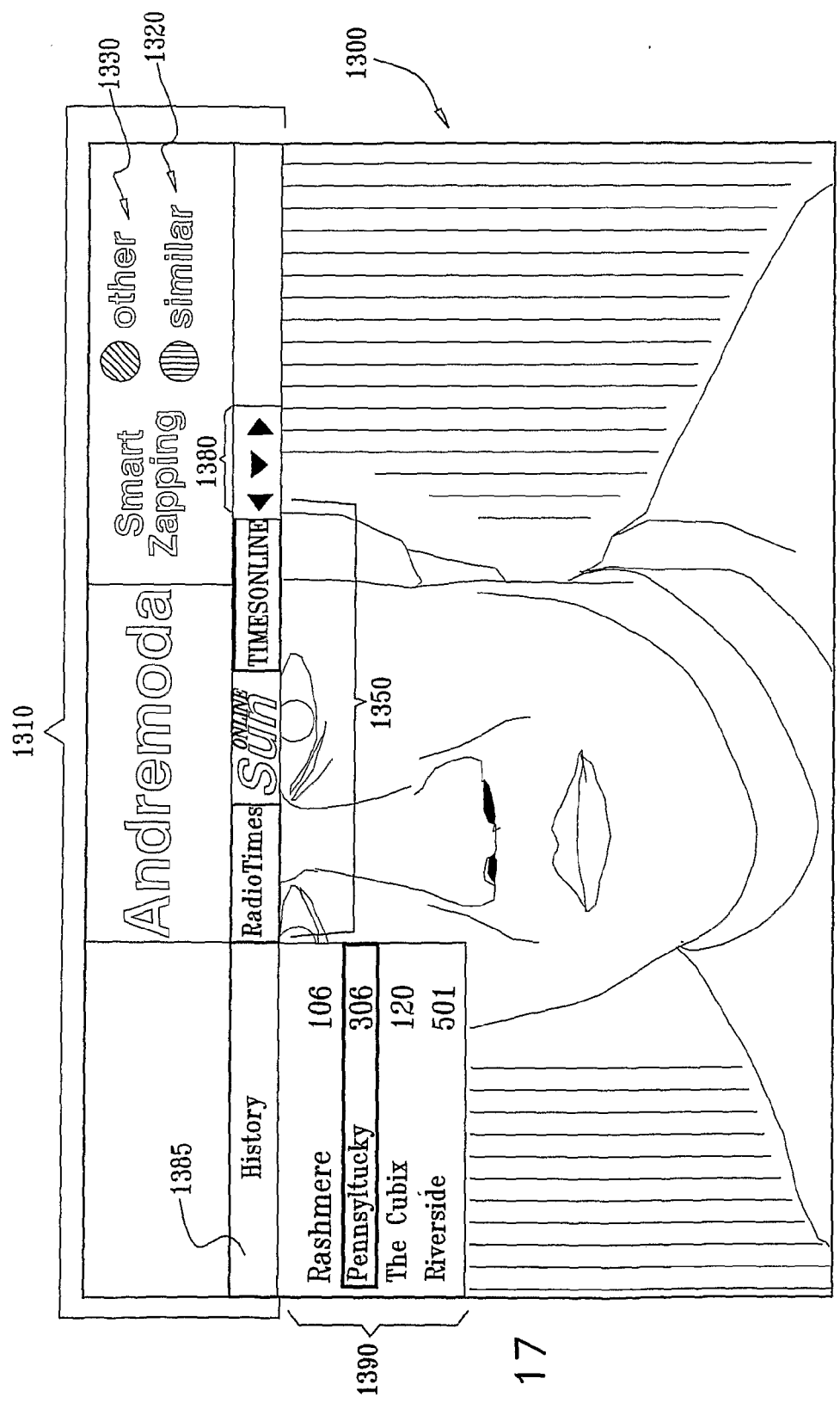

Reference is now specifically made to FIG. 17, which is a simplified illustration of a preferred embodiment of the "Smart Zapping" banner, with the opened zapping history list displayed. At any time during "Smart Zapping" the viewer can open a history list 1390 of zapping and return to any of programs appearing in the history list 1390. Typically, up to five of the last programs selected using Smart Zapping appear in the history list 1390.

The system of FIG. 1 permits classifying programs according to clusters. Thus, "similar to current" programs will be chosen from the program cluster group to which the presently viewed program belongs. It is appreciated that the "other" programs do not belong to the "similar to current" program group, and, therefore, the choice of "other" programs is limited by the viewer preferences based on his/her viewer profile and his/her viewing habits.

Reference is now made to FIGS. 18-21, which are simplified illustrations of preferred embodiments of various screens for a More Information feature, the More Information feature being constructed and operative in the system of FIG. 1. The More Information feature, hereinafter referred to as "More Info", permits the viewer to obtain additional information about presently viewed content, the additional information being depending on screen context. The additional information preferably contains a text describing the presently viewed content and preferably links to related programs or program segments.

Figure 18:
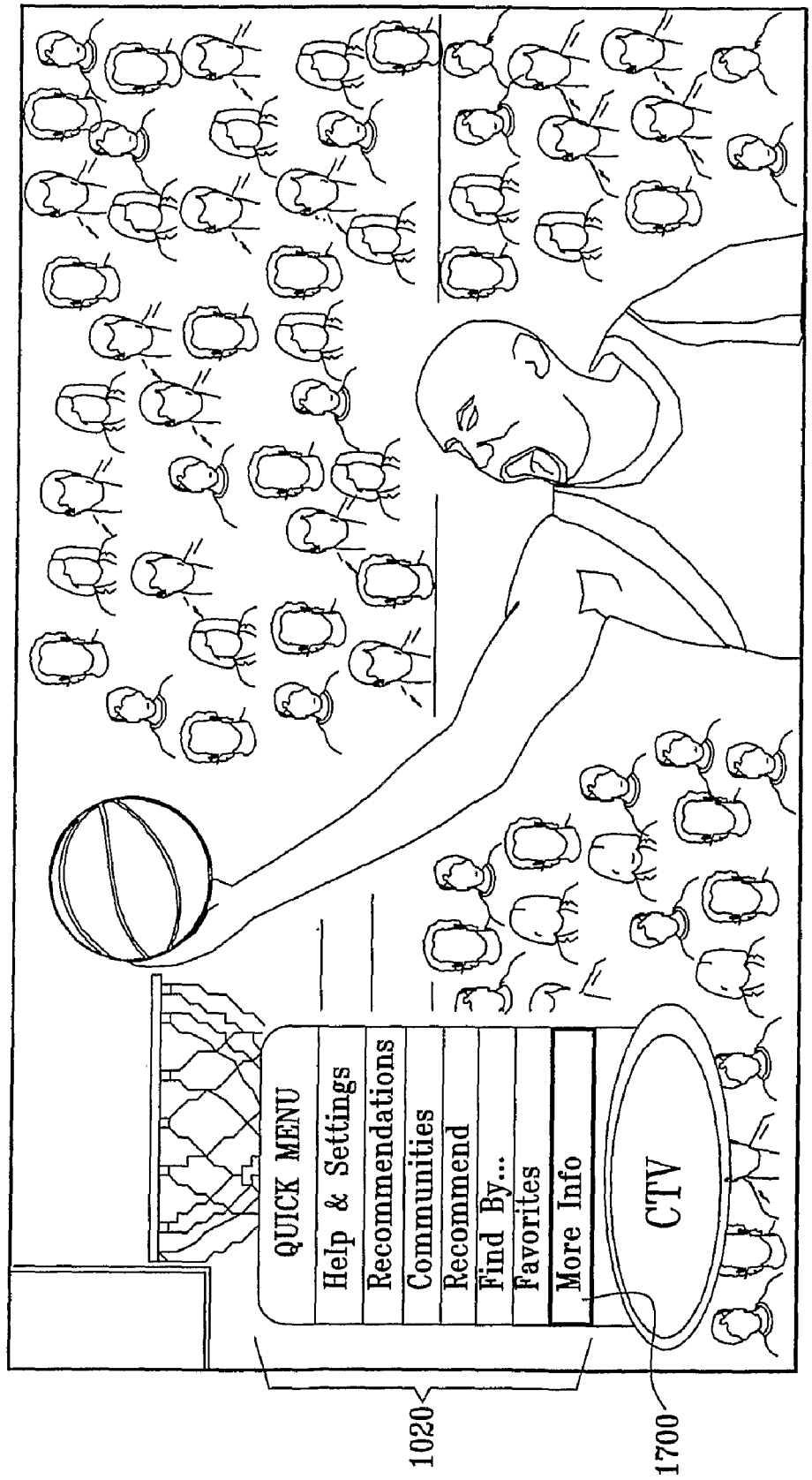
FIGS. 18-21 are simplified illustrations of preferred embodiments of various screens for a More Information feature, the More Information feature being constructed and operative in the system of FIG. 1.

Reference is now specifically made to FIG. 18, which is a simplified illustration depicting a preferred method of invoking the "More Info" 1700 Search Menu from the menu 1020. Upon invoking the "More Info" 1700 Search Menu, the viewer sees a list of keywords, which are suggested based on present screen context and the self-learned viewer profile.

Figure 19:
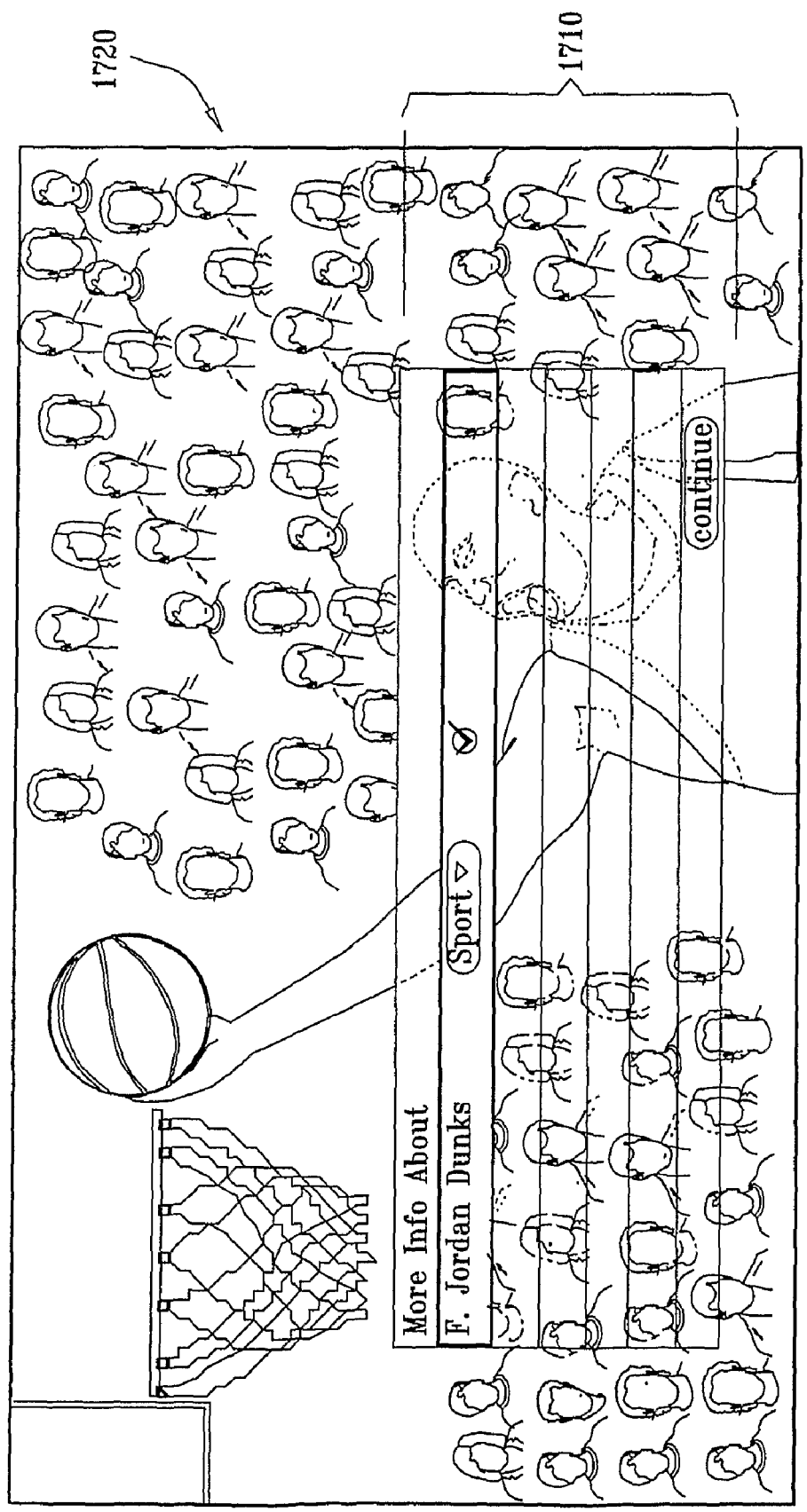

Reference is now specifically made to FIG. 19, which is a simplified illustration of a preferred embodiment of a screen displaying the list of keywords. An initial set of keywords 1710 appears on the screen 1720, without any interaction with the viewer after the viewer invokes the "More Info" 1700 Search Menu. The viewer can refine the search by editing the initial set of keywords 1710.

Figure 20:
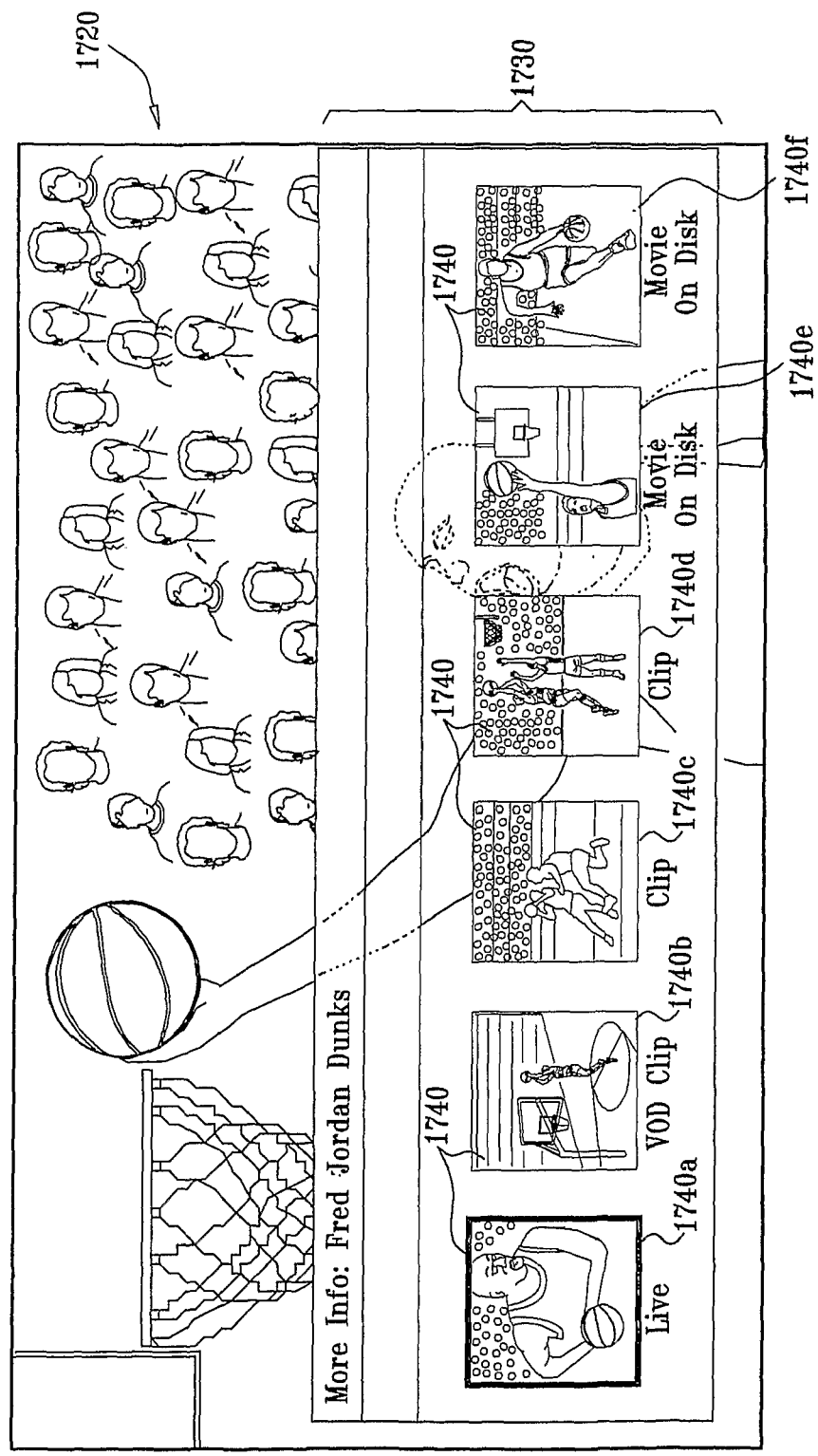

Reference is now specifically made to FIG. 20, which is a simplified illustration of a preferred embodiment of a screen displaying "More Info" search results 1730. The "More Info" search results 1730 preferably contain links 1740 to a set of relevant programs and/or program segments. The list of the links 1740 is preferably presented on the screen as a set of icons. Each icon 1740a-1740f is preferably provided with an item name and location (live program 1740a, VOD library 1740b, recorded on the STB hard drive 1740e, 1740f, recorded on the home network computer).

Figure 21:
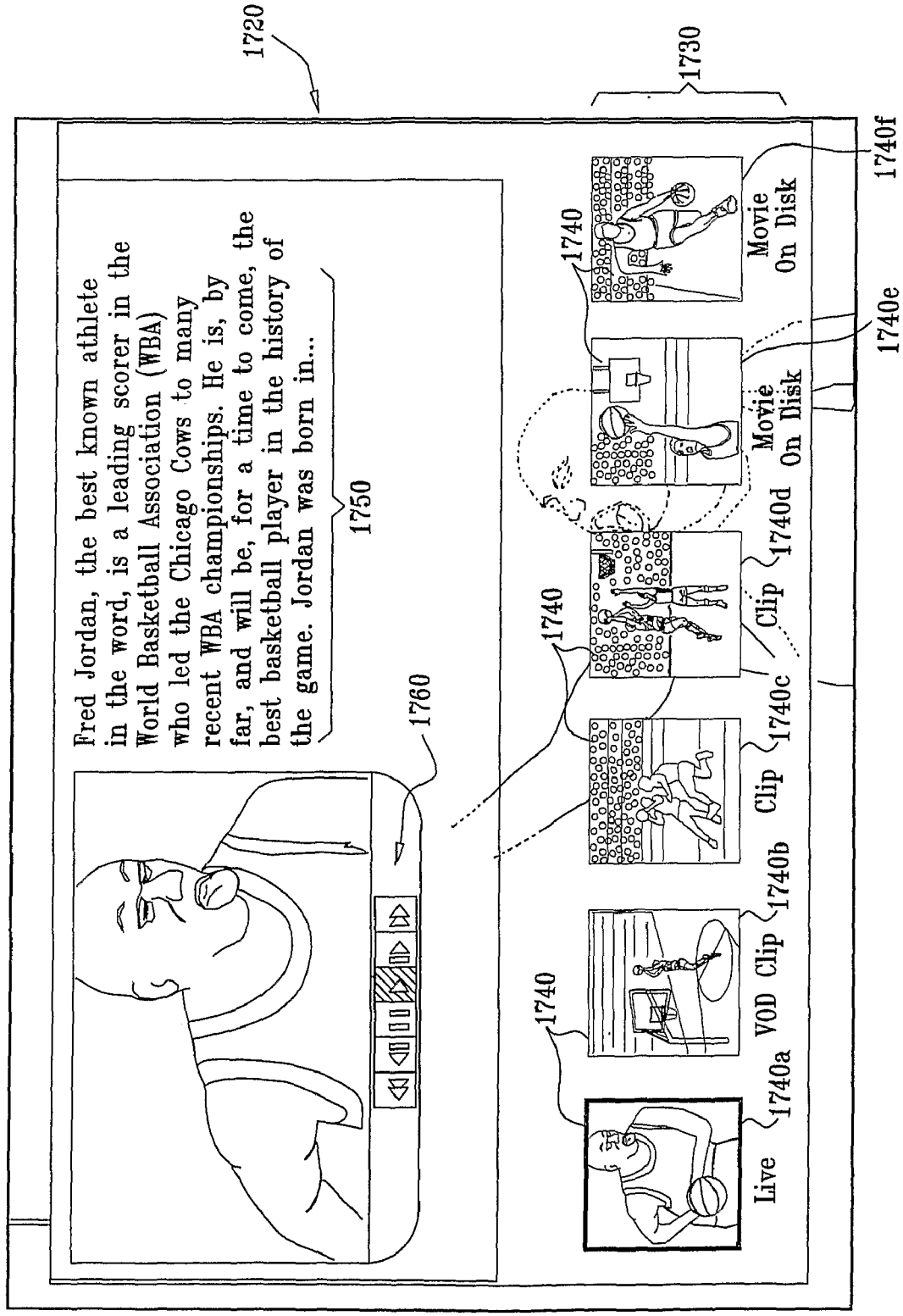

Reference is now made specifically to FIG. 21, which is simplified illustration of a preferred implementation of navigation through "More Info" search results 1730. The viewer is preferably able to select any link among the list of links 1740 in order to view text 1750 describing the content comprised in video associated with the selected link. The viewer preferably is able to view textual information about the highlighted item, and preferably choose to view or book 1760 the selected item.

"More Info" preferably utilizes descriptive metadata preferably supplied with each TV Program. In general, a search for a given keyword will preferably return multiple TV programs as related to the selected keyword. Presumably the number of results will be greater than a number of icons the viewer could comfortably view on one screen. Therefore a need to order search results according to some criteria arises. Utilizing the ranking of the system of FIG. 1, described above, "More Info" search results 1730 are preferably sorted according to the collaborative rating prediction of each TV program. Sorting the "More Info" search results 1730 accordingly preferably present the first 5-7 programs which preferably comprise programs comprising the highest probability that the programs presented will be viewed by the viewer. Those skilled in the art will appreciate that a search such as the "More Info" search described herein preferably implements an automatic selection of search keywords based on current screen context and viewer's statistics.

Reference is now made to FIGS. 22-26, which are simplified illustrations of preferred embodiments of various screens for a Recommendations feature, the Recommendations feature being constructed and operative in the system of FIG. 1. Recommendations permit the viewer to choose a program based on trusted sources' recommendations. These trusted sources are chosen and sorted at least according to the following criteria:

broadcaster's business strategy, i.e. the source's payments to the broadcaster;
the viewer's viewing habits; and
the viewer's preferences.

Recommendations determine at least the viewer's viewing habits and the viewer's preferences from the self-learning viewer profile.

Figure 22:
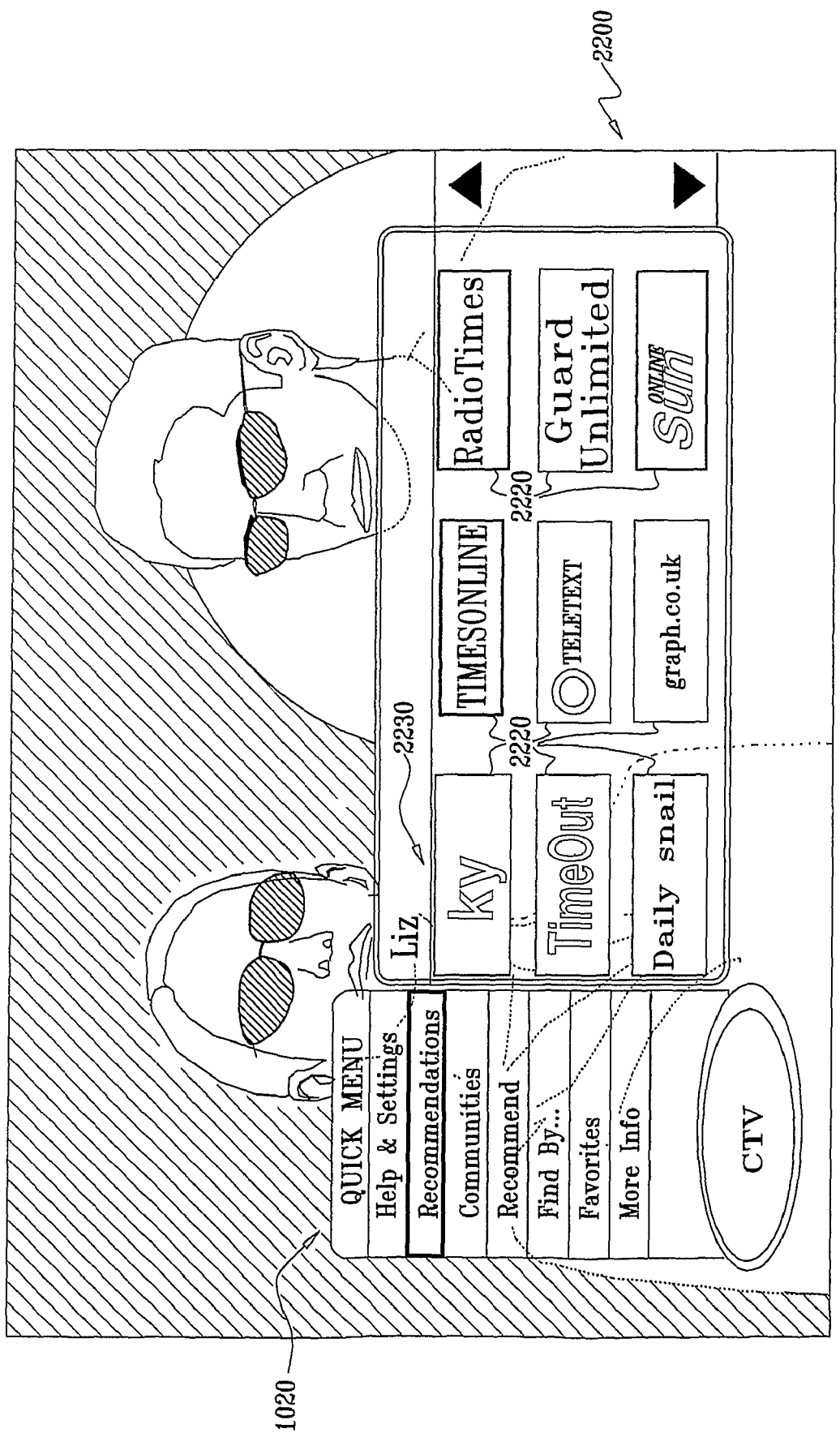
FIGS. 22-26 are simplified illustrations of preferred embodiments of various screens for a Recommendations feature, the Recommendations feature being constructed and operative in the system of FIG. 1.
Figure 23:
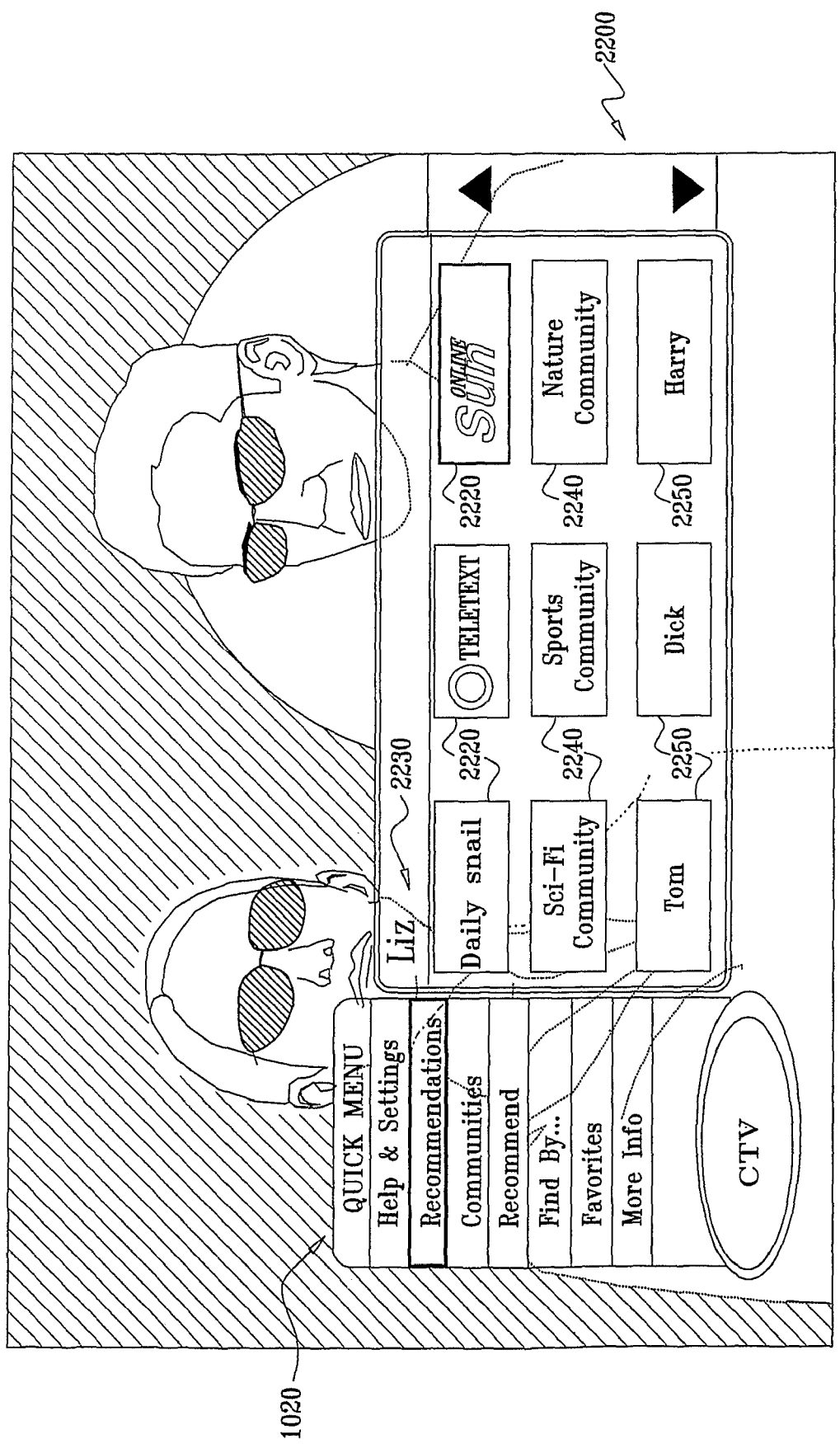

Reference is now specifically made to FIGS. 22-23, which is are simplified illustrations of preferred embodiments of a screen displaying navigation through a plurality of recommendation sources 2200. A "Recommendations" search is preferably activated from:

an iTV (interactive TV) application;
a promotional (so called "barker") channel;
a search results side bar; and
the menu 1020.

After invoking Recommendations, the viewer preferably is presented with a list of logos 2220 that represent the trusted recommendation sources. Trusted recommendation sources preferably comprise:

broadcaster recommendations;
communities' 2240 recommendations;
third party reviewers (such as publications in newspapers and on the Internet sites) (corresponding to the logos 2220);
statistics ("people who watched this program also watched . . . "); and
peer (friends') recommendations 2250.

The viewer preferably is able to navigate through the list of logos 2220 in order to select a desired source of recommendation. The viewer's name 2230 appears on the screen, thereby identifying the currently active viewer profile.

Figure 24:
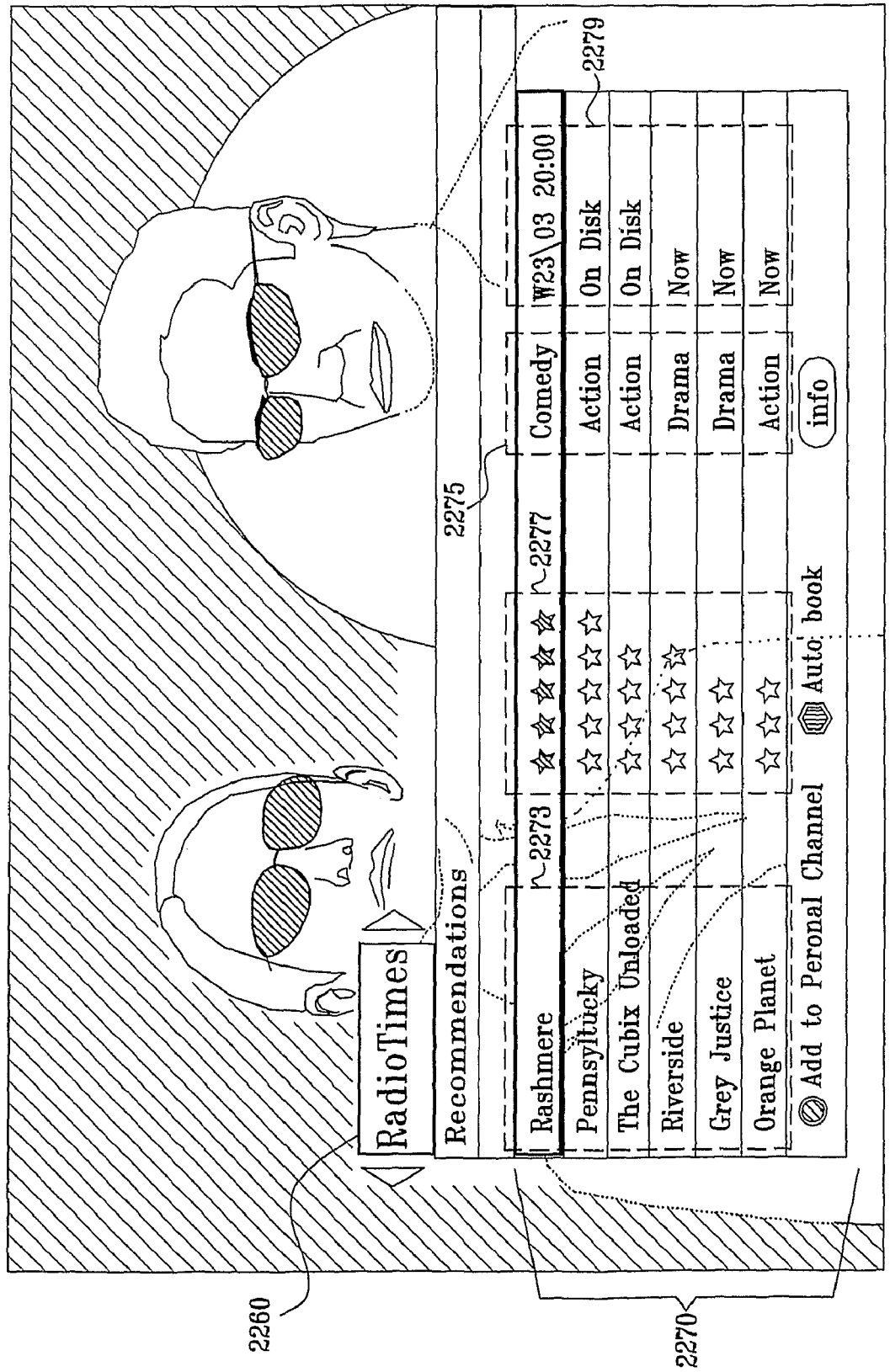

Reference is now made specifically to FIG. 24, which is a preferred embodiment of a screen with "Recommendations" search results from a chosen recommender 2260. When a recommendation source 2260 is chosen, a rated list 2270 of programs or program groups that are recommended by the chosen source 2260 is preferably displayed. The list 2270 preferably comprises program names 2273, genres 2275, ratings by the selected source 2277, and program locations 2279. The program or program groups may be broadcast as live content; may be available in VOD libraries; may be recorded on the STB hard drive, or on the home network computer. The list is sorted according to program rating.

Figure 25:
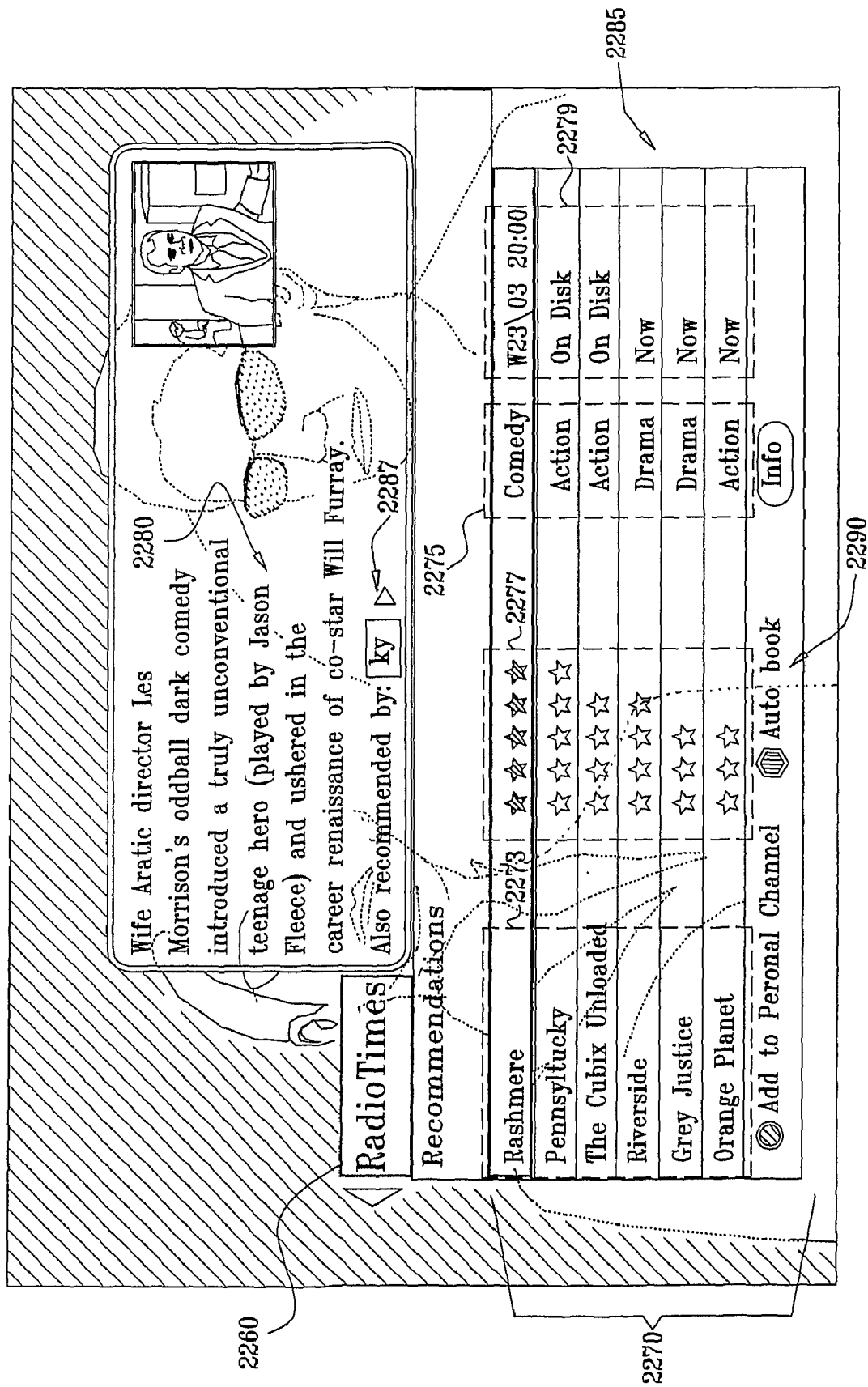

Reference is now made specifically to FIG. 25, which is a preferred embodiment of a screen with textual recommendations from the chosen source for a selected program. The viewer is preferably able to navigate through the recommendation list 2270 in order to get more information about each item. Quotations 2280 from a selected recommendation 2285 about each item from the list preferably appear on the screen. A list of other trusted sources 2287 also recommending the selected program is preferably also available.

The viewer preferably may also select an automatic booking option 2290 from the trusted recommendation source 2260, thereby causing the program recommended by the trusted recommendation source 2260 to be automatically purchased for viewing (if the recommended program is a pay for view program) and recorded.

Figure 26:
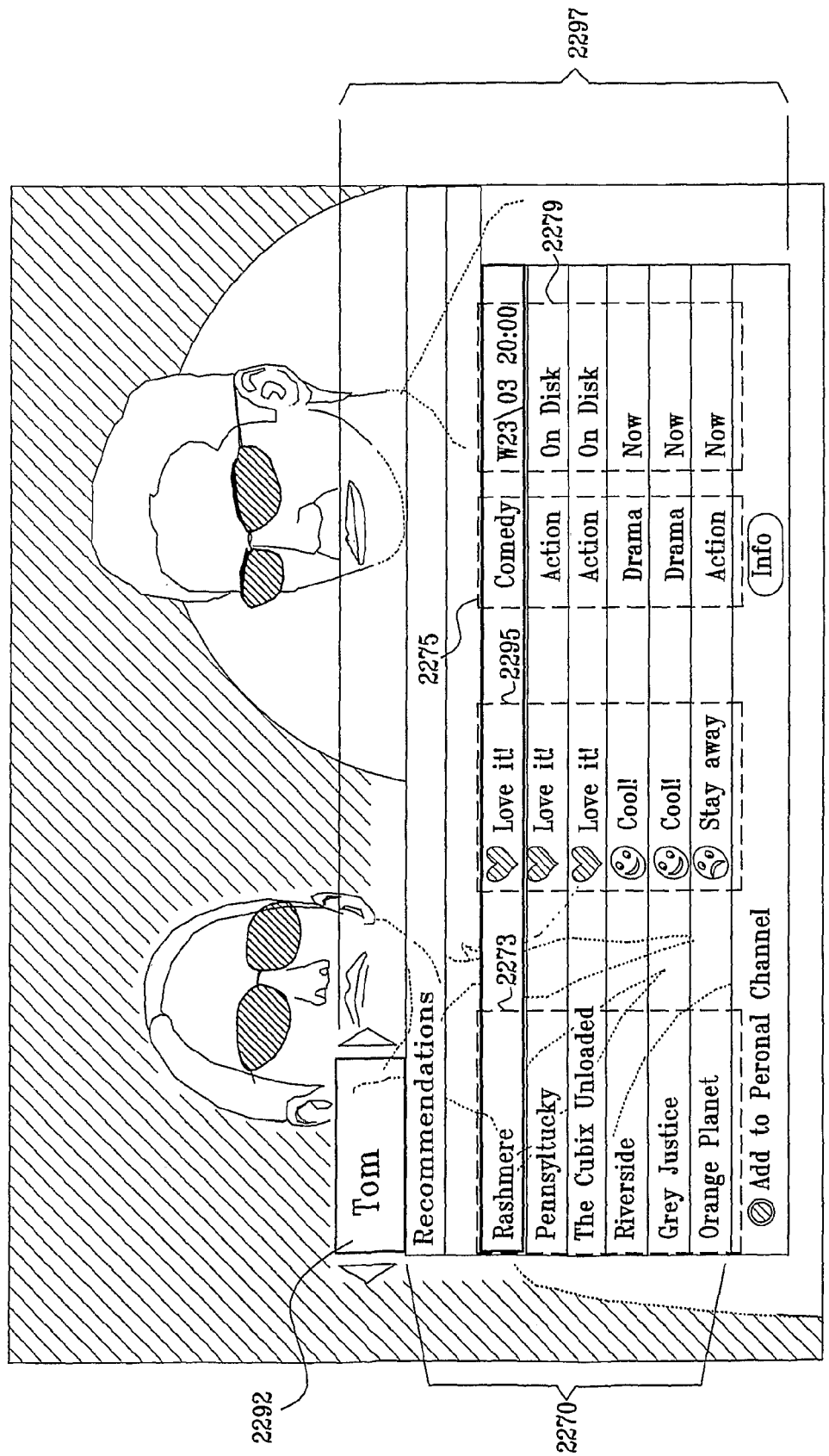

Reference is now made specifically to FIG. 26, which is a preferred embodiment of a screen with recommendations from one of the viewer's friends 2292. The viewer might also choose to view recommendations from a friend (2250 FIG. 23). The list of recommended programs 2270 is sorted by rating 2295 given to the listed programs by the friend.

It is appreciated that Auto Booking 2290 (FIG. 25) option is typically not possible on the Friend's Recommendations screen 2297 as the recommender may not want to make available information concerning every movie the recommender has viewed.

In order to implement the Recommendations feature as described in FIGS. 22-26, a recommendations database is preferably created and supported. A main recommendations database preferably is located at the broadcast headend (140, FIG. 1), and a local (cache) database is preferably stored on a hard disk of the STB. The recommendations database preferably contains at least all of the following data:

Recommenders' data (names, logos, etc.); and
Recommendations data (program name, date, rating, recommendation text).

It is appreciated that individual entries in the recommendations database are ranked and weighted according to the system 100 of FIG. 1. It is also appreciated that at least one user group within the system 100 of FIG. 1 comprises "Recommenders".

When the viewer invokes the Recommendations application, as described above, with reference to FIG. 22, a query for the list of recommenders should be sent to the recommendations database. The query preferably contains restrictions based on viewer profile or viewing habits (language, program genres, trusted sources (optionally), etc.). When the viewer chooses a recommender from the list of recommenders (2220, 2240, 2250, FIGS. 22 and 23), a second query is preferably sent to the recommendations database. The second query preferably comprises a query for recommendations from the chosen recommender.

Any appropriate booking method, as is well known in the art, may be used with the automatic booking option 2290 discussed above with reference to FIG. 25.

Figure 27:
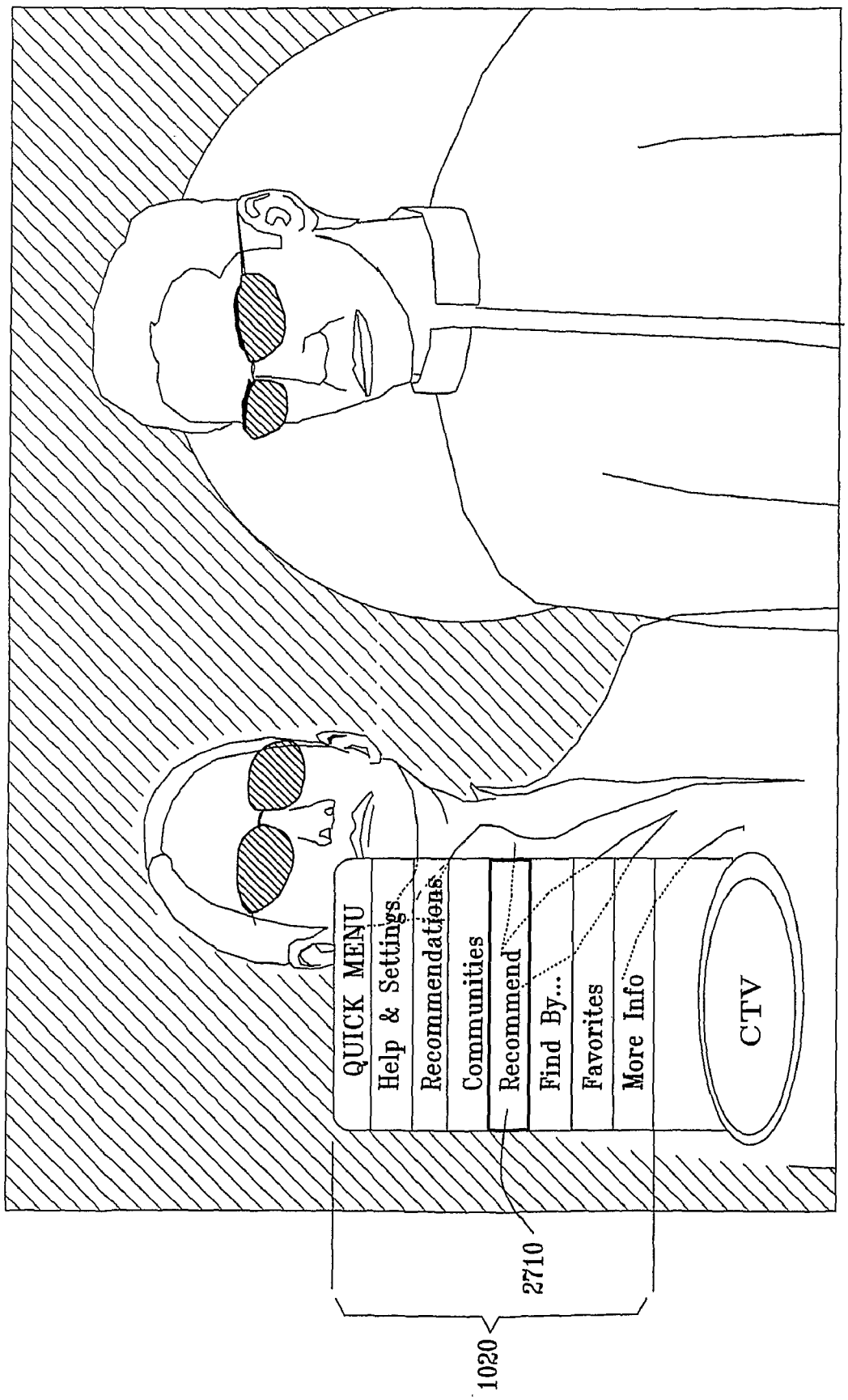
FIGS. 27-28 are simplified illustrations of preferred embodiments of various screens for a Peer Recommendations feature, the Recommendations feature being constructed and operative in the system of FIG. 1.
Figure 28:
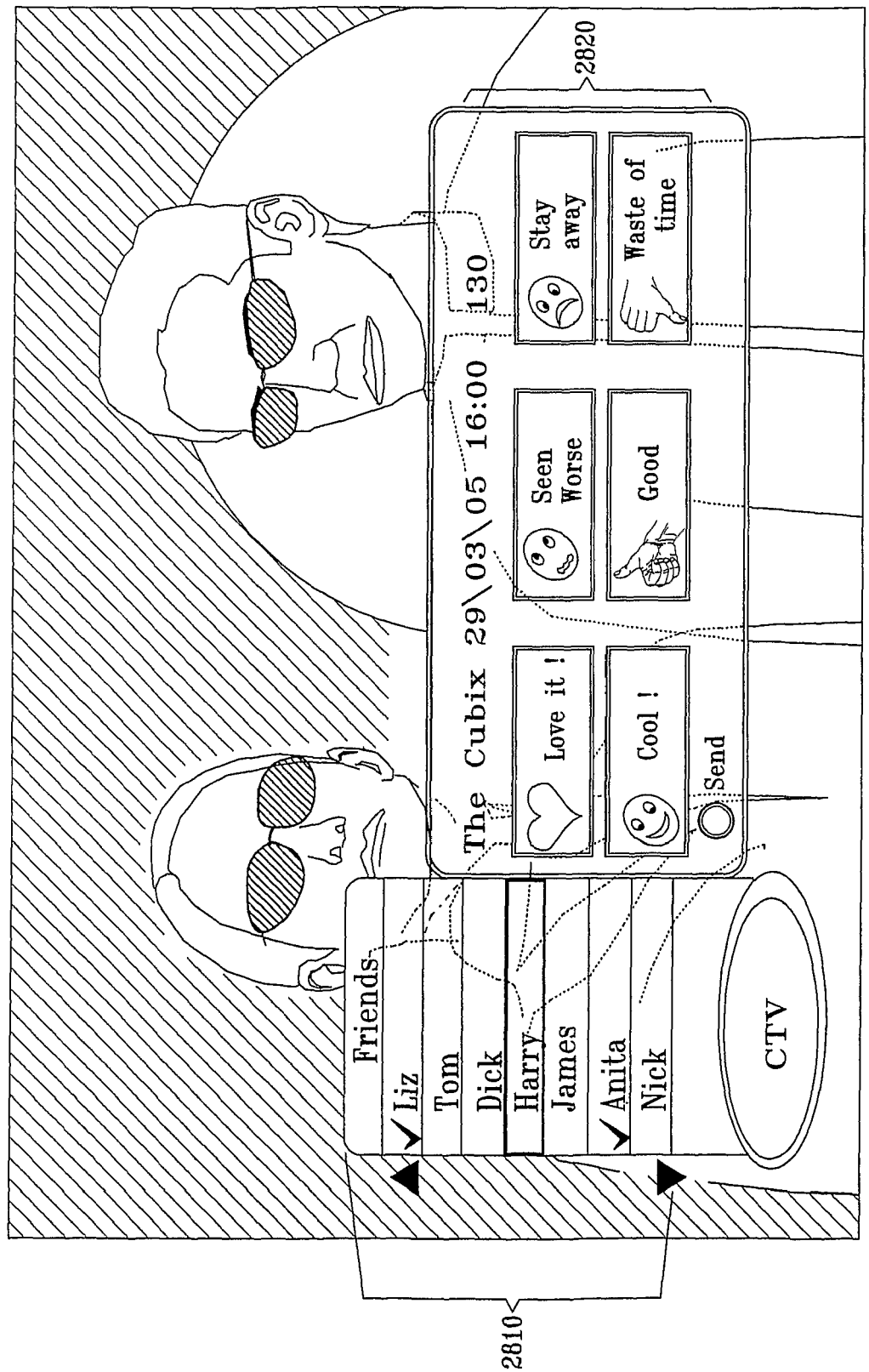

Reference is now made to FIGS. 27-28, which are simplified illustrations of preferred embodiments of various screens for a Peer Recommendations feature, the Recommendations feature being constructed and operative in the system of FIG. 1. The above discussion of FIGS. 22-26 focuses on receiving recommendations. The following discussion of FIGS. 27-28 concerns a mechanism for an individual user to provide viewer recommendations.

The viewer preferably is able to define, through a setup screen, which friends the viewer wants to send and/or receive recommendations to /from, and what communities the viewer wants to participate in. The peer recommendations feature, in preferred embodiment thereof, preferably enables the viewer to send viewer recommendations or opinions about viewed programs to friends and/or viewer communities.

Reference is now specifically made to FIG. 27, which depicts a preferred embodiment of a menu 1020 depicting how a user can select "Recommend". The viewer is preferably able to invoke Recommend by selecting Recommend 2710 from the menu 1020.

Reference is now specifically made to FIG. 28, which is a preferred embodiment of a preferred embodiment of a user voting screen for the peer recommendations feature. The viewer is preferably able to see a list 2810 of friends and viewer communities the viewer participates in. The viewer is preferably able to select some friends (depicted as having a check mark by their names in FIG. 28) in order to recommend the current program to the selected friends. A set of pre-defined mood icons 2820 preferably enables the viewer to rate a presently viewed program.

The selected friends are preferably able to see the viewer's recommendations together with recommendations from other sources using the recommendations feature described above with reference to the discussion of FIGS. 22-26.

Those skilled in the art will appreciate that the peer recommendations feature described herein preferably enables further:
chat rooms in order to chat with friends in order to discuss the rated program; and
saving and viewing recommendation history, thereby storing a list of what recommendations were given to each friend, and when the recommendations were given.

The viewer's STB preferably comprises a peers directory. The peers directory preferably enables a viewer to find an address of a peer in a way similar to an address book supplied by e-mail or chat software. Peer-to-peer recommendations will be sent directly from the viewer to the friend. In addition every peer recommender will be treated as a separate group in the system of FIG. 1, described above. The separate group will participate in collaborative rating prediction, ranking and recording for other TV programs.

Reference is now made to FIGS. 29-32, which are simplified illustrations of preferred embodiments of various screens for a Communities Recommendations feature, the Recommendations feature being constructed and operative in the system of FIG. 1. The present invention, in preferred embodiment thereof, preferably enables TV viewers to unite in thematic communities according to viewer viewing interests. The viewer communities are preferably platform moderated and preferably support viewer chat and viewer voting.

The viewer is preferably able to join a community through the setup screen. Information about the communities the viewer participates in is preferably stored in the viewer's profile. Using viewer communities enables viewers to:
choose to participate in at least one community from the set of communities;
view a rated list of programs that are recommended by a selected community; and
participate in a viewer community chat.

Figure 29:
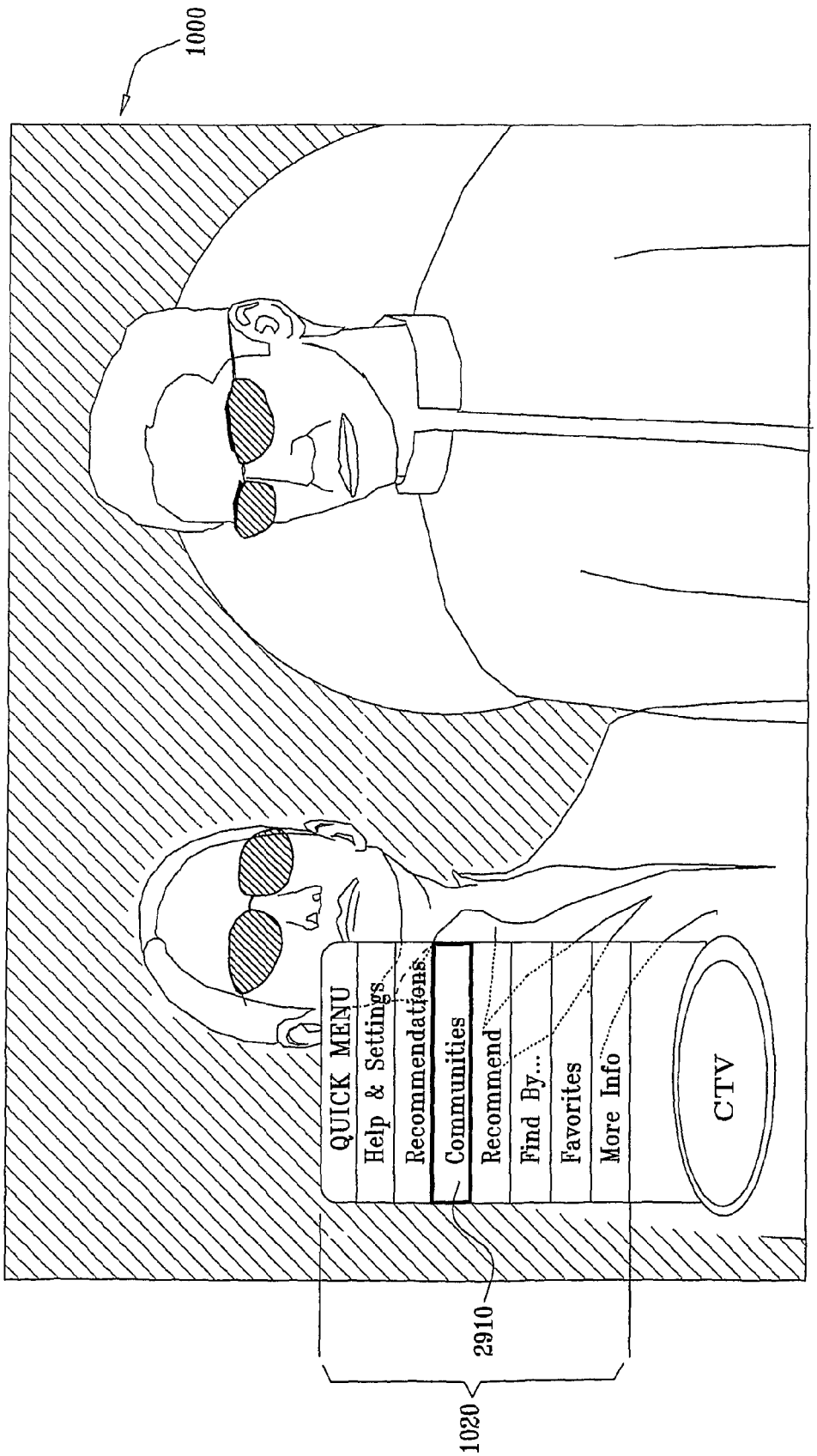
FIGS. 29-32 are simplified illustrations of preferred embodiments of various screens for a Communities Recommendations feature, the Recommendations feature being constructed and operative in the system of FIG. 1.

Reference is now specifically made to FIG. 29, which depicts a preferred embodiment of a method a user can select the "Communities" options from a menu 1020. The "Communities" screen may be opened at any time through the "Communities" 2910 menu 1020 item.

Figure 30:
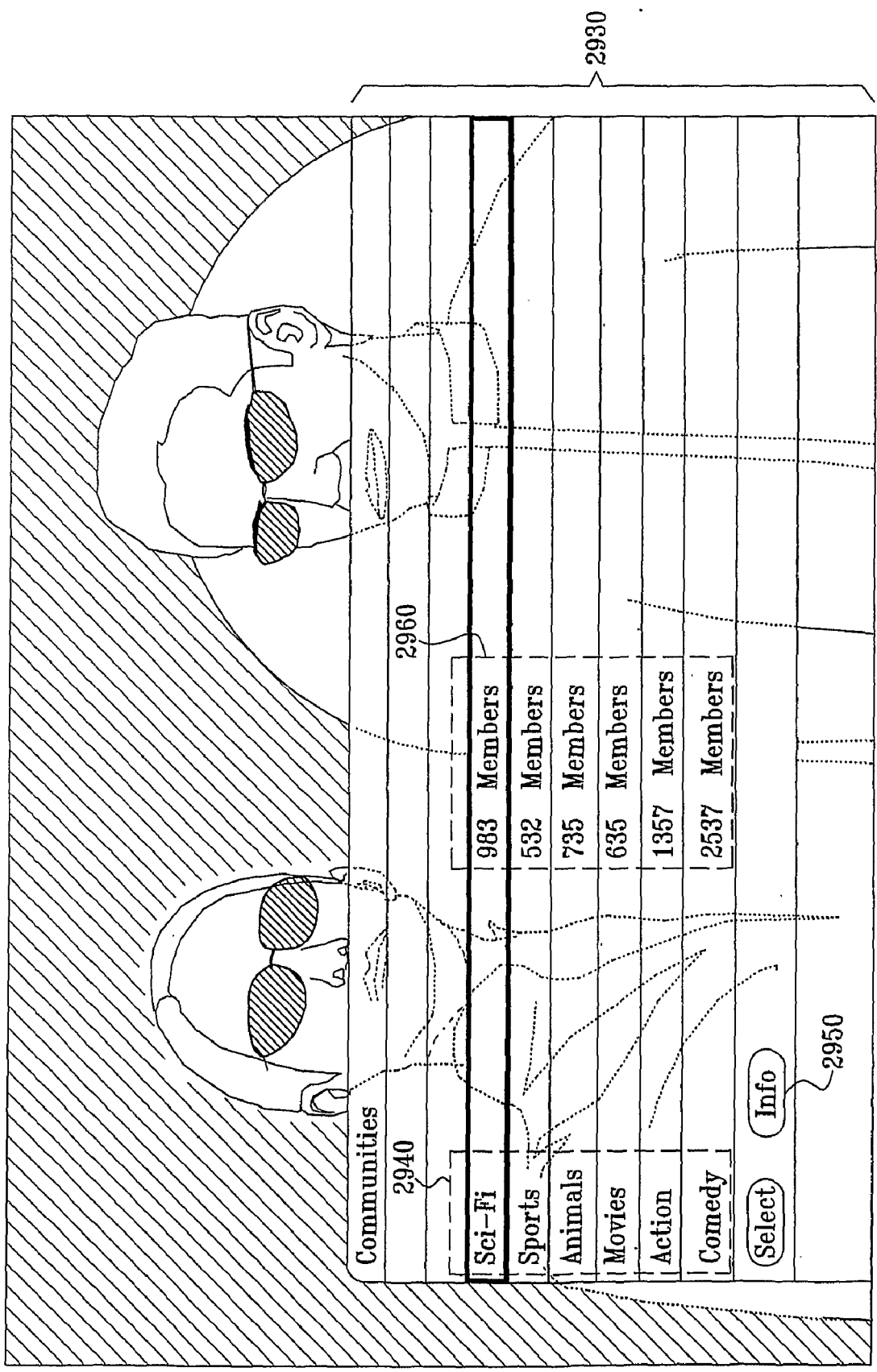

Reference is now made to FIG. 30, which is a depiction of a preferred embodiment of a "Community Choice" 2930 screen. Upon choosing the "Communities" menu item 2910 (FIG. 29), the viewer is preferably able to choose a desired community through the "Community Choice" 2930 screen. This screen includes the list of communities 2940 the viewer participates in and permits navigation through the list. If the viewer presses the "Info" button 2950, the viewer is preferably able to obtain additional information about the selected community. In some preferred embodiments of the "Community Choice" 2930 screen, an indication of the number of members of each community 2960 also appears.

Figure 31:
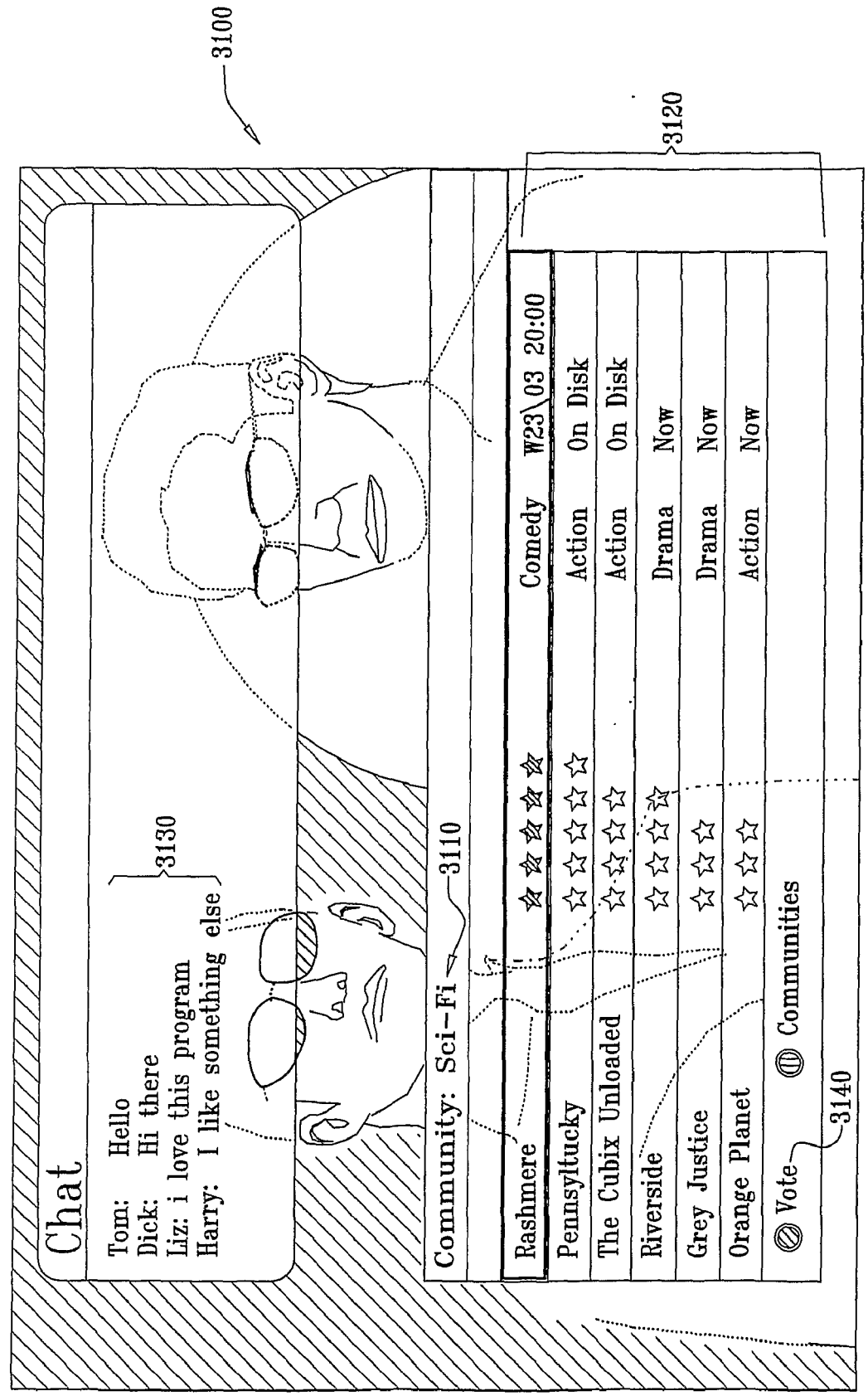

Reference is now made to FIG. 31, which is a preferred embodiment of a "Community" screen 3100. FIG. 31 depicts a community screen for a particular community, namely, the Sci-Fi community 3110. When the viewer selects a community from the list 2940 (FIG. 30), the viewer preferably enters the "Community" screen 3100 of the specified community 3110. The viewer is preferably able to see a rated list 3120 of presently available programs, the programs being programs that are recommended by the specified community 3110. The viewer is also preferably able to participate in the community chat 3130.

Figure 32:
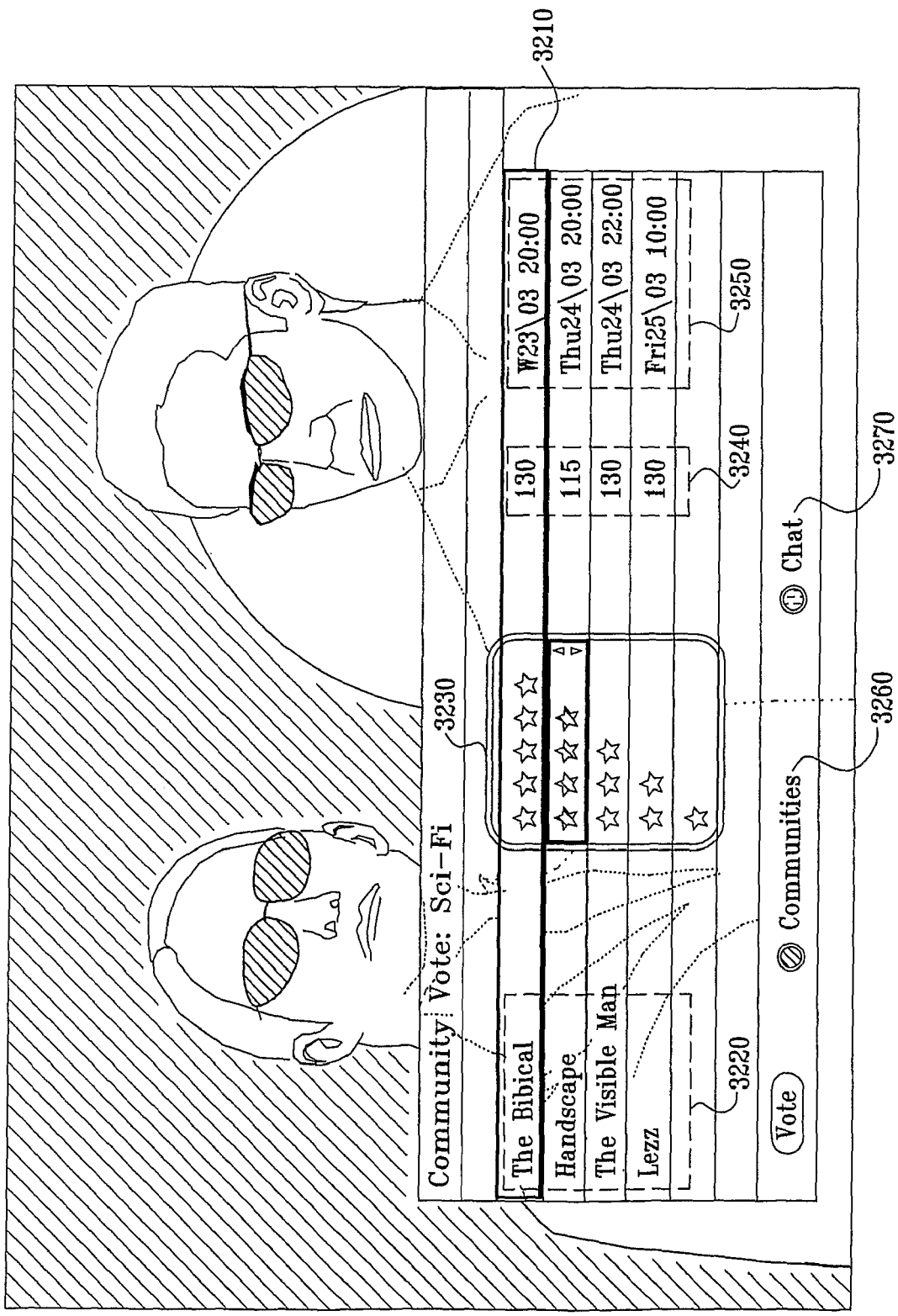

Reference is now made to FIG. 32, which is a preferred embodiment of a "Community Voting" screen. The viewer is preferably able to vote in a community vote, thereby enabling the viewer to evaluate programs that are to be recommended by the community for future viewing. In order to vote, the viewer preferably presses a "Vote" button 3140 (FIG. 31), and preferably enters the "Community Voting" screen. The viewer is preferably able to select one movie 3210 in a list of movies 3220 for rating 3230. A channel 3240 and a date and time 3250, indicating a next time possible to view a movie in the list of movies 3220, is preferably indicated.

From the community voting the viewer may preferably press Communities 3260 in order to return to the community chat screen (see FIG. 31), or the viewer may preferably press Chat 3270 in order to return to the "Community Choice" screen (see FIG. 30).

It is appreciated that each community is a type of recommender, as discussed above, with reference to FIG. 23. The major difference between communities and recommendations is that communities are preferably established and registered within the system, and viewers preferably join or leave a particular community. On the other hand, recommenders are branded. It is appreciated that community recommendations require an extensive usage of return path connectivity.

Each Community is a recognized user group within the system of FIG. 1, as described above. As such, each community preferably participates in collaborative rating prediction, ranking and recording of the rest of TV programs.

Those skilled in the art will appreciate that preferred implementations of communities preferably enable organization of a platform supported community that chooses and recommends thematic content on behalf of participants in the community. Additionally, actual viewers' participation in the community's decisions through interactive voting preferably increases validity of community decisions.

Reference is now made to FIGS. 33-37, which are simplified illustrations of preferred embodiments of various screens for a Contextual Search feature, the Contextual Search feature being constructed and operative in the system of FIG. 1. Contextual search preferably enables the viewer to initiate a context-based search. The viewer preferably chooses a search criterion from a search menu and runs the search; search parameters are taken from present screen context. The viewer is preferably not required to add any additional information in order to complete the search.

Figure 33:
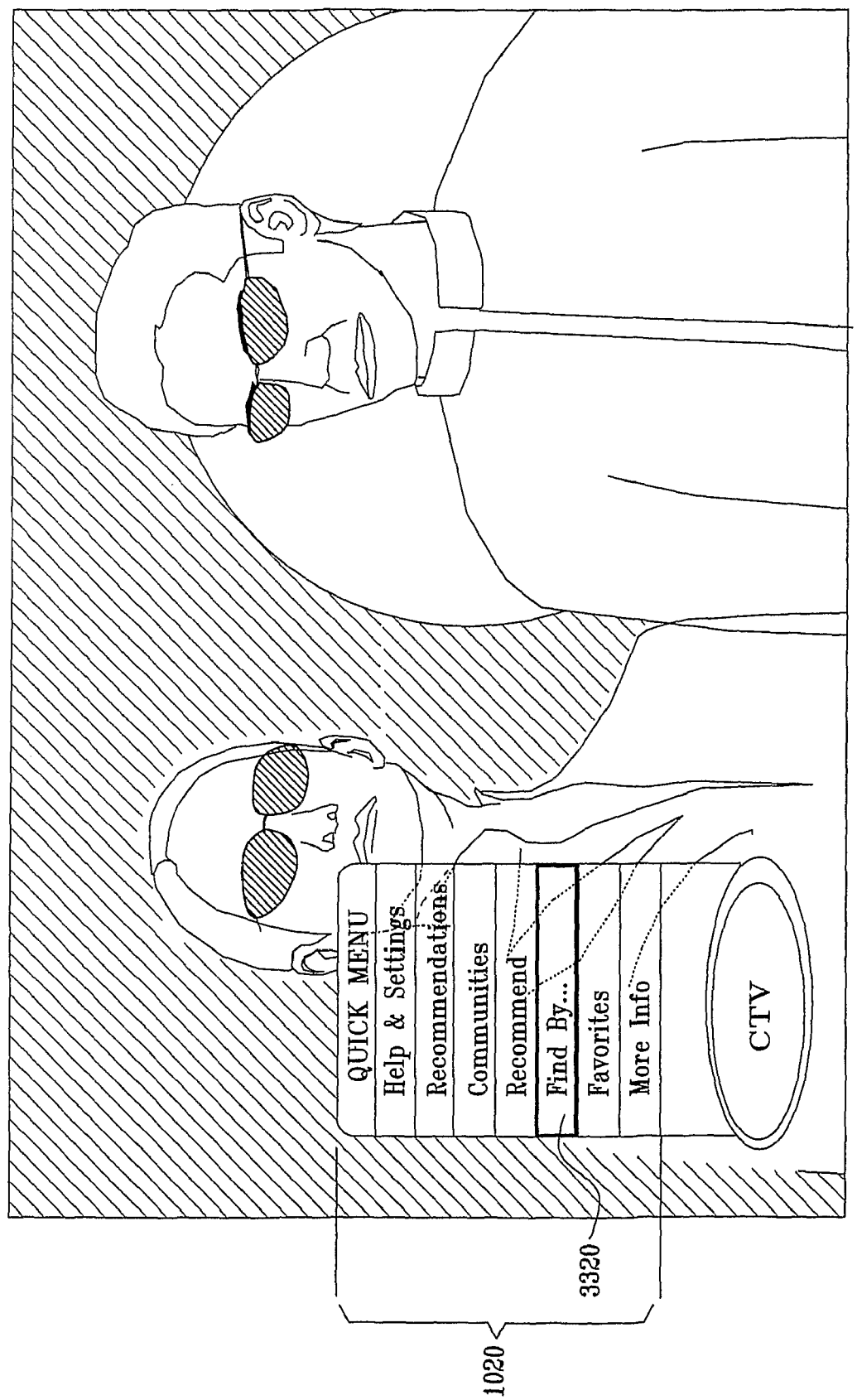
FIGS. 33-37 are simplified illustrations of preferred embodiments of various screens for a Contextual Search feature, the Contextual Search feature being constructed and operative in the system of FIG. 1.

Reference is now specifically made to FIG. 33, which depicts a preferred embodiment of a method by which a user may select a start screen of a contextual search from a menu 1020. A contextual search screen may be opened by selecting a Find By . . . 1020 menu 3320 item. It is appreciated that the viewer is preferably able to pause viewing before opening the menu 3320.

Figure 34:
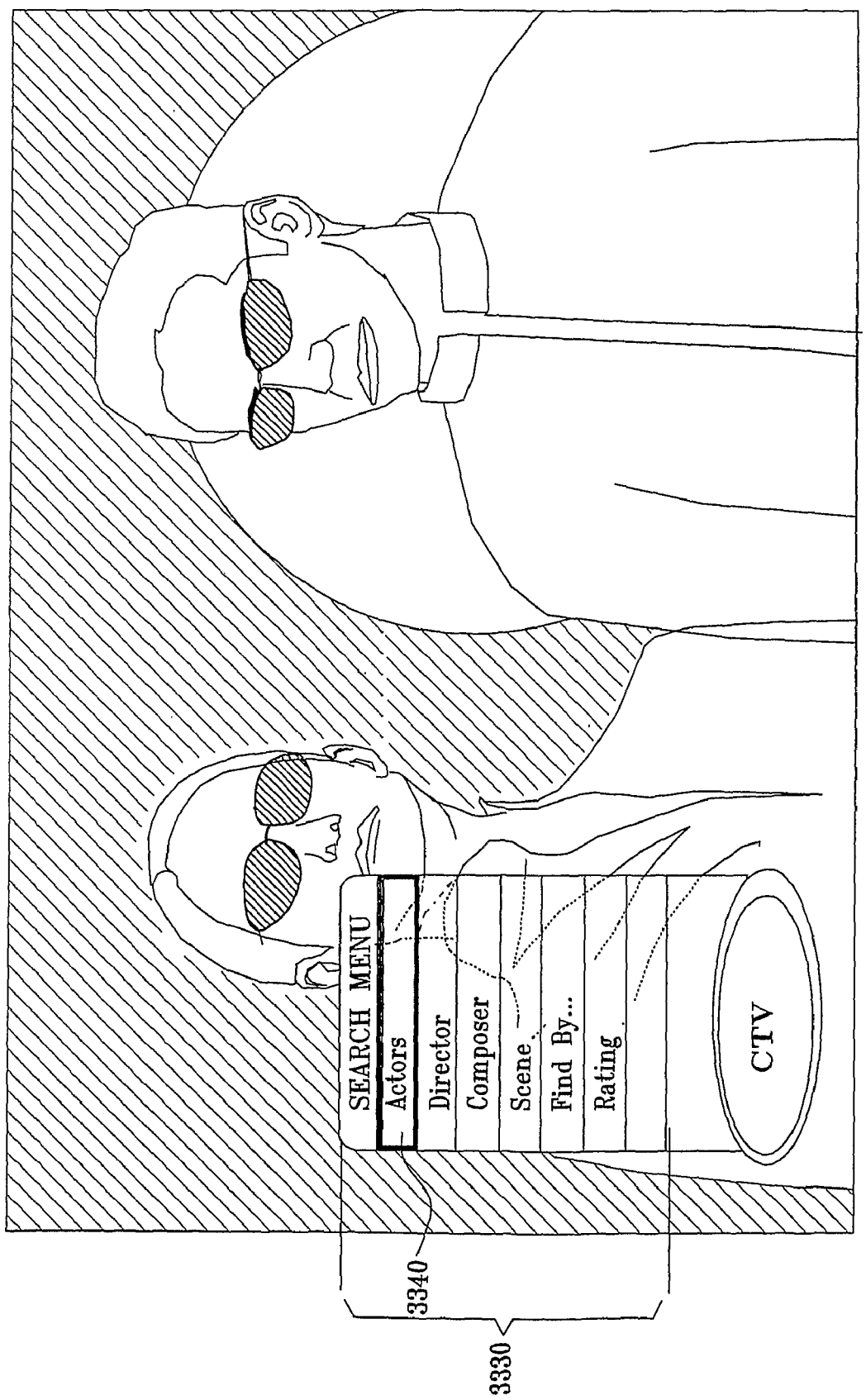

Reference is now specifically made to FIG. 34, which depicts a preferred embodiment of a search menu 3330. The viewer is preferably able to initiate a contextual search by choosing a criterion from the search menu 3330. A set of search criteria offered in the search menu 3330 depends on a category of the presently viewed program.

Program categories are preferably determined from metadata associated with the presently viewed program. For example and without limiting the generality of the foregoing, program categories may comprise genre metadata assigned to the presently viewed program.

The following table describes possible preferred criteria sets of contextual searches, wherein an actual contextual search preferably depends on the program category of the presently viewed program.

| | Menu Item | | | | |
|---|---|---|---|---|---|
| Category | 1 | 2 | 3 | 4 | 5 |
| Movie | Actor | Director | Composer | Scene | Rating |
| Sports | Sportsman | Team/ League | Kind | Event | Statistics and Scores |
| Promo/ Ad | Product | Group of Products | Manufacturer | Application | Prices & Technical Characteristics |
| Talk Show | Moderator | Participants | Topic | | Rating |
| News | Anchorman | Area | Topic | Reporter | Statistics |
| Music | Composer | Name | Music Genre | Performer | Rating |

In a contextual search, the viewer preferably does not enter any search parameters. The search parameters are preferably obtained automatically from the metadata of the presently viewed program. The viewer can combine a few search criteria Search criteria are preferably entered through the setup screen, described below.

Figure 35:
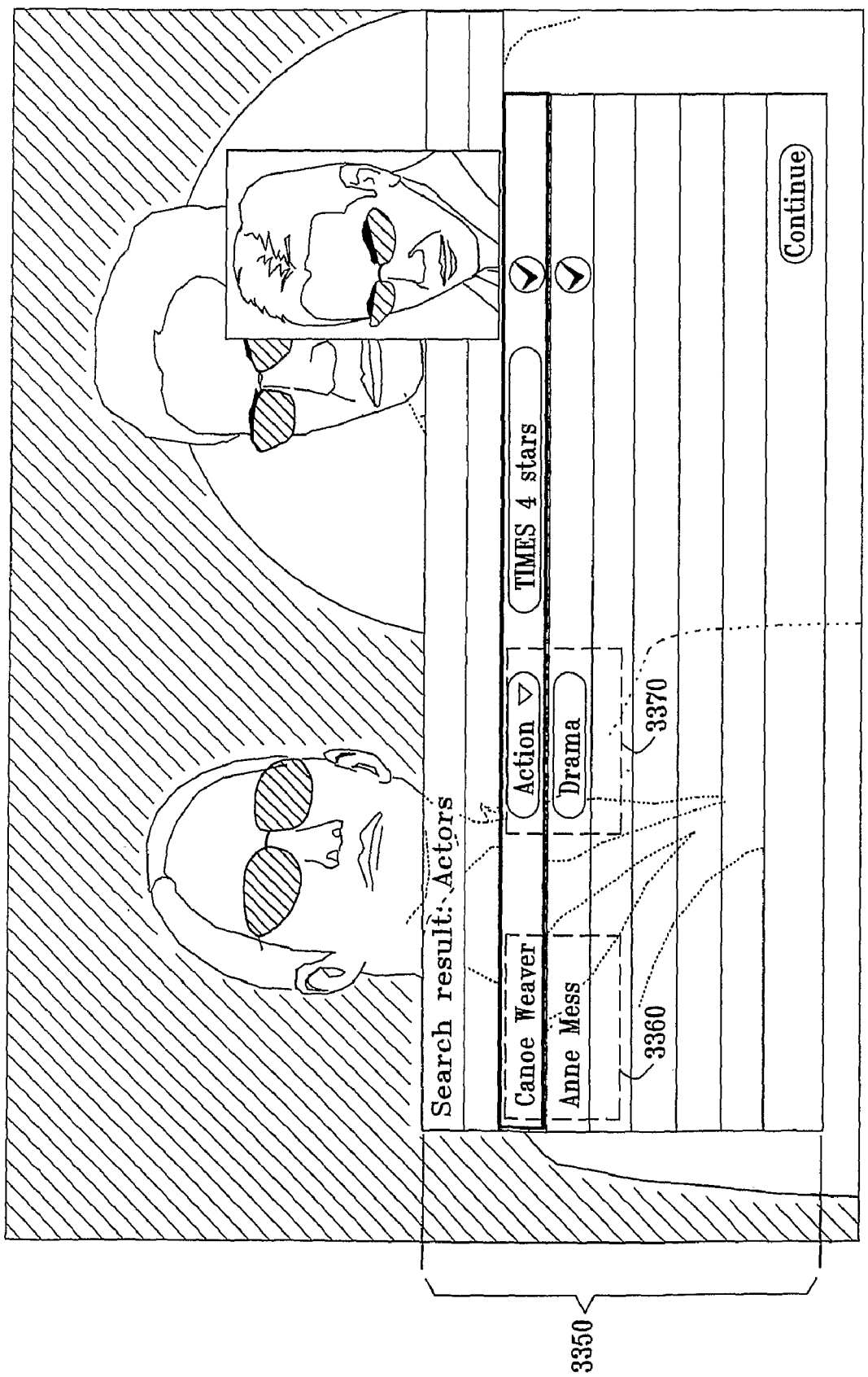

Reference is now additionally made to FIG. 35, which depicts a preferred embodiment of a screen enabling the viewer to choose desired genres for actors physically depicted on the presently viewed screen. Continuing with the non-limiting example given in FIGS. 33 and 34, FIG. 35 assumes that the viewer choose the Actors search criteria 3340 from the search menu 3330. A menu 3350 listing names of actors 3360 physically depicted on the presently viewed screen. The viewer is preferably able to choose, for example and without limiting the generality of the foregoing, movies of a particular a genre 3370 in which the viewer wants to find these particular actors. For instance, following as depicted in FIG. 35, the viewer may search for Action movies in which Canoe Weaver appears, or Drama movies in which Anne Mess appears.

Figure 36:
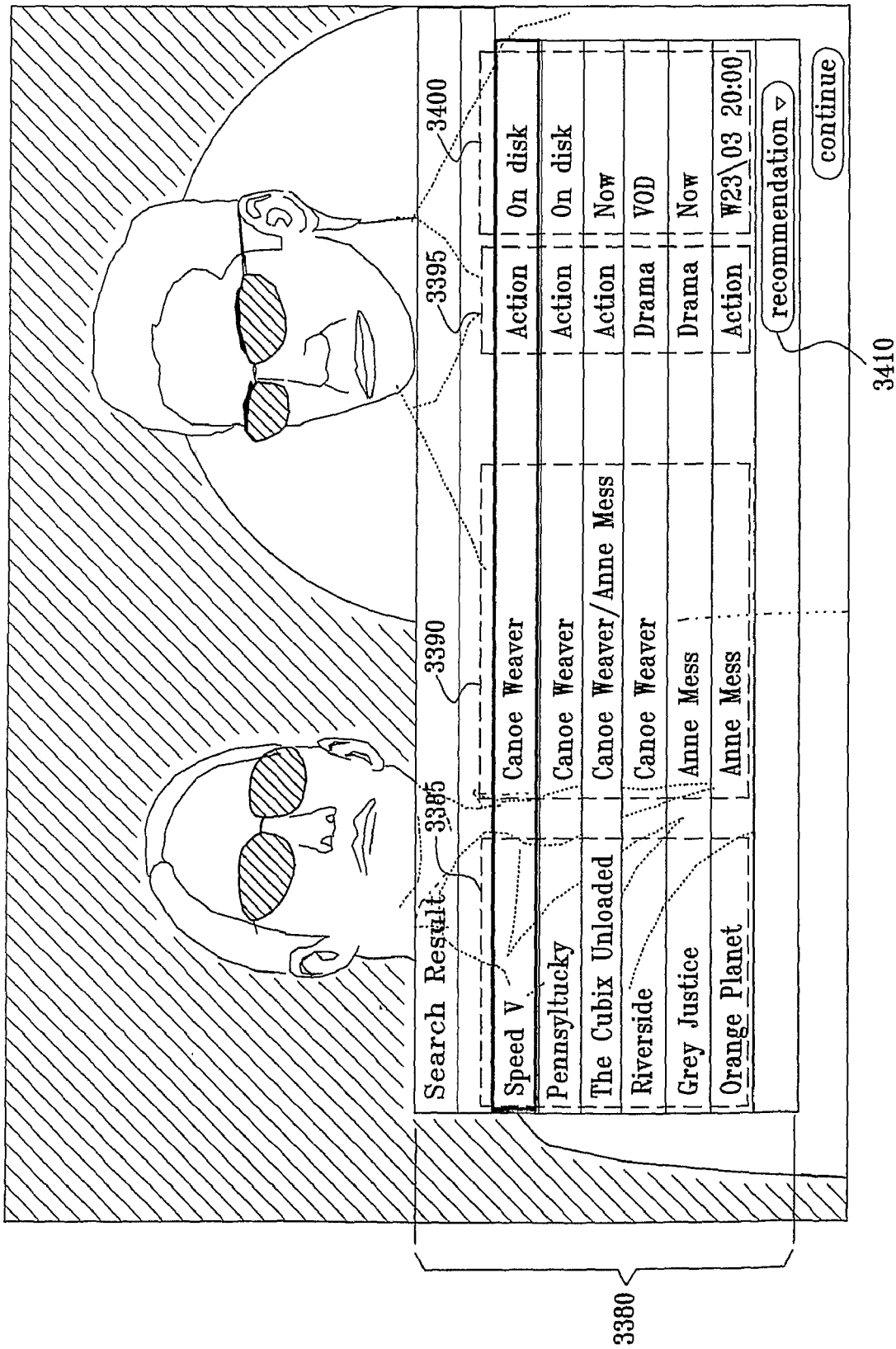

Reference is now specifically made to FIG. 36, which depicts a preferred embodiment of a search results screen 3380 displaying search results for actors presently appearing on the screen and the chosen genre, as described above. It is appreciated that for non-movie programs (e.g. sports, news, etc.) the search criteria and, thus, the "Search Menu" content are preferably different (as described in the table, above). The search results screen 3380 preferably provides a list of movies 3385, a list 3390 of which actors presently appearing on the screen appear in each movie in the list of movies 3385, the genre 3395 of each movie in the list of movies 3385, and a location or date and time 3400 of a next showing of each movie in the list of movies 3385. An option button 3410 preferably enable the viewer to view a recommendation for the selected movie.

Figure 37:
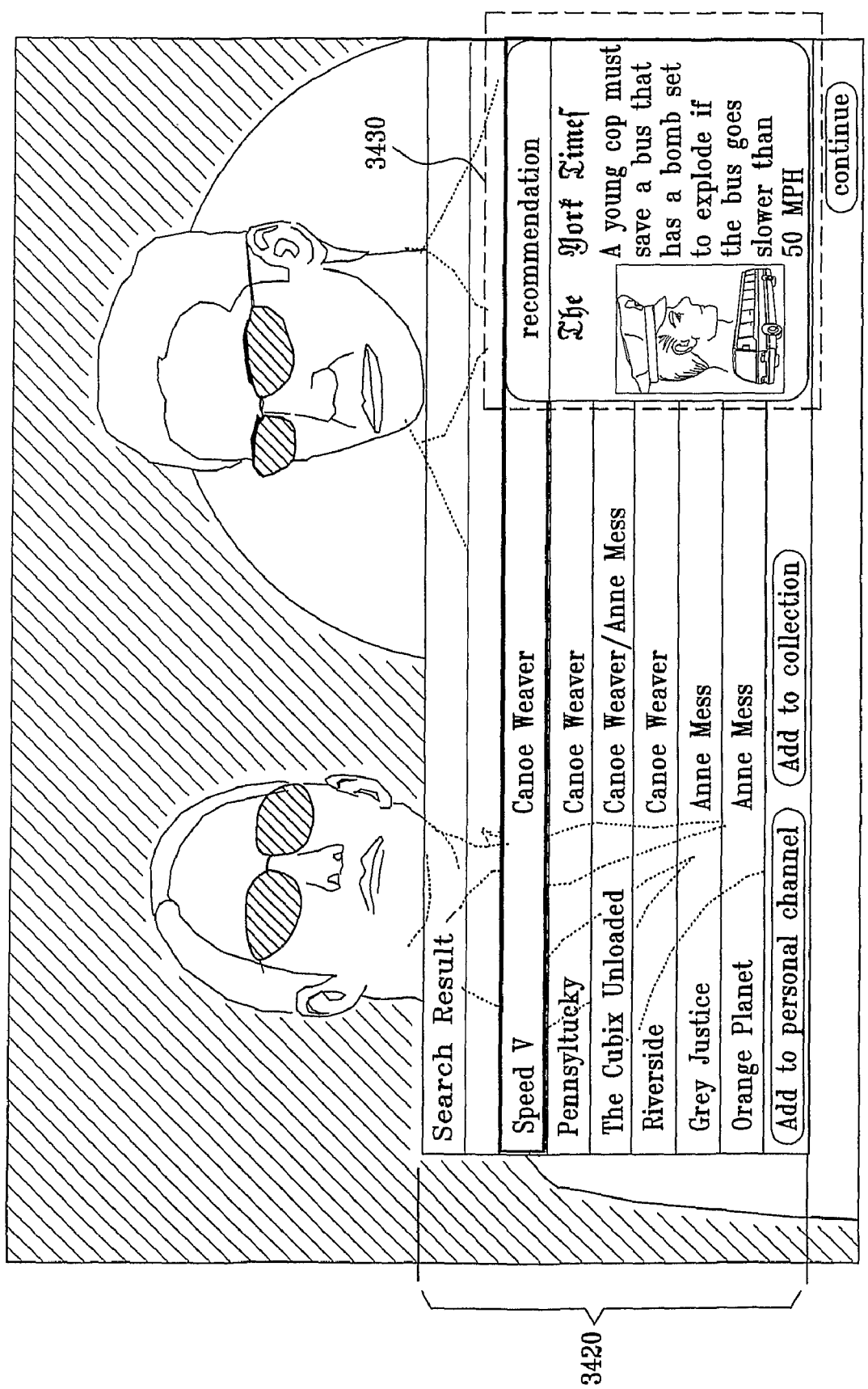

Reference is now specifically made to FIG. 37, which depicts a preferred embodiment of a screen 3420 displaying a recommendation 3430 of the selected movie.

Contextual search, as described herein above preferably is performed on the basis of descriptive meta-data supplied for each program. However, typically, multiple TV programs will match the specified criteria and therefore it is reasonable to assume that, in many instances, the number of TV programs matching the specified criteria will be greater than number of lines the viewer could comfortably read on one screen. Therefore, a need to order search results according to some criteria arises.

Contextual Search preferably uses the ranking capabilities described above, with reference to the system of FIG. 1, in order to sort contextual search results. Contextual search results are preferably sorted according to collaborative rating prediction of each program, such that preferably the first 5-7 lines of search results preferably present titles of programs comprising the programs with the highest probability that the program will be appreciated by the viewer.

Those skilled in the art will appreciate that contextual search, as described in preferred implementations hereinabove, does not require the viewer to type any information and enter a deep menu hierarchy. Furthermore, contextual search allows using the presently viewed screen to obtain the search parameters automatically, search parameters vary according to the current program genre, and search results may be accompanied with recommendations.

Figure 38:
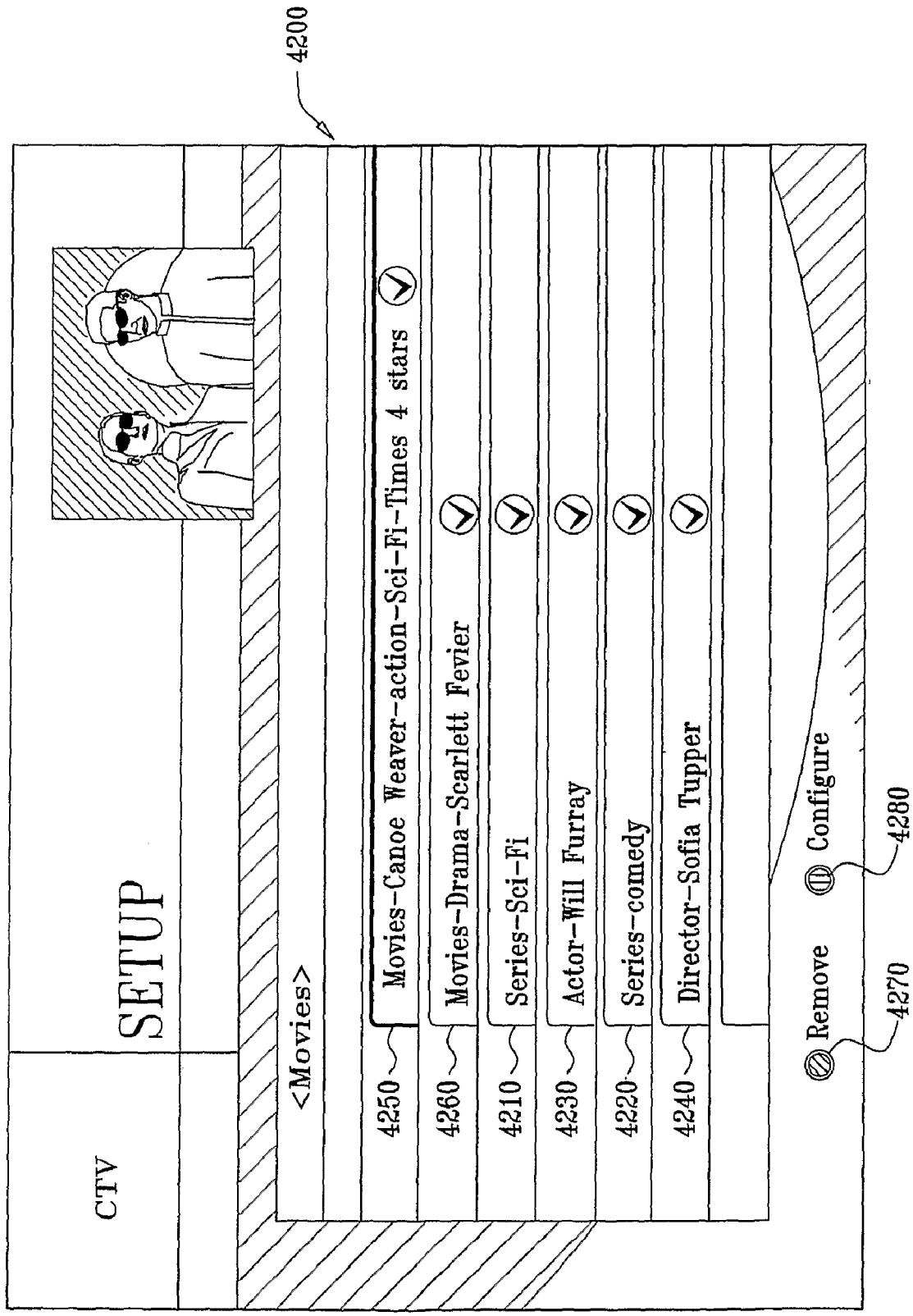
FIG. 38 is a simplified illustration of a preferred embodiment of a setup screen.

Reference is now made to FIG. 38, which is a simplified illustration of a preferred embodiment of a setup screen. At any time the viewer feels that program selection does not fit the viewer's requirements, the viewer is preferably able to enter the Setup screen 4200 and tune configuration rules for the automatic content selection.

The configuration rules define selection criteria to include, and thereby record, programs or program segments for later viewing on the personal channel. The configuration rules are preferably based on program genres 4210, 4220; credits, such as actor 4230, or director 4240; ratings, and so forth, and are preferably combined with a logical OR relation for content selection. Additionally, individual selection criteria preferably combine individual rules with a logical AND. For example and without limiting the generality of the foregoing, a selection criteria may comprise: "Any movie starring Canoe Weaver, in the Science Fiction genre, with a rating of at least 4 stars" 4250, or "Any movie in the drama genre starring Scarlett Fevier" 4260.

The viewer can use a Remove button 4270 and a Configure button 4280 in order to change, add and remove the configuration rules from the configuration rule list on the Personal Channel Setup screen 4200.

Figure 39:
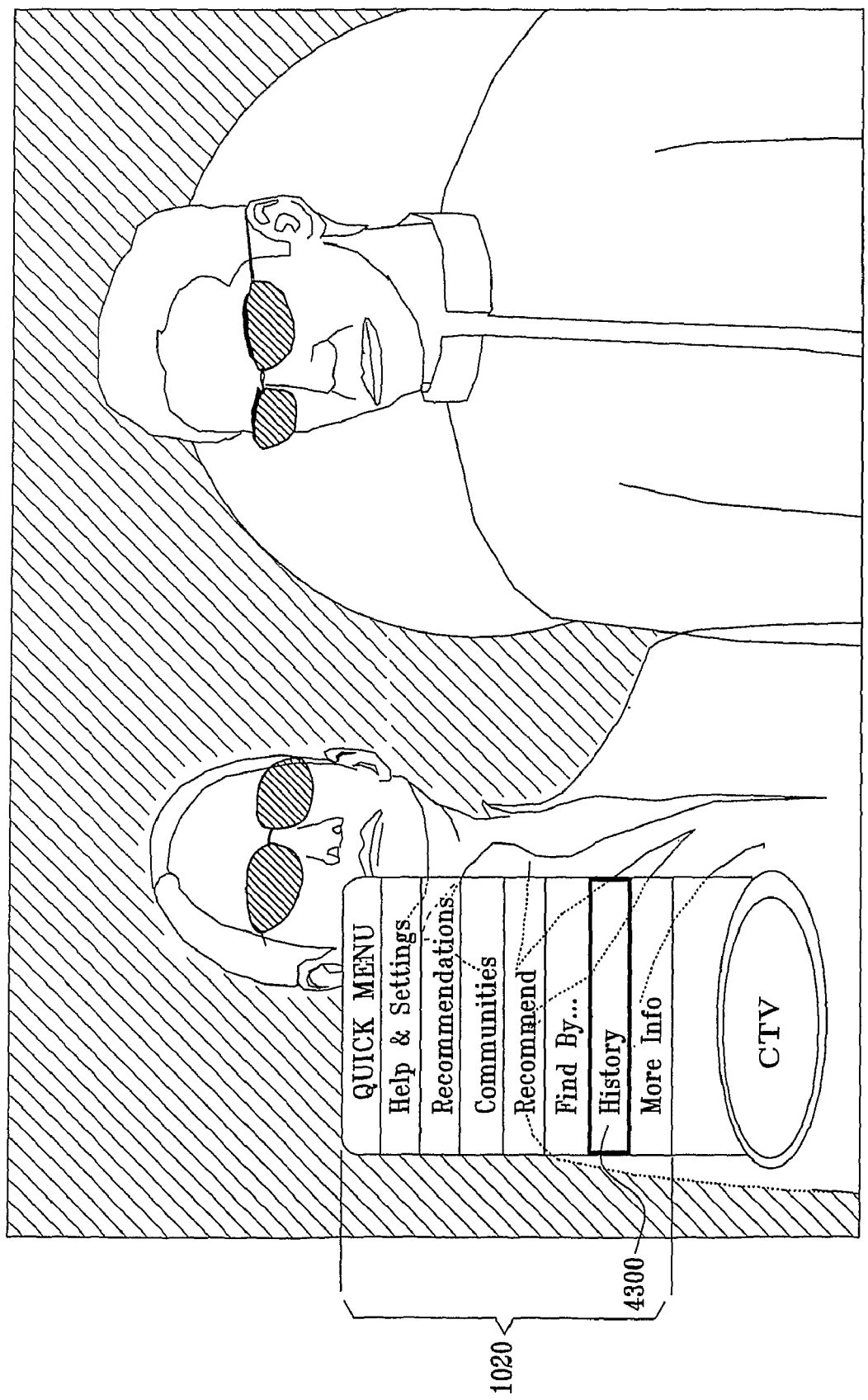
FIGS. 39-41 are simplified illustrations of preferred embodiments of various screens for a TV Viewing History feature, the TV Viewing History feature being constructed and operative in the system of FIG. 1.
Figure 40:
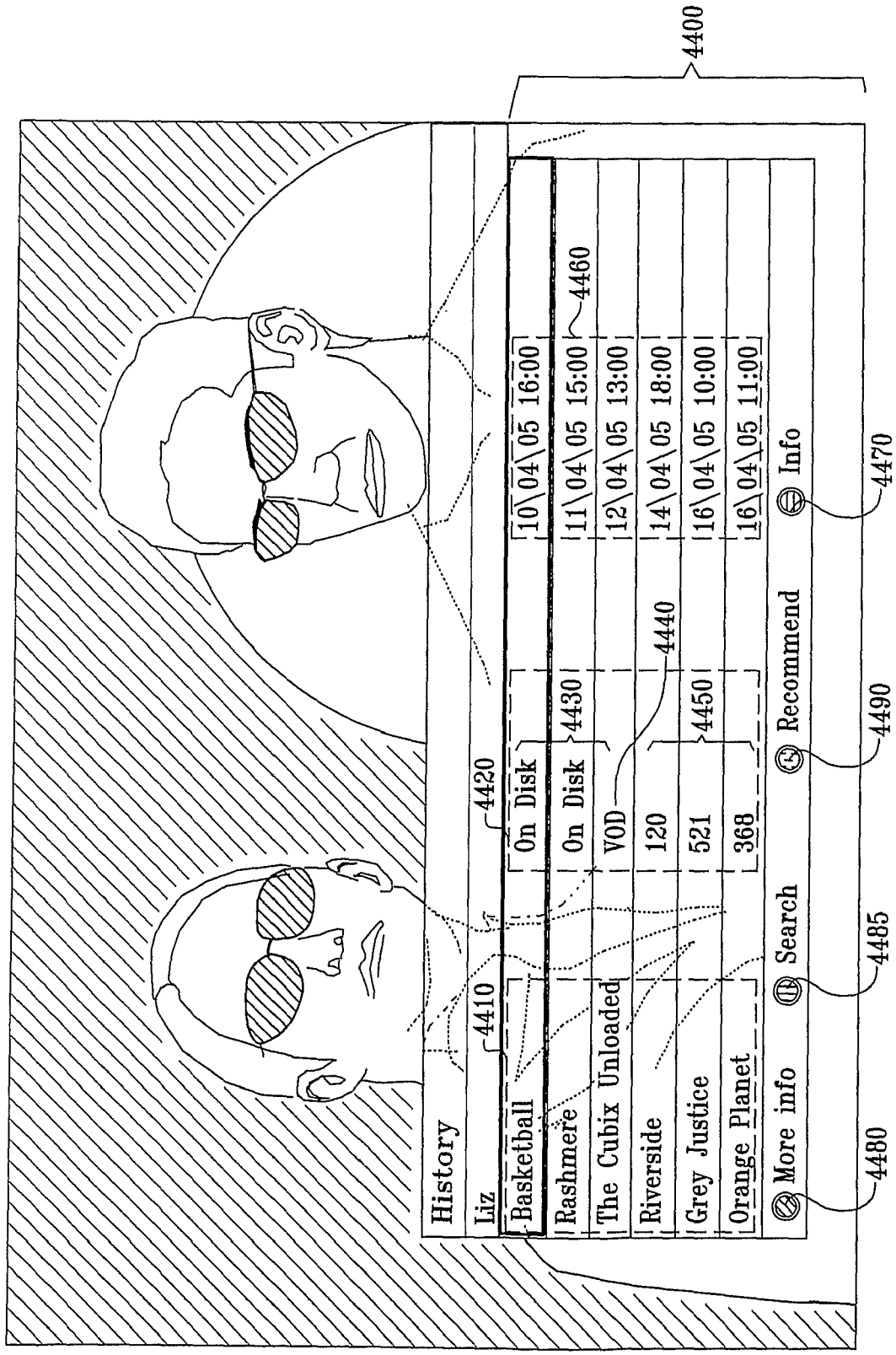
Figure 41:
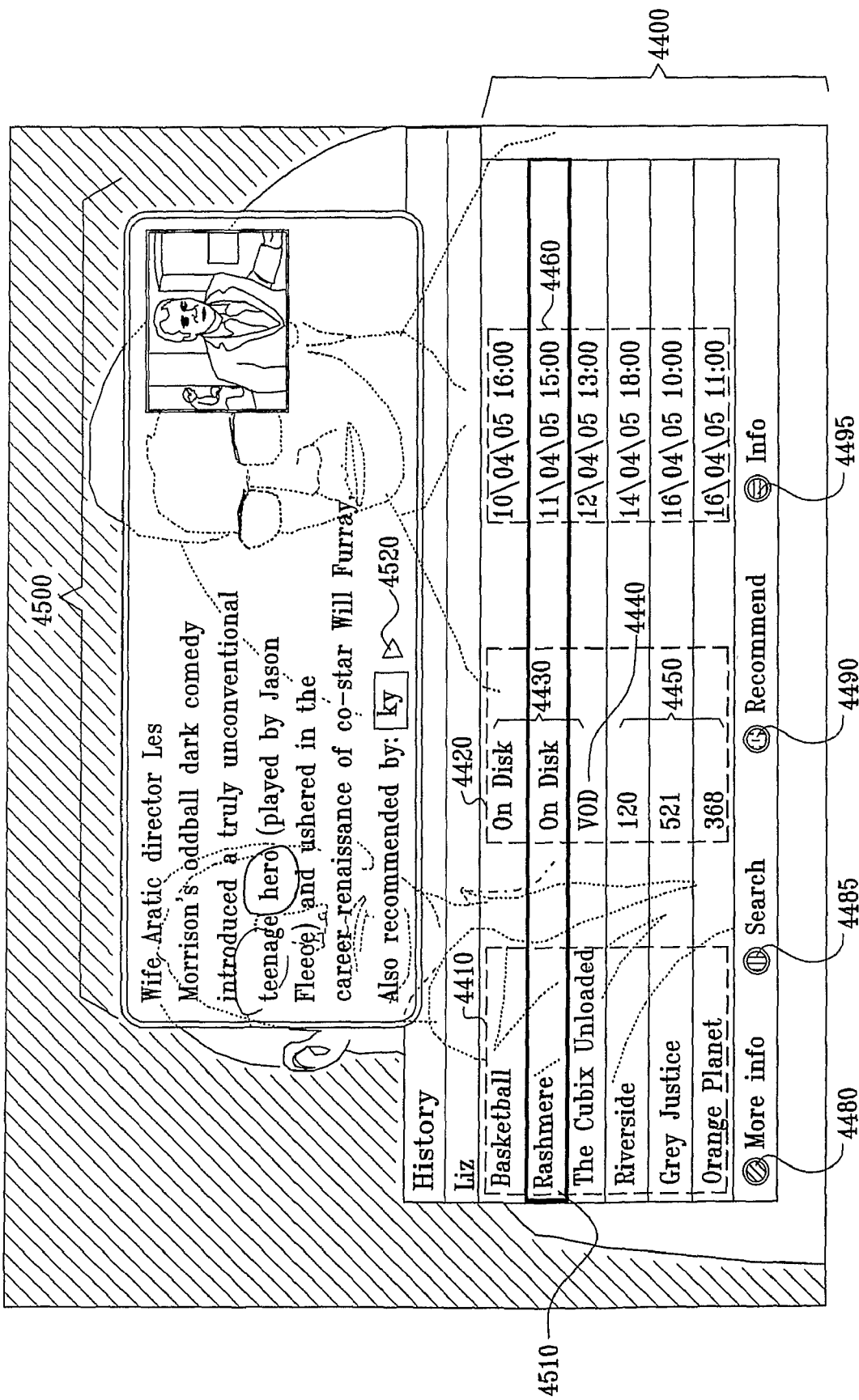
Figure 42:
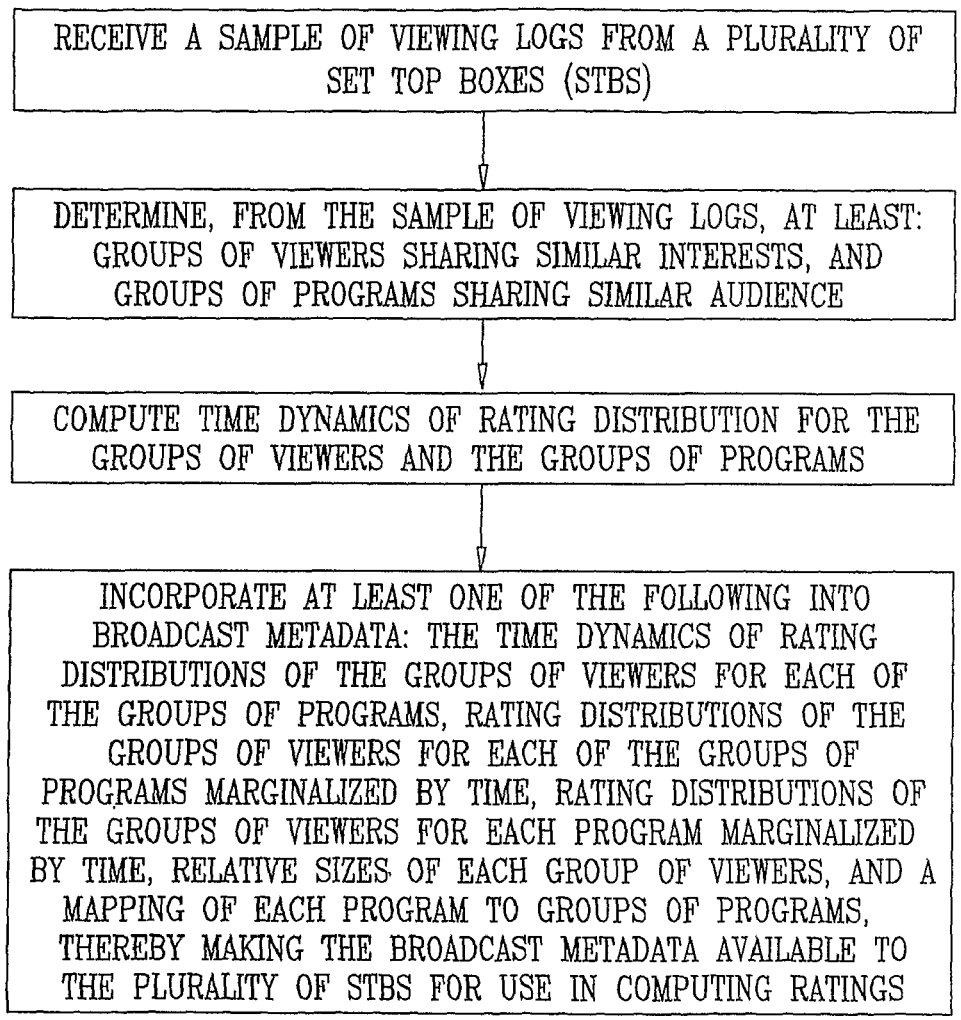
FIGS. 42-50 are simplified flowchart illustrations of preferred methods of operation of the system of FIG. 1 in accordance with preferred embodiments thereof.
Figure 43:
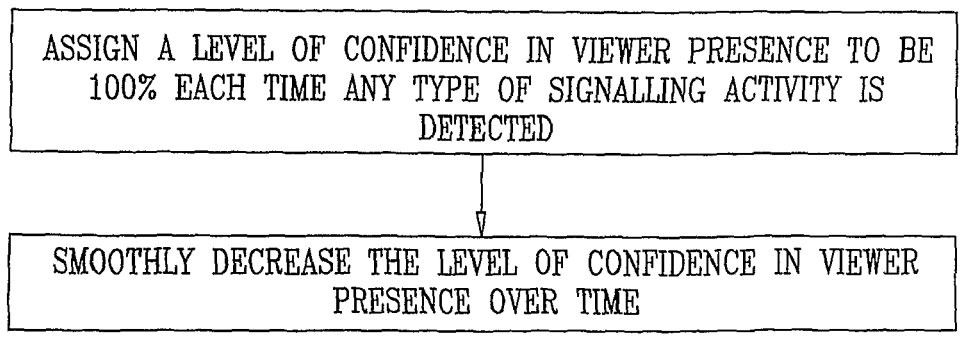
Figure 44:
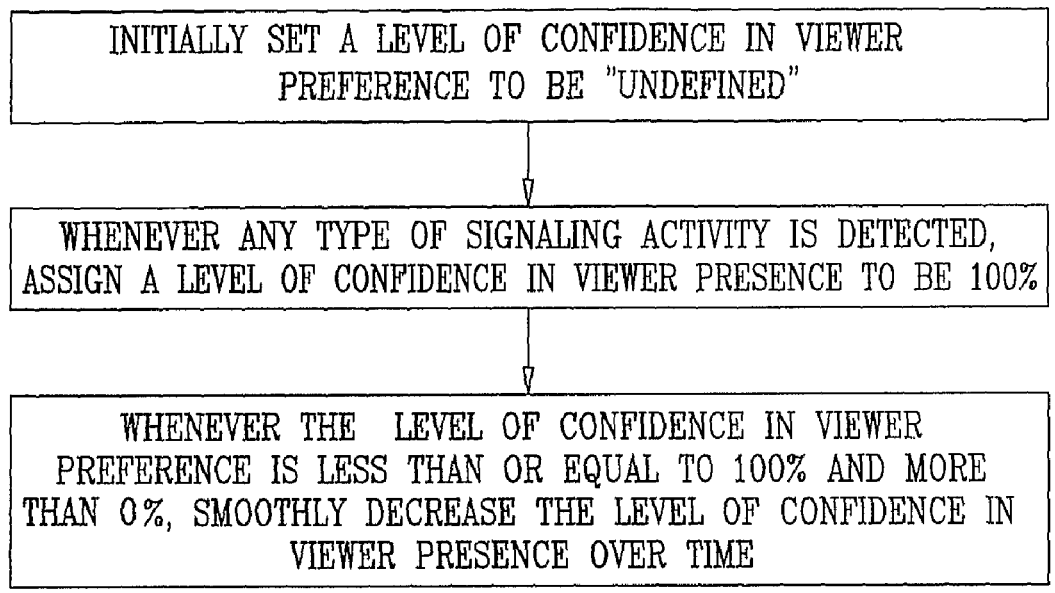

Reference is now made to FIGS. 39-41, which are simplified illustrations of preferred embodiments of various screens for a TV Viewing History feature, the TV Viewing History feature being constructed and operative in the system of FIG. 1. The Viewing History feature preferably enables the viewer to see and navigate through a list comprising information about the last programs that have been actually viewed.

Reference is now specifically made to FIG. 39, which depicts a preferred embodiment of a screen enabling the viewer to enter Viewing History. Viewing History is preferably opened at any time during viewing, preferably by displaying the menu 1020 and choosing of the History 4300 menu item.

Reference is now specifically made to FIG. 40, which depicts a list 4400 of recently viewed programs 4410. A location indicator 4420, indicative of the location from which the viewer viewed the program, is preferably displayed. The location indicator preferably indicates if the program was viewed as a recorded program from the STB hard drive 4430, if the program was viewed as a video-on-demand program 4440, or if the program was viewed from a particular channel 4450. Additional appropriate locations may be indicated as needed. Additionally, the list 4400 also indicated a date and time 4460 of viewing of each program in the list.

Content displayed in the Viewing History list 4400 preferably depends on the present viewer's viewer profile. The list 4400 preferably comprises only the programs that the present viewer has actually seen. It is appreciated that programs which were zapped through are preferably not displayed. A minimum viewing time, such as, and without limiting the generality of the foregoing, 1 minute, preferably indicates that the program was viewed and not zapped through.

From the screen depicted in FIG. 40, the viewer is preferably able to select a program from the list 4400, and:

press an Info button 4470 in order to view a synopsis of the program, the program synopsis also comprising recommendations;

utilize the More Info screens, described above with reference to FIGS. 18-21, by pressing a More Info button 4480;

utilize the Contextual Search screens, described above with reference to FIGS. 33-37, by pressing a Contextual Search button 4485;

utilize the Peer Recommendations screens, described above with reference to FIGS. 27-28, by pressing a Recommend button 4490; and view the selected program, preferably by pressing OK or select on the remote control. It is appreciated that in order to view a program which was broadcast in the past, the program is preferably automatically recorded on the STB hard drive.

Figure 45:
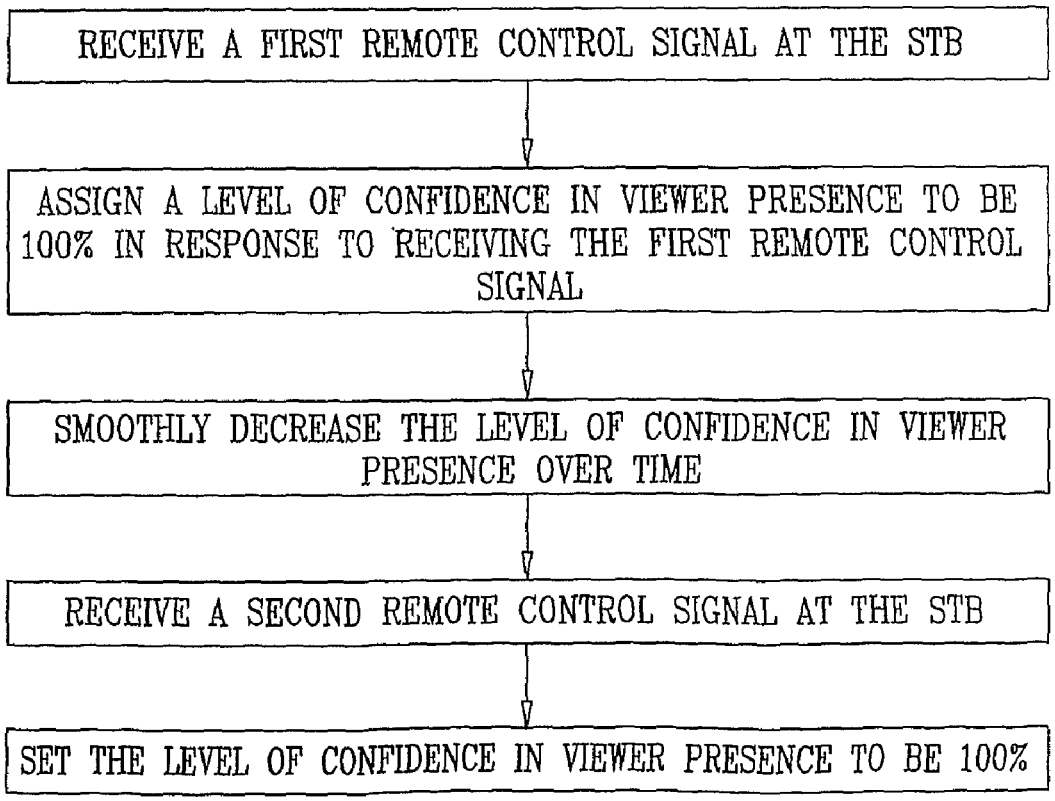
Figure 46:
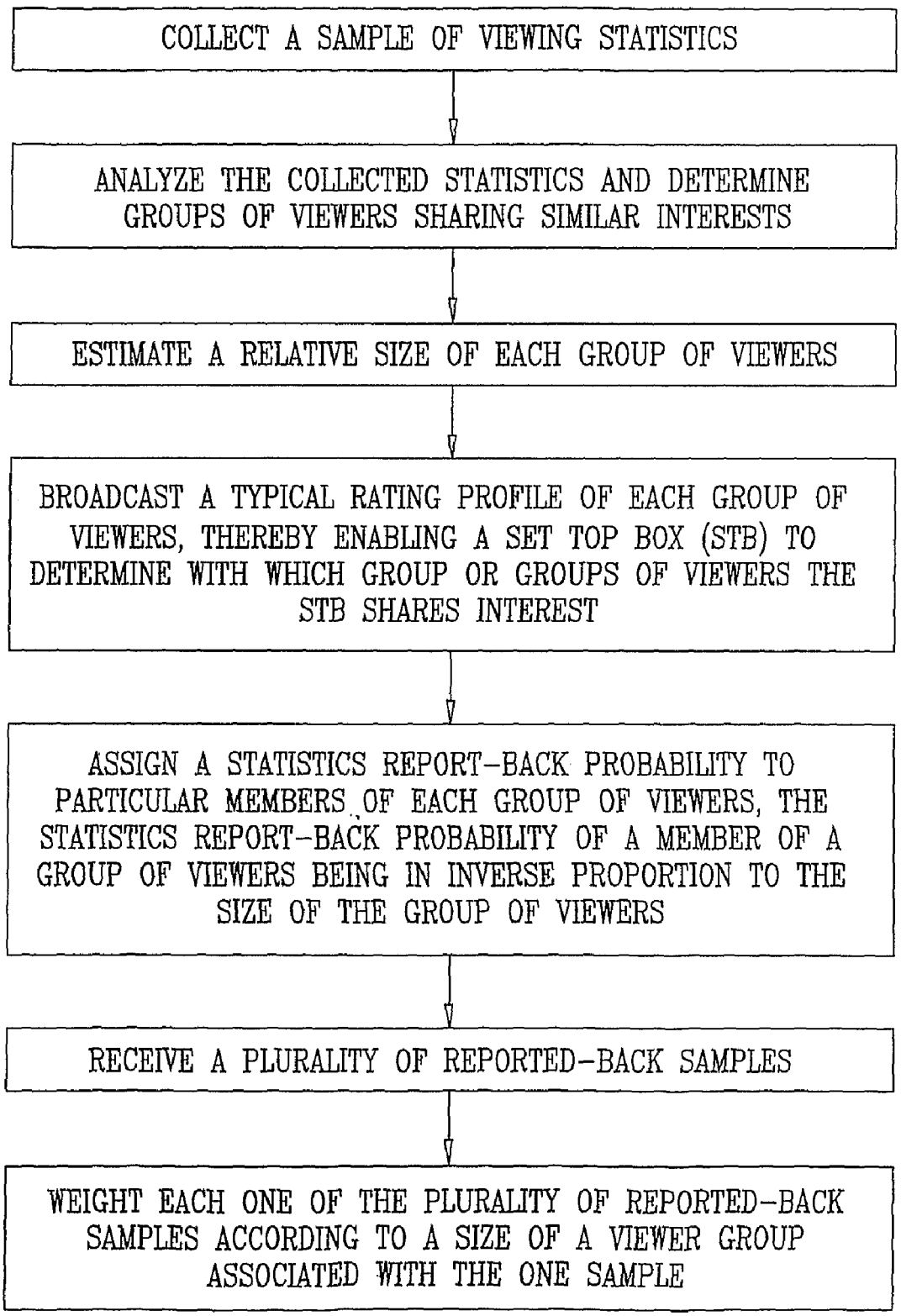
Figure 47:
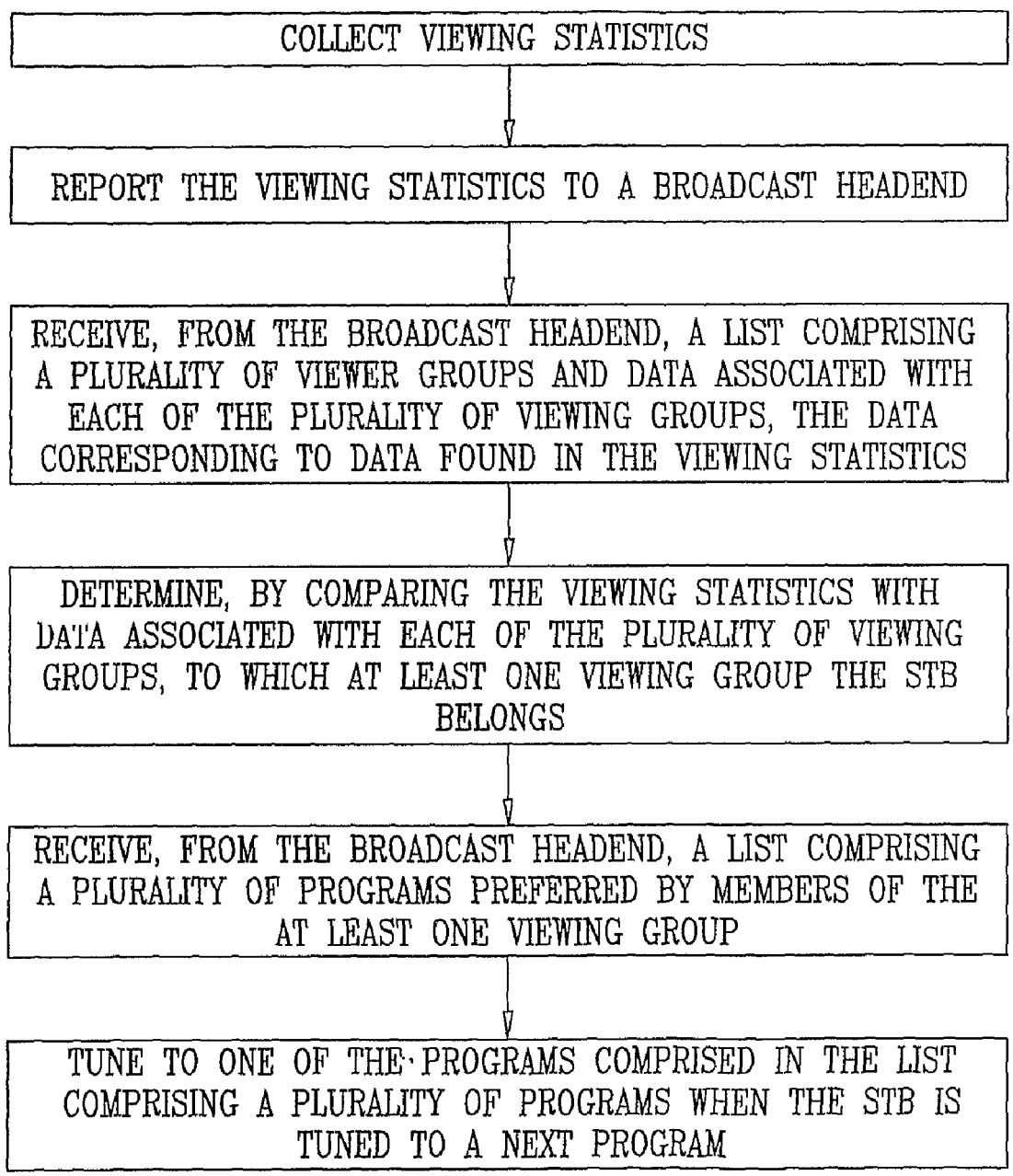
Figure 48:
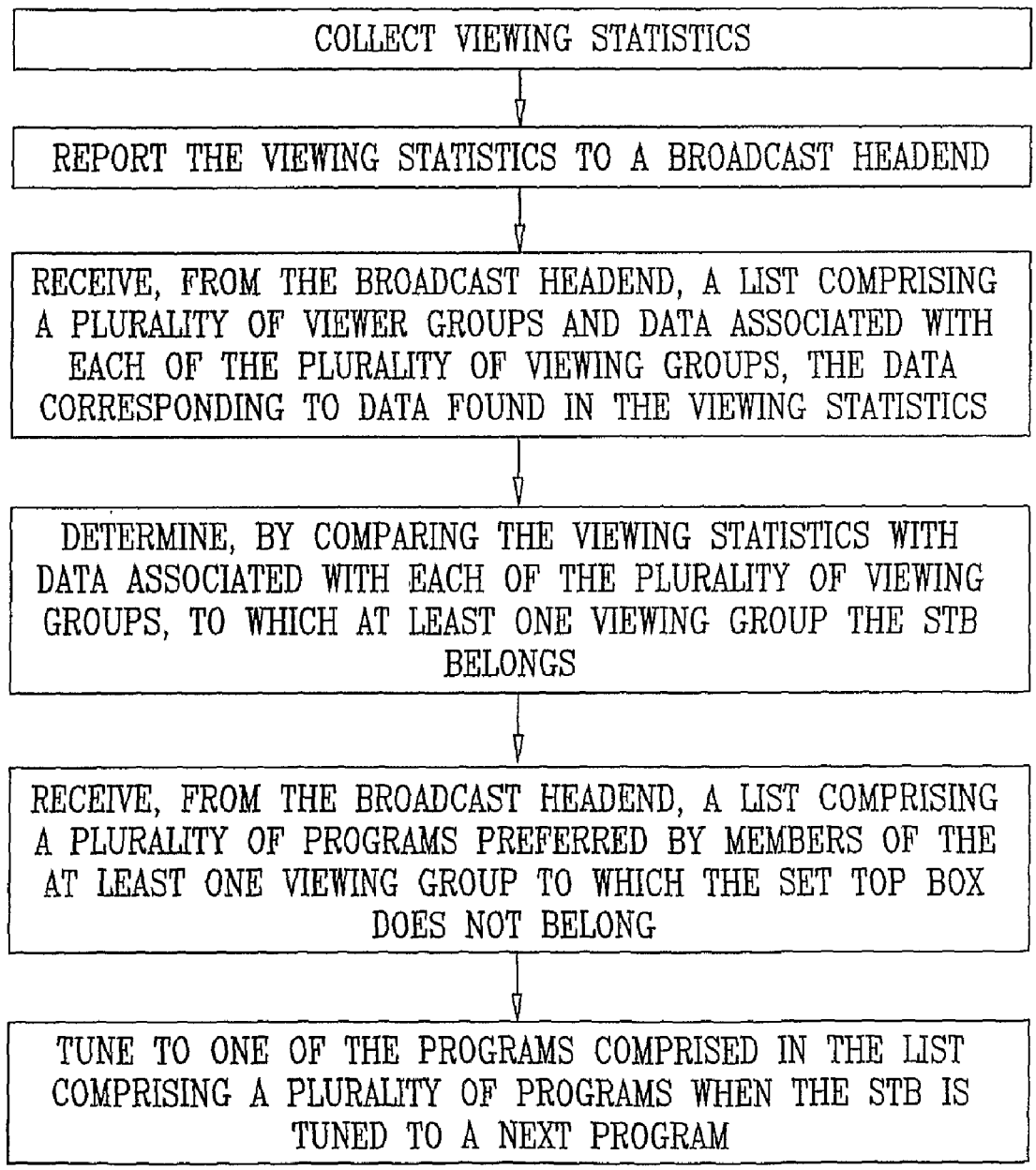
Figure 49:
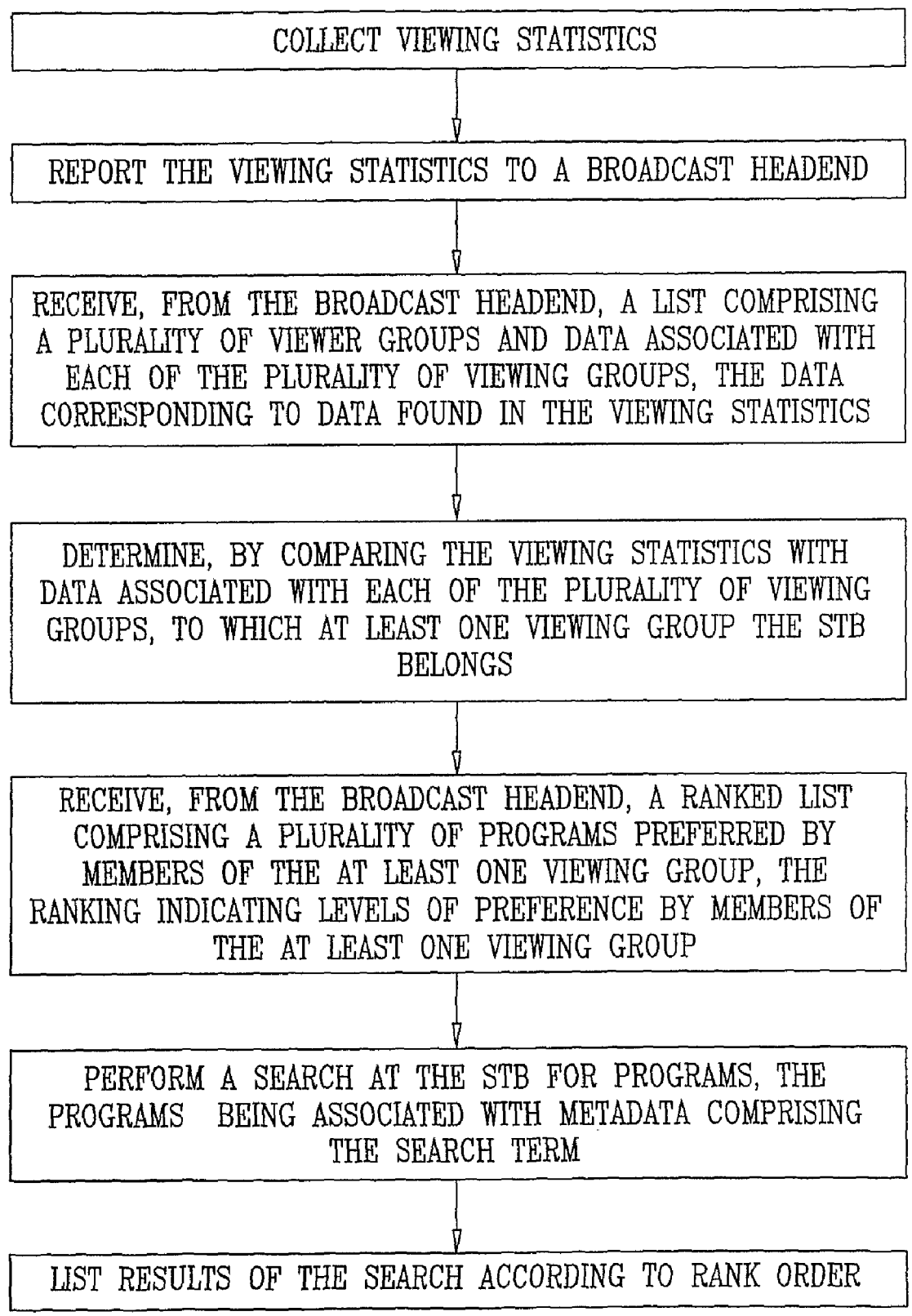
Figure 50:
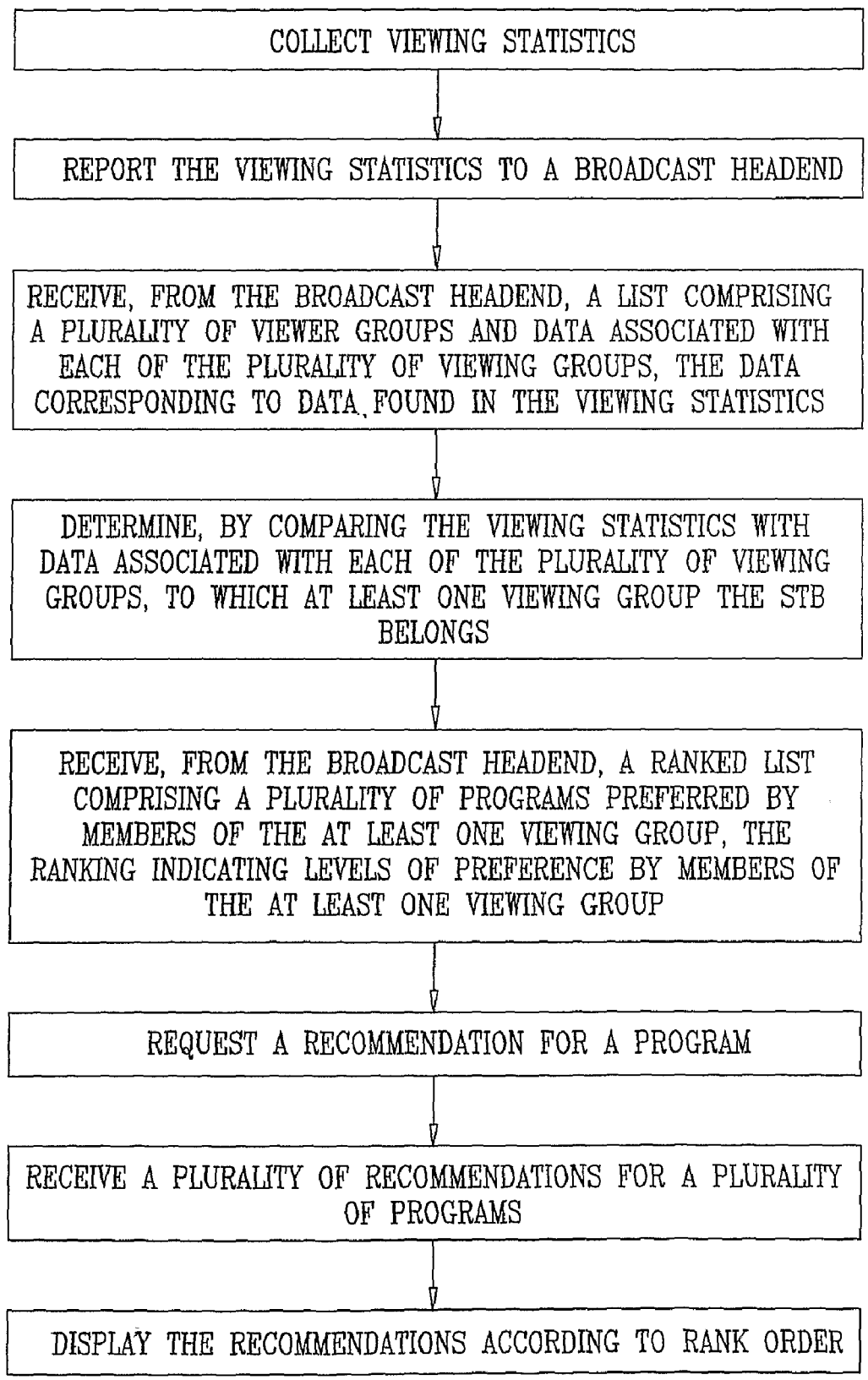

Reference is now specifically made to FIG. 41, which depicts an open synopsis box 4500, displaying the synopsis for the presently selected program 4510, and a recommender's logo 4520. The viewer entered the screen depicted in FIG. 45 by pressing the Info 4470 button. It is appreciated that the viewer may choose to view recommendations for the presently selected program 4510 by pressing an arrow key on the remote control. The viewer is preferably able to continue using the Recommendations screen, described above, with reference to FIGS. 22-26.

The Viewing History screens preferably work in synergy with technological capabilities of the system of FIG. 1, described above. Both Viewing History and the system of FIG. 1 are based on historical records of previously watched TV programs. While the technology used in the system of FIG. 1 relates to viewing records in an average statistical form, Viewing History allows the viewer to use descriptive metadata of a previously watched TV program as a raw material for search criteria for additional programs. In particular, automatically recorded programs can be presented serendipitously within the scope of Viewing History.

Reference is now made to FIGS. 42-50, which are simplified flowchart illustrations of preferred methods of operation of the system of FIG. 1 in accordance with preferred embodiments thereof. The methods of FIGS. 42-50 are believed to be self explanatory with reference to the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for rating programs at a broadcast headend, the method comprising:

receiving a sample of viewing logs from a plurality of set top boxes (STBs), the viewing logs comprising:

implicit ratings comprising a fraction of time one program was watched by at least one viewer associated with a viewing log compared to the total length of the one program;

explicit ratings comprising a rating provided directly by the at least one viewer associated with the viewing log; and confidence parameters comprising a weighting factor applied to the implicit rating, said confidence parameters comprising:

assigning a level of confidence in viewer presence to be 100% each time any type of signaling activity directed to the set top box is detected; and smoothly decreasing the level of confidence in viewer presence over time;

determining, at the broadcast headend from the sample of viewing logs, at least:

groups of viewers sharing similar interests; and groups of programs sharing similar audience;

computing time dynamics of rating distribution for the groups of viewers and the groups of programs; and incorporating at least one of the following into broadcast metadata:

the time dynamics of rating distributions of the groups of viewers for each of the groups of programs;

rating distributions of the groups of viewers for each of the groups of programs marginalized by time;

rating distributions of the groups of viewers for each program marginalized by time;

relative sizes of each group of viewers; and a mapping of each program to groups of programs, thereby making the broadcast metadata available to the plurality of STBs for use in computing ratings.

2. The method according to claim 1 and wherein a result of the computing is broadcast to the plurality of STBs.

3. The method according to claim 1 and wherein a result of the incorporating the time dynamics of rating distributions is broadcast to the plurality of STBs.

4. The method according to claim 1 and wherein a result of the incorporating the marginal distributions is broadcast to the plurality of STBs.

5. The method according to claim 1 and wherein the groups of viewers and groups of programs are determined using a bi-clustering method.

6. A system for rating programs, the system comprising:
a viewing log receiver operative to receive a sample of viewing logs from a plurality of set top boxes (STBs), the viewing logs comprising:
  implicit ratings comprising a fraction of time one program was watched by at least one viewer associated with a viewing log compared to the total length of the one program;
  explicit ratings comprising a rating provided directly by the at least one viewer associated with the viewing log; and
  confidence parameters comprising a weighting factor applied to the implicit rating, said confidence parameters comprising:
    assigning a level of confidence in viewer presence to be 100% each time any type of signaling activity directed to the set top box is detected; and
    smoothly decreasing the level of confidence in viewer presence over time;
a determining apparatus which determines, from the sample of viewing logs, at least:
  groups of viewers sharing similar interests; and
  groups of programs sharing similar audience;
a processor operative to compute time dynamics of rating distribution for the groups of viewers and the groups of programs; and
a broadcast metadata providing unit operative to incorporate at least one of the following into broadcast metadata:
  the time dynamics of rating distributions of the groups of viewers for each of the groups of programs;
  rating distributions of the groups of viewers for each of the groups of programs marginalized by time;
  rating distributions of the groups of viewers for each program marginalized by time;
  relative sizes of each group of viewers; and
  a mapping of each program to groups of programs,
thereby making the broadcast metadata available to the plurality of STBs for use in computing ratings.

7. A system for rating programs, the system comprising:
viewing log receiving means operative to receive a sample of viewing logs from a plurality of set top boxes (STBs), the viewing logs comprising:
  implicit ratings comprising a fraction of time one program was watched by at least one viewer associated with a viewing log compared to the total length of the one program;
  explicit ratings comprising a rating provided directly by the at least one viewer associated with the viewing log; and
  confidence parameters comprising a weighting factor applied to the implicit rating, said confidence parameters comprising:
    assigning a level of confidence in viewer presence to be 100% each time any type of signaling activity directed to the set top box is detected; and
    smoothly decreasing the level of confidence in viewer presence over time;
determining means for determining, from the sample of viewing logs, at least:
  groups of viewers sharing similar interests; and
  groups of programs sharing similar audience;
processing means for computing time dynamics of rating distribution for the groups of viewers and the groups of programs; and
broadcast metadata providing means for incorporating at least one of the following into broadcast metadata:
  the time dynamics of rating distributions of the groups of viewers for each of the groups of programs;
  rating distributions of the groups of viewers for each of the groups of programs marginalized by time;
  rating distributions of the groups of viewers for each program marginalized by time;
  relative sizes of each group of viewers; and
  a mapping of each program to groups of programs,
thereby making the broadcast metadata available to the plurality of STBs for use in computing ratings.

* * * * *

UNITED STATES PATENT AND TRADEMARK OFFICE
CERTIFICATE OF CORRECTION

PATENT NO.        : 8,181,201 B2                                    Page 1 of 1
APPLICATION NO.   : 11/989560
DATED             : May 15, 2012
INVENTOR(S)       : Goldenberg et al.

It is certified that error appears in the above-identified patent and that said Letters Patent is hereby corrected as shown below:

Delete "SIB" and insert therefor --STB-- in Col. 10, Line 3.

Signed and Sealed this
Twenty-fifth Day of September, 2012

David J. Kappos
*Director of the United States Patent and Trademark Office*